United States Patent
Okinaka et al.

(10) Patent No.: US 6,309,479 B1
(45) Date of Patent: *Oct. 30, 2001

(54) SPINDLE-SHAPED GOETHITE PARTICLES, SPINDLE-SHAPED HEMATITE PARTICLES AND MAGNETIC SPINDLE-SHAPED METAL PARTICLES CONTAINING IRON AS MAIN COMPONENT

(75) Inventors: Kenji Okinaka, Ube; Masaaki Maekawa, Onoda, both of (JP)

(73) Assignee: Toda Kogyo Corporation, Hiroshima-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/260,481

(22) Filed: Mar. 2, 1999

(30) Foreign Application Priority Data

Nov. 5, 1998 (JP) .................................................. 10-315080
Dec. 3, 1998 (JP) .................................................. 10-344410

(51) Int. Cl.$^7$ ........................................................ H01F 1/053
(52) U.S. Cl. ........................ 148/301; 148/311; 148/331; 148/101; 420/80; 420/83; 420/103; 252/62.56
(58) Field of Search ................................. 420/80, 83, 103; 148/101, 311, 301, 331; 252/62.56

(56) References Cited

U.S. PATENT DOCUMENTS

| | | | |
|---|---|---|---|
| 4,873,010 | 10/1989 | Takedoi et al. . | |
| 5,698,311 | * 12/1997 | Masaki et al. ........................ | 428/328 |
| 5,922,454 | * 7/1999 | Inaba et al. ........................... | 428/328 |
| 6,048,412 | * 4/2000 | Kurokawa et al. ................... | 148/311 |

FOREIGN PATENT DOCUMENTS

| | | |
|---|---|---|
| 0717397A2 | 6/1996 | (EP) . |
| 54-62915 | 5/1979 | (JP) . |
| 57-135436 | 8/1982 | (JP) . |
| 1212232 | 8/1989 | (JP) . |
| 3-174704 | 7/1991 | (JP) . |
| 3-293703 | 12/1991 | (JP) . |
| 4-224609 | 8/1992 | (JP) . |
| 5-101917 | 4/1993 | (JP) . |
| 6-93312 | 4/1994 | (JP) . |
| 6-176912 | 6/1994 | (JP) . |
| 7-126704 | 5/1995 | (JP) . |
| 8-165501 | 6/1996 | (JP) . |
| 9-22522 | 1/1997 | (JP) . |
| 9-22523 | 1/1997 | (JP) . |
| 11011951 | 1/1999 | (JP) . |
| 11130439 | 5/1999 | (JP) . |

\* cited by examiner

*Primary Examiner*—John Sheehan
*Assistant Examiner*—Andrew L. Oltmans
(74) *Attorney, Agent, or Firm*—Nixon & Vanderhye

(57) ABSTRACT

Spindle-shaped metal particles and a process for producing magnetic spindle-shaped metal particle containing iron as a main component, which contains cobalt of 8 to 45 atm % calculated as Co, aluminum of 5 to 20 atm %, calculated as Al, and a rare earth element of 1 to 15 atm %, calculated as rare earth element, wherein the particles have an average major axial diameter of 0.05 to 0.15 $\mu$m, an average minor axial diameter of 0.010 to 0.022 $\mu$m, an aspect ratio of 4:1 to 8:1, a particle size distribution of not more than 0.20, and an X-ray crystallite size D110 of 12.0 to 17.0 nm. The spindle-shaped metal particles have a high coercive force, an excellent particle coercive force distribution, a large saturation magnetization and an excellent oxidation stability, and are excellent in a squareness (Br/Bm) of the sheet due to a good dispersibility in a binder resin.

8 Claims, 13 Drawing Sheets

(×30000)

(×30000)

(×30000)

(×30000)

(×30000)

(×30000)

(×30000)

(×30000)

(×30000)

(×30000)

(×30000)

(×30000)

(×30000)

(×30000)

(×30000)

(×30000)

(×30000)

(×30000)

(×30000)

(×30000)

(×30000)

SPINDLE-SHAPED GOETHITE PARTICLES, SPINDLE-SHAPED HEMATITE PARTICLES AND MAGNETIC SPINDLE-SHAPED METAL PARTICLES CONTAINING IRON AS MAIN COMPONENT

BACKGROUND OF THE INVENTION

The present invention relates to spindle-shaped goethite particles, spindle-shaped hematite particles and magnetic spindle-shaped metal particles containing iron as a main component. More particularly, the present invention relates to spindle-shaped goethite particles which are fine particles and exhibit a good particle size distribution (standard deviation/average major axial diameter); spindle-shaped hematite particles which can be prevented as highly as possible from causing destruction of particle shape when subjected to a heat-reduction step for producing magnetic metal particles, and which are suitable as a starting material for the production of spindle-shape magnetic metal particles containing iron as a main component exhibiting a high coercive force, a large saturation magnetization, an excellent oxidation stability and an excellent coercive force distribution (switching field distribution) when incorporated into a magnetic coating film (hereinafter sometimes referred to merely as "SFD" or "sheet SFD"); and the magnetic spindle-shaped metal particles containing iron as a main component which are produced from the spindle-shaped goethite particles or the spindle-shaped hematite particles as a starting material, which exhibit a high coercive force, an excellent particle coercive force distribution (switching field distribution) (hereinafter referred to as merely "SFDr" or "particle SFDr"), a large saturation magnetization and an excellent oxidation stability, and which are excellent in a squareness (Br/Bm) of the sheet due to a good dispersibility in a binder resin.

In recent years, miniaturization, lightening, recording-time prolongation, high density recording and high storage capacity of recording and reproducing apparatuses for audio, video or computers, have proceeded more remarkably. With this progress, magnetic recording media such as magnetic tapes and magnetic discs have been increasingly required to have a high performance and a high recording density.

Magnetic recording media have been recurred to show a high image quality, high output characteristics, and especially improved frequency characteristics. For this reason, it has been demanded to enhance a residual magnetic flux density (Br) and a coercive force of the magnetic recording media.

These characteristics of the magnetic recording media have a close relation to the magnetic particles used therefor. In recent years, magnetic metal particles containing iron as a main component have attracted attention because such particles can show a higher coercive force and a larger saturation magnetization as compared to those of conventional magnetic iron oxide particles, and have been put into practice and applied to magnetic recording media such as digital audio tapes (DAT), 8-mm video tapes, Hi-8 tapes, video floppies or W-VHS tapes for Hi-vision. Further, the magnetic metal particles containing iron as a main component have been adopted in DVC system for digital recording, Zip or super-discs for computers, and recently, large-capacity Hi-FD which are being now industrially put into practice.

In consequence, it has also been strongly demanded to further improve properties of these magnetic metal particles containing iron as a main component.

As to he relationship between various characteristics of the magnetic recording media and properties of the magnetic particles used therefor, in order to achieve high density recording, it is generally required that the magnetic particles are fine particles and have a good particle size distribution.

In order to obtain a high image quality, the magnetic recording media for video are required to have a high coercive force (Hc) and a large residual magnetic flux density (Br). In order to impart such a high coercive force (Hc) and a large residual magnetic flux density (Br) to the magnetic recording media, the magnetic particles used therefor are also required to have a coercive force (Hc) as high as possible, an excellent particle coercive force distribution (SFDr) and a large saturation magnetization.

For example, in Japanese Patent Application Laid-Open (KOKAI) No. 63-26821(1988), it is described that "FIG. 1 shows a relationship between the SFD measured on the magnetic disc and the reproduction output thereof . . . As is apparent from FIG. 1, the characteristic curve representing the relationship between the SFD and the reproduction output becomes linear. Therefore, it is recognized that the reproduction output of the magnetic disc can be increased by using ferromagnetic particles having a small SFD. Namely, in order to obtain a high reproduction output, it is preferred that the SFD is small, and for example, when it is intended to obtain a more reproduction output than ordinary one, the SFD is required to be not more than 0.6." Thus, in order to enhance the reproduction output of magnetic recording media, it is necessary that the SFD (Switching Field Distribution) of the magnetic recording media is small, i.e., the sheet coercive force distribution of the magnetic recording media is narrow. Further, for this purpose, it is required that the magnetic particles used therefor has a good particle size distribution and contain no dendritic particles therein.

As to the magnetic metal particles containing iron as a main component, the finer the particle size thereof becomes, the larger the surface activity thereof becomes, so that the magnetic properties is considerably deteriorated even in air, because such fine particles readily undergo the oxidation reaction by oxygen therein. As a result, it is not possible to produce magnetic metal particles containing iron as a main component, which can show the aimed high coercive force and large saturation magnetization.

In consequence, it has been required to provide magnetic metal particles containing iron as a main component which are excellent in oxidation stability.

As described above, at present, there has been a strongest demand for providing magnetic metal particles containing iron as a main particles which are fine particles, contain no dendritic particles, and have a good particle size distribution, a high coercive force, an excellent particle coercive force distribution (SFDr), a large saturation magnetization and an excellent oxidation stability.

On the other hand, in the production of magnetic recording media, when the magnetic metal particles containing iron as a main component becomes finer or have a larger saturation magnetization, there tends to be caused such a problem that the particles show a poor dispersibility due to the increase in attraction force between particles or magnetic cohesive force when kneaded and dispersed in a binder resin in an organic solvent. As a result, the magnetic recording media produced therefrom tend to be deteriorated in magnetic characteristics, especially squareness (Br/Bm). Therefore, it have been required that the magnetic metal particles are further improved in magnetic properties.

In general, the magnetic metal particles containing iron as a main component can be produced by using as starting particles, goethite particles, hematite particles obtained by heat-dehydrating the goethite particles, or particles obtained by incorporating different kind of metals other than iron into these particles; heat-treating the starting particles, if necessary, in a non-reducing atmosphere; and heat-reducing the thus-treated particles in a reducing gas atmosphere. It is known that the obtained magnetic metal particles containing iron as a main component have a similar shape to that of goethite particles as the starting particles. Therefore, in order to obtain magnetic metal particles containing iron as a main component which satisfy the above various properties, it is necessary to use goethite particles which are fine particles, have a good particle size distribution and an appropriate particle shape, and contain no dendritic particles. Further, it is required to retain the appropriate particle shape and the good particle size distribution of the goethite particles during and after the subsequent heat-treatment.

Conventionally, there are known various methods of producing goethite particles as starting particles for the magnetic metal particles containing iron as a main component. As methods of preliminarily adding metal compounds containing cobalt which can enhance magnetic properties, aluminum which can impart a good shape-retention property to the magnetic metal particles due to anti-sintering effect thereof, or the like, during the production of goethite particles, there are known, for example, (i) a method of passing an oxygen-containing gas through a suspension containing ferrous hydroxide colloid obtained by adding not more than one equivalent of an aqueous alkali hydroxide solution to an aqueous ferrous salt solution in the presence of a cobalt compound, at a temperature of 50° C. so as to conduct the oxidation reaction, thereby producing acicular goethite particles, followed by conducting a growth reaction thereof (Japanese Patent Application Laid-Open (KOKAI) No. 7-11310(1995)); (ii) a method of reacting an aqueous ferrous salt solution to which an acid salt compound of aluminum is added, with an aqueous alkali carbonate solution to which a base salt compound of aluminum is added, thereby obtaining an $FeCO_3$-containing suspension, and passing an oxygen-containing gas through the obtained suspension so as to conduct the oxidation reaction, thereby producing spindle-shaped goethite particles (Japanese Patent Application Laid-Open (KOKAI) No. 6-2278614 (1994)); (iii) a method of neutralizing and hydrolyzing a mixed aqueous solution containing a ferric salt and a cobalt compound with an aqueous alkali hydroxide solution so as to obtain goethite seed crystal particles, and subjecting the obtained goethite seed crystal particles to growth reaction due to the hydrolysis caused by neutralizing the alkali hydroxide in an aqueous ferric salt solution containing an Al compound (Japanese Patent Application Laid-Open (KOKAI) No. 58-176902(1983)); (iv) a method of aging a suspension containing an $Fe^{2+}$-containing precipitate obtained by reacting an aqueous alkali carbonate with an aqueous ferrous salt solution, in a non-oxidative atmosphere, and passing an oxygen-containing gas through the suspension so as to conduct the oxidation reaction, thereby producing spindle-shaped goethite particles, wherein a Co compound is preliminarily allowed to exist in either the aqueous ferrous salt solution, the suspension containing an $Fe^{2+}$-containing precipitate or the aged suspension containing an $Fe^{2+}$-containing precipitate before the oxidation reaction, and wherein an aqueous solution containing a compound of at least one element selected from the group consisting of Al, Si, Ca, Mg, Ba, Sr, Nd and the like, is added in a total amount of 0.1 to 5.0 mol %, calculated as element(s), based on $Fe^{2+}$ in the aqueous ferrous salt solution, in the course of the oxidation reaction that the percentage of oxidation of $Fe^{2+}$ therein lies in the range of 50 to 90%, under the same conditions as those of the oxidation reaction (Japanese Patent Application Laid-Open (KOKAI) No. 7-126704(1995)); (v) a method of preliminarily adding Si, a rare earth element or the like during the production of goethite particles and then adding a Co compound, and further adding an Al compound in an amount of 6 atm % at most in the course of the oxidation reaction (Japanese Patent Application Laid-Open (KOKAI) Nos. 8-165501(1996) and 8-165117(1996)); (vi) a method of neutralizing ferrous salt with alkali hydroxide and/or alkali carbonate, doping a rare earth element and an alkali earth element into iron oxide hydroxide particles in the vicinity of a surface thereof during the oxidation reaction, and then modifying hydroxides of Al and/or Si on a surface of the obtained iron oxide hydroxide particles (Japanese Patent Application Laid-Open (KOKAI) No. 6-140222(1994)); or the like.

In addition, as to the oxidation rate upon the production of goethite particles, there are known a method of producing goethite particles by adjusting an air-flow linear velocity to the specific range (Japanese Patent Application Laid-Open (KOKAI) No. 59-23922(1984)); a method of initially oxidizing not less than 30 mol % of whole Fe at the specific oxidation rate and then oxidizing the remainder of Fe at a larger oxidation rate than the initial oxidation rate but not more than two times the initial oxidation rate (Japanese Patent Application Laid-Open (KOKAI) No. 1 -212232 (1989)); or the like.

In the above-mentioned Japanese KOKAIs, there has also been described magnetic metal particles containing iron as a main component, which are produced from goethite particles as starting particles.

Magnetic metal particles presently strongly demanded are magnetic spindle-shaped metal particles containing iron as a main component, which are fine particles, show a good particle size distribution; contain no dendritic particles; have an appropriate particle shape, a high coercive force, an excellent particle coercive force distribution (SFDr), a large saturation magnetization and an excellent oxidation stability; and are excellent in sheet squareness (Br/Bm) due to the good dispersibility in a binder resin. However, in case of using as starting particles, the goethite particles described in the above-mentioned Japanese KOKAIs, the obtained magnetic metal particles cannot sufficiently satisfy the requirements of these properties.

That is, in the production method described in Japanese Patent Application Laid-Open (KOKAI) No. 7-11310 (1995), there can be obtained acicular goethite particles containing Co therein. However, the goethite particles also contain unsuitable dendritic particles therein. In addition, the obtained goethite particles cannot necessarily show a uniform particle size. Further, it is difficult to obtain a large saturation magnetization and a high coercive force, due to contents of Co and Al and positions at which Co and Al exist.

In the production process described in Japanese Patent Application Laid-Open (KOKAI) No. 6-228614(1994), goethite particles which are free from inclusion of dendritic particles and have a uniform particle size, are produced by appropriately controlling the addition of aluminum. However, since the Al content is 6 atm % at most (calculated as Al) based on Fe and the surface of each goethite particle is coated with a Co compound, it is difficult to obtain a large saturation magnetization and a high coercive force.

In the production process described in Japanese Patent Application Laid-Open (KOKAI) No. 7-126704(1995), the Co compound is added in an amount of 1 to 8 atm %, and further the Al compound is added in an amount of 5 atm % at most in the course of the oxidation reaction. However, it is difficult to obtain magnetic metal particles containing iron as a main component, which show a high coercive force, a large saturation magnetization and an excellent oxidation stability.

In the production processes described in Japanese Patent Application Laid-Open (KOKAI) Nos. 8-165501(1996) and 8-165117(1996), since the amount of aluminum added is 6 atm % at most, it is difficult to obtain magnetic metal particles containing iron as a main component, which have a high coercive force, a large saturation magnetization and an excellent oxidation stability, and further the dispersibility in a binder resin is considered to be poor. Meanwhile, when the Al compound is added in the course of the oxidation reaction, it is required to continue the oxidation reaction under the same conditions as those of the initial stage.

In the production process described in Japanese Patent Application Laid-Open (KOKAI) No. 58-176902(1983), since $Fe^{3+}$ is used as a starting material, the reaction mechanism is not oxidation but hydrolysis, and further the hydrothermal treatment (autclaving treatment) as a second-reaction is conducted at a temperature as high as more than 100° C.

In the production process described in Japanese Patent Application Laid-Open (KOKAI) No. 6-140222(1994), no Co is added, thereby failing to obtain magnetic metal particles showing a large saturation magnetization and an excellent oxidation stability.

In Japanese Patent Application Laid-Open (KOKAI) No. 59-23922(1984), there is no description that Al, Co, etc., which are effective for sintering prevention, exist in the goethite particles in the form of a solid solution, nor description that the linear velocity of the oxygen-containing gas is increased in the course of the oxidation reaction.

The production process described in Japanese Patent Application Laid-Open (KOKAI) No. 1-212232(1989), aims at conducting an industrially advantageous process in a short time. In order to attain the aim, after not less than 30 mol % of whole Fe is initially oxidized, the oxidation rate is increased in order to oxidize the remainder of Fe. However, since the oxidation rate is less than two times the initial rate, it is still insufficient to attain the aim. In addition, in the specification thereof, there is no description that Co and Al which are effective for sintering prevention and for imparting good magnetic properties to resultant magnetic metal particles, are contained in goethite particles.

Further, it is hardly said that the magnetic metal particles produced from the goethite particles as starting particles obtained according to the process described in the above Japanese KOKAIs, are fine particles which show a good particle size distribution, contain no dendritic particles, have a high coercive force, an excellent particle coercive force distribution (SFDr), a large saturation magnetization, an excellent oxidation stability and a good dispersibility in a binder resin, and are excellent in sheet squareness (Br/Bm) due to the good dispersibility.

On the other hand, in order to obtain magnetic recording media having a higher coercive force, an excellent coercive force distribution (SFD) and an excellent weather resistance ($\Delta Bm$), it has been strongly required that the magnetic metal particles containing iron as a main component have not only a higher coercive force and a larger saturation magnetization, but also a particle size distribution as narrow as possible, an excellent dispersibility in vehicle and an excellent oxidation stability ($\Delta \sigma s$).

However, in any of these conventional processes, it is difficult to obtain magnetic metal particles which can fulfill the above requirements of various properties.

As described above, the magnetic metal particles containing iron as a main component can be produced by using spindle-shaped goethite produced by conducting the oxidation reaction by passing an oxygen-containing gas through an aqueous solution containing an Fe-containing precipitate obtained by reacting an aqueous ferrous salt solution with an aqueous alkali solution, spindle-shaped hematite particles obtained by heat-dehydrating the thus obtained goethite particles or particles obtained by incorporating different kind of metals other than iron into the spindle-shaped hematite particles, as starting particles; and heat-reducing the starting particles in a reducing gas atmosphere.

Since the conditions used in the heat-reduction step such as atmosphere, temperature, etc., are extremely severe, the sintering tends to be caused within or between the spindle-shaped hematite particles. Especially, in order to obtain a large saturation magnetization which is one advantage of the magnetic metal particles, it is required to control the heat-reducing temperature to as high a level as possible, so as to proceed the reduction reaction to a sufficient extent. However, when the heat-reducing temperature is increased, there is a tendency that the spindle-shaped hematite particles undergo destruction of particle shape.

Alternatively, in order to obtain a high coercive force, it is required that the magnetic metal particles are smaller in particle size and, therefore, the spindle-shaped hematite particles used as starting particles thereof are also required to have a fine particle size. However, in the case of fine particles having a particle size of not more than 0.15 µm, the destruction of particle shape in the heat-reduction step tends to be caused more remarkably. The magnetic metal particles in which the particle shape is destroyed, cannot show a high coercive force due to poor anisotropy in particle shape, so that the particle size distribution thereof is deteriorated. In the case where such fine particles are used for the production of magnetic recording media, the dispersibility of these particles in vehicle is deteriorated due to the increase in attraction force between the particles or the increase in magnetic cohesive force when kneaded and dispersed in the vehicle, resulting in deterioration in squareness (Br/Bm) as a magnetic coating film and, therefore, failing to obtain magnetic recording media having an excellent SFD.

In consequence, it is strongly demanded to provide spindle-shaped hematite particles which car be prevented as highly as possible from being destroyed in particle shape when subjected to the heat-reduction step.

Further, when such spindle-shaped fine magnetic metal particles containing iron as a main component, especially those having a major axial diameter of not more than 0.15 µm, are taken out and placed in air after the heat-reduction step, the oxidation reaction of these particles proceeds drastically by oxygen in air, resulting in considerable deterioration in magnetic properties thereof, especially in saturation magnetization thereof. As a result, the aimed magnetic metal particles having a large saturation magnetization cannot be obtained, and further, when these particles are used to form a magnetic coating film, the weather resistance ($\Delta Bm$) of the coating film is deteriorated. Therefore, it is also strongly demanded to provide magnetic metal particles showing not only a large saturation magnetization even immediately after the heat-reduction step, but also an excellent oxidation stability.

Hitherto, in order to improve the oxidation stability of magnetic metal particles containing iron as a main component, there is widely known a method of incorporating Co as a different element other than Fe in an amount as large as more than 20 atm % (Japanese Patent Application Laid-Open (KOKAI) Nos. 3-174704(1991), 3-293703 (1991), 5-101917(1993), 6-176912(1994), 9-22522(1997), 9-22523(1997), etc.). Further, as the method of reducing a particle size of magnetic metal particles containing iron as a main component which show a high coercive force, there is known a method of producing fine magnetic metal particles containing iron as a main component (Japanese Patent Application Laid-Open (KOKAI) No. 57-135436(1982)).

Although starting particles presently demanded are spindle-shaped Co-containing hematite particles which can be prevented as highly as possible from being destroyed in particle shape in the heat-reduction step, there cannot be still obtained such starting particles which can fulfill the above properties.

Namely, in the method of reducing a particle size of fine magnetic metal particles containing iron as a main component as described above, since fine spindle-shaped hematite particles are used as starting particles, the sintering tends to be caused therewithin and/or therebetween upon the heat-reduction, resulting in destruction of the particle shape of the spindle-shaped hematite particles. For this reason, it is difficult to obtain magnetic metal particles having the aimed high coercive force. The coercive force of the magnetic metal particles obtained by the above method is 2,000 Oe at most. Further, the destruction of particle shape upon the heat-reduction, results in Boor dispersibility in vehicle and deterioration in SFD as a magnetic coating film.

In the case where Co is added in a large amount, there can be obtained magnetic metal particles which are improved in oxidation stability. However, upon the heat-treatment, excessive growth of particles tends to occur, thereby inducing the destruction of particle shape. As a result, since the obtained magnetic metal particles are deteriorated in anisotropy of particle shape, it is not possible to obtain a high coercive force. Further, since the magnetic metal particles are deteriorated in particle size distribution and dispersibility in vehicle, the SFD of a magnetic coating film is about 0.40 at most.

As a result of the present inventors' earnest studies for solving the above problems, it has been found that in a process of producing spindle shaped goethite particles which process comprises reacting a mixed aqueous alkali solution comprising an aqueous alkali carbonate solution and an aqueous alkali hydroxide solution, with an aqueous ferrous salt solution to obtain a water suspension containing an $Fe^{2+}$-containing precipitate; aging the water suspension containing the $Fe^{2+}$-containing precipitate in a non-oxidative atmosphere; passing an oxygen-containing gas through the resultant water suspension to conduct the oxidation reaction, thereby producing spindle-shaped goethite seed crystal particles; and passing an oxygen-containing containing gas through a water suspension containing both the $Fe^{2+}$-containing precipitate and the spindle-shaped goethite seed crystal particles to conduct the oxidation reaction, thereby growing a goethite layer on a surface of each spindle-shaped goethite seed crystal particle, upon the production of the spindle-shaped goethite seed crystal particles, by adding a Co compound in an amount of 8 to 45 atm % (calculated as Co) based or whole Fe, to the water suspension containing the $Fe^{2+}$-containing precipitate during the aging-treatment before initiation of the oxidation reaction, and conducting the oxidation reaction to oxidize 30 to 80 mol % of whole $Fe^{2+}$, and upon the growth of the goethite layer, by adjusting a linear velocity of the oxygen-containing gas passed through the water suspension containing both the $Fe^{2+}$-containing precipitate and the spindle-shaped goethite seed crystal particles, to not less than two times that of the oxygen-containing gas passed through the water suspension containing the $Fe^{2+}$-containing precipitate upon the production of the goethite seed crystal particles, and adding an Al compound in an amount of 5 to 20 atm % (calculated as Al) based on whole Fe, there can be obtained spindle-shaped goethite particles which contain 8 to 45 atm % of Co (calculated as Co) based on whole Fe and 5 to 20 atm % of Al (calculated as Al) based on whole Fe; which have an average major axial diameter of 0.05 to 0.18 μm; and which comprise a seed portion and a surface layer portion, wherein the weight ratio of the seed portion to the surface layer portion is 30:70 to 80:20, the Co concentration of the seed portion is less than that of the surface layer portion, and Al exists only in the surface layer portion; and further which are fine particles, have an excellent particle size distribution (standard deviation/major axial diameter) and an appropriate particle shape, and are free from inclusion of dendritic particles. The present invention has been attained on he basis of the finding.

SUMMARY OF THE INVENTION

It is an object of the present invention to provide spindle-shaped goethite particles which are fine particles and free from inclusion of dendritic particles, and have a good particle size distribution and an appropriate particle shape.

It is an another object of the present invention to provide spindle-shaped hematite particles suitable as starting particles for the production of the magnetic spindle-shaped metal particles containing Fe as a main component which can be prevented as highly as possible from being destroyed in particle shape upon the heat-reduction step, and show a higher coercive force, especially not less than 2,000 Oe, a large saturation magnetization, especially not less than 130 emu/g, an excellent oxidation stability, and an excellent SFD of a magnetic coating film, especially less than 0.40.

It is further object of the present invention to provide magnetic spindle-shaped metal particles containing iron as a main component which are produced from the spindle-shaped goethite particles or spindle-shaped hematite particles as starting particles, show a high coercive force, an excellent particle coercive force distribution (SFDr), a large saturation magnetization and an excellent oxidation stability, and are excellent in sheet squareness (Br/Bm) due to a good dispersibility in a binder resin.

To accomplish the aims, in a first aspect of the present invention, there is provided spindle-shaped goethite particles containing cobalt of 8 to 45 atm %, calculated as Co, based on whole Fe, aluminum of 5 to 20 atm %, calculated as Al, based on whole Fe, and having an average major axial diameter of 0.05 to 0.8 μm, each of said spindle-shaped goethite particles comprising a seed portion and a surface layer portion, the weight ratio of said seed portion to said surface layer portion being 30:70 to 80:20 and the relationship of the Co concentration of the seed portion with that of the goethite particle being 50 to 95:100 when the Co concentration of the goethite particle is 100, and the aluminum existing only in said surface layer portion.

In a second aspect of the present invention, there is provided spindle-shaped goethite particles containing cobalt of more than 20 atm % and not more than 45 atm %, calculated as Co, based on whole Fe, aluminum of 5 to 15 atm %, calculated as Al, based on whole Fe, and having an average major axial diameter of 0.05 to 0.17 µm, an average minor axial diameter of 0.010 to 0.025 µm, an aspect ratio (average major axial diameter/average minor axial diameter) of 4:1 to 8:1, and a BET specific surface area of 100 to 250 m$^2$/g, the aluminum existing only in said surface layer portion.

In a third aspect of the present invention, there is provided spindle-shaped hematite particles containing cobalt of 8 to 45 atm %, calculated as Co, based on whole Fe, aluminum of 5 to 20 atm %, calculated as Al, based on whole Fe, and a rare earth element of 1 to 15 atm %, calculated as rare earth element, based on whole Fe, and having an average particle size of: 0.05 to 0.17 µm, each of said spindle-shaped hematite particles comprising a seed portion, an intermediate layer portion and an outer layer portion, the weight ratio of said seed portion to said intermediate layer portion being 30:70 to 80:20 and the relationship of the Co concentration of the seed portion with that of the hematite particle being 50 to 95:100 when the Co concentration of the hematite particle is 100, the aluminum existing only in said intermediate layer portion and said rare earth element existing in said outer layer portion.

In a fourth aspect of the present invention, there is provided spindle-shaped hematite particles containing cobalt of more than 20 atm % and not more than 45 atm %, calculated as Co, based on whole Fe, aluminum of 5 to 15 atm %, calculated as Al, based on whole Fe, and a rare earth element of 5 to 15 atm %, calculated as rare earth element, based on whole Fe, and having an average major axial diameter of 0.05 to 0.14 µm, an aspect ratio (average major axial diameter/average minor axial diameter) of 4:1 to 8:1, a crystallite size $D_{104}$ of 50 to 80 Å, a saturation magnetization σs of 0.5 to 2 emu/g, the aluminum existing only in said intermediate layer portion and said rare earth element existing in said outer layer portion.

In a fifth aspect of the present invention, there is provided magnetic spindle-shaped metal particles containing iron as a main component, which contain cobalt of 8 to 45 atm %, calculated as Co, based on whole Fe, aluminum of 5 to 20 atm %, calculated as Al, based on whole Fe, and a rare earth element of 1 to 15 atm %, calculated as rare earth element, based on whole Fe, and Cave an average major axial diameter of 0.05 to 0.15 µm.

In a sixth aspect of the present invention, there is provided magnetic spindle-shaped metal particles containing iron as a main component, which contain cobalt of more than 20 atm % and not more than 45 atm %, calculated as Co, based on whole Fe, aluminum of 5 to 15 atm %, calculated as Al, based on whole Fe, and a rare earth element of 5 to 15 atm %, calculated as rare earth element, based on whole Fe, and have an average major axial diameter of 0.05 to 0.14 µm, an aspect ratio (average major axial diameter/average minor axial diameter) of 4:1 to 8:1, an X-ray crystallite size $D_{110}$ of 12.0 to 17.0 nm, a coercive force of 2,000 to 2,500 Oe and a saturation magnetization σs of 130 to 160 emu/g.

In a seventh aspect of the present invention, there is provided a process for producing the spindle-shaped goethite particles, comprising:

aging a water suspension containing an $Fe^{2+}$-containing precipitate produced by reacting a mixed aqueous alkali solution comprising an aqueous alkali carbonate solution and an aqueous alkali hydroxide solution, with an aqueous ferrous salt solution, in a non-oxidative atmosphere;

conducting an oxidation reaction by passing an oxygen-containing gas through the water suspension, thereby producing spindle-shaped goethite seed crystal particles; and passing again an oxygen-containing gas through the resultant water suspension on containing both said $Fe^{2+}$-containing precipitate and said spindle-shaped goethite seed crystal particles to conduct the oxidation reaction of the water suspension, thereby growing a goethite layer on a surface or each spindle-shaped goethite seed crystal particle, upon the production of said spindle-shaped goethite seed crystal particles, a Co compound being added in an amount of 8 to 45 atm %, calculated as Co, based on whole Fe, to said water suspension containing the $Fe^{2+}$-containing precipitate during the aging treatment before initiation of the oxidation reaction, thereby oxidizing 30 to 80% of whole $Fe^{2+}$, and upon the growth of said goethite layer, a linear velocity of said oxygen-containing gas passing through said water suspension containing both the $Fe^{2+}$-containing precipitate and the spindle-shaped goethite seed crystal particles, being adjusted to not less than two times that of the oxygen-containing gas passing through the water suspension containing the $Fe^{2+}$-containing precipitate upon the production of the goethite seed crystal particles, and an Al compound being added in an amount of 5 to 20 atm %, calculated as Al, based on whole Fe.

In an eighth aspect of the present intention, there is provided a process for producing spindle-shaped hematite particles, comprising:

treating said spindle-shaped goethite particles obtained in the seventh aspect with an anti-sintering agent comprising a rare earth element-containing compound; and heat-treating the spindle-shaped goethite particles at 400 to 850° C. in a non-reducing atmosphere In a ninth aspect of the present invention, there is provided a process for producing magnetic spindle-shaped metal particles containing iron as a main component, comprising:

treating said spindle-shaped goethite particles obtained in the seventh aspect with an anti-sintering agent comprising a rare earth element-containing compound; and then heat-reducing said spindle-shaped goethite particles at 400 to 700° C. in a reducing atmosphere.

In a tenth aspect of the present invention, there is provided a process for producing magnetic spindle-shaped metal particles containing iron as a main component, comprising:

treating said spindle-shaped goethite particles obtained in the seventh aspect with an anti-sintering agent comprising a rare earth element-containing compound;

heat-treating the treated spindle-shaped goethite particles at 400 to 850° C. in a non-reducing atmosphere; and then heat-reducing said heat-treated particles at 400 to 700° C. in a reducing atmosphere.

In an eleventh aspect of the present invention, there is provided a process for producing magnetic spindle-shaped metal particles containing iron as a main component, comprising:

heat-reducing said spindle-shaped hematite particles obtained in the eighth aspect at 400 to 700° C. in a reducing gas atmosphere.

In a twelfth aspect of the present invention, there is provided a process for producing magnetic spindle-shaped metal particles containing iron as a main component, which are suitable for magnetic recording, comprising:

charging spindle-shaped goethite particles containing cobalt of 20 to 45 atm %, calculated as Co, based on whole Fe and having a major axial diameter of 0.05 to 0.15 μm, or spindle-shaped hematite particles obtained by heat-dehydrating said goethite particles, as starting particles, into a fixed-bed reducing apparatus to form a fixed-bed having a height of not more than 30 cm;

elevating the temperature of said starting particles to 400 to 700° C. in an inert gas atmosphere;

replacing the inert gas atmosphere with a reducing gas atmosphere; and reducing said spindle-shaped goethite particles or spindle-shaped hematite particles with a reducing gas fed at a linear velocity of 40 to 150 cm/s, at temperature of 400 to 700° C.

DETAILED DESCRIPTION OF THE INVENTION

Figure 1:
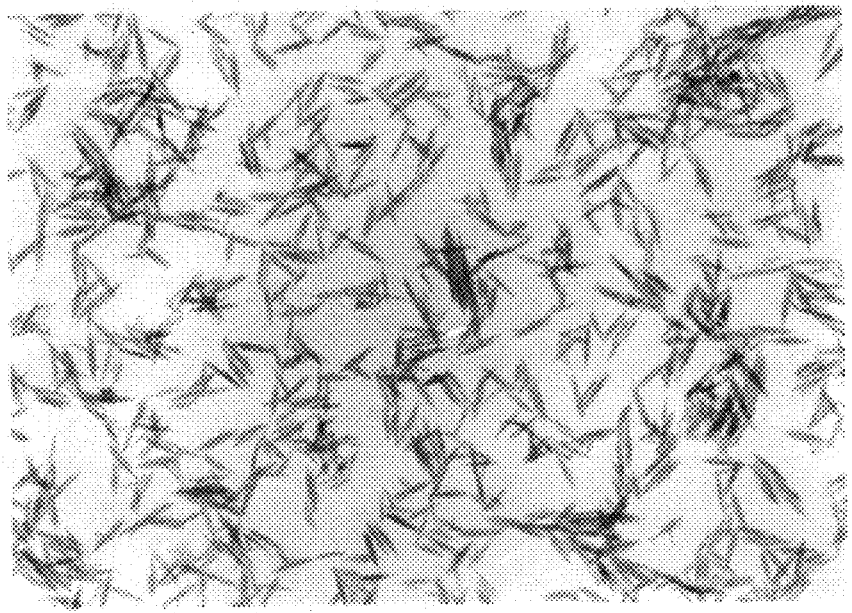
FIG. 1 is a transmission electron micrograph (×30,000) showing a particle shape of spindle-shaped goethite particles obtained in Example 1 according to the present invention.

The present invention is described in detail below.

First, the spindle-shaped goethite particles according to the present invention are explained.

The spindle-shaped goethite particles according to the present invention have an average major axial diameter of usually 0.05 to 0.1 μm, preferably 0.05 to 0.17 μm, more preferably 0.05 to 0.16 μm, still more preferably 0.05 to 0.15 μm, a particle size distribution (standard deviation/average major axial diameter) of usually not more than 0.24, preferably 0.10 to 0.24, more preferably 0.10 to 0.22, an average minor axial diameter of 0.010 to 0.025 μm, preferably 0.010 to 0.023 μm, and an aspect ratio (average major axial diameter/average minor axial diameter) of usually 4:1 to 8:1, preferably 4:1 to 7.7:1.

The BET specific surface area of the spindle-shaped goethite particles according to the present invention, is usually 100 to 250 m$^2$/g, preferably 120 to 230 m$^2$/g.

The spindle-shaped goethite particles according to the present invention contain cobalt in an amount of usually 8 to 45 atm %, preferably 10 to 40 atm % (calculated as Co) based on whole Fe, and aluminum in an amount of usually 5 to 20 atm %, preferably 6 to 15 atm % (calculated as Al) based on whole Fe.

Each particle of the spindle-shaped goethite particles according to the present invention, comprises a goethite seed portion (core particle) and a goethite surface layer portion.

The seed portion means a goethite seed crystal particle formed by oxidizing he ferrous salt added, before adding the Al compound. More specifically, the seed portion represents a portion extending outwardly from the center of each particle and having a specific weight percentage determined according to a percentage of oxidation of $Fe^{2+}$. The weight percentage of the seed portion is usually 30 to 80% by weight, preferably 40 to 70% by weight based on the weight of the goethite particle from the center of each particle.

The Co concentration of the seed portion of the goethite particle is represented by the relationship of the Co concentration of the seed portion of the goethite particle with that of the goethite particle. The Co concentration of the seed portion of the goethite particle is expressed by the Co content (atm %) in the seed portion of the goethite particle based on the Fe content in the seed portion of the goethite particle, and the Co concentration of the goethite particle is expressed by the whole Co content (atm %) in the goethite particle based on the whole Fe content in the goethite particle. The relationship of the Co concentration of the seed portion with that of the goethite particle is usually 50 to 95:100, preferably 60 to 90:100, when the Co concentration of the goethite particle is 100. If the relationship of the Co concentration of the seed portion with that of the goethite particle is less than 50:100, the effect of improving magnetic properties of the magnetic particles produced from the goethite particle may not be obtained. On the other hand, if the relationship of the Co concentration is more than 95:100, it is difficult to exhibit a sufficient shape-retention property upon the reduction reaction, thereby causing deterioration in magnetic properties thereof.

The surface layer portion means a goethite layer formed by the growth reaction on the surface of each goethite seed crystal particle after the addition of the Al compound. More specifically, the surface layer portion represents a portion extending inwardly from an outer surface of each goethite particle. The weight percentage of the surface layer portion is usually 20 to 70% by weight, preferably 30 to 60% by weight based on time weight of the goethite particle from the outer surface of each particle.

The Co concentration in the surface layer portion of the goethite particle is more than that of the seed portion of the goethite particle. The Co concentration of the surface layer portion of the goethite particle is represented by the relationship of the Co concentration of the surface layer portion of the goethite particle with that of the goethite particle. The Co concentration of the surface layer portion of the goethite particle is expressed by the Co content (atm %) in the surface layer portion of the goethite particle based on the Fe content in the surface layer portion of the goethite particle, and the Co concentration of the goethite particle is expressed by the whole Co content (atm %) in the goethite particle based on the whole Fe content in the goethite particle. The relationship of the Co concentration of the surface layer portion with that of the goethite particle is usually 102 to 300:100, preferably 106 to 194:100, when the Co concentration of the goethite particle is 100.

Aluminum is present only in the surface layer portion, and the Al content is usually 5 to 20 atm %, preferably 6 to 15 atm %, more preferably 7 to 12 atm % (calculated as Al) based on whole Fe. When the Al content is less than 5 atm %, the anti-sintering effect may not be obtained. On the other hand, when the Al content is more than 20 atm %, the obtained goethite particles may be deteriorated in magnetic properties, especially saturation magnetization.

The X-ray crystallite size ratio ($D_{020}/D_{110}$) of the spindle-shaped goethite particles according to the present invention, is not less than 2.0:1, preferably 2.0 to 3.0.

Next, the process for producing the spindle-shaped goethite particles according to the present invention is described.

The spindle-shaped goethite particles according to the present invention can be obtained by producing goethite seed crystal particles and then growing a goethite layer on the surface of each goethite seed crystal particle.

The goethite seed crystal particles can be obtained by aging a water suspension containing an $Fe^{2+}$-containing precipitate produced by reacting a mixed aqueous alkali solution composed of an aqueous alkali carbonate solution and an aqueous alkali hydroxide solution, with an aqueous ferrous salt solution, in a non-oxidative atmosphere, and passing an oxygen-containing gas through the water suspension to form spindle-shaped goethite seed crystal particles. Upon the production of the goethite seed crystal particles, a Co compound can be added in an amount of usually 8 to 45 atm %, preferably 10 to 40 atm % (calculated as Co) based on whole Fe, to the water suspension containing the $Fe^{2+}$-containing precipitate during the aging treatment before the initiation of the oxidation reaction.

The aging of the water suspension is preferably conducted at a temperature of usually 40 to 80° C. in a non-oxidative atmosphere. When the temperature is less than 40° C., the obtained goethite particles may have a small aspect ratio, so that the aging effect may not be sufficiently exhibited. On the other hand, when the temperature is more than 80° C., magnetite particles tend to be contained in the obtained goethite particles. The aging time is usually 30 to 300 minutes, preferably 60 to 300 minutes. When the aging time is less than 30 minutes, it is difficult to sufficiently increase the aspect ratio of the goethite particles. The aging time may be more than 300 minutes, but such a long aging time cannot show a further Improvement and, therefore, meaningless.

The non-oxidative atmosphere can be obtained by passing an inert gas such as a nitrogen gas, or a reducing gas such as a hydrogen gas, through a reactor into which the water suspension is accommodated.

In the production reaction of the spindle-shaped goethite seed crystal particles, as the aqueous ferrous salt solution, there may be used an aqueous ferrous sulfate solution, an aqueous ferrous chloride solution or the like.

The mixed aqueous alkali solution used in the production reaction of the spindle-shaped goethite seed crystal particles, can be obtained by mixing aqueous alkali carbonate solution with an aqueous alkali hydroxide solution. As to the mixing ratio (expressed by % calculated as normality), the percentage of the aqueous alkali hydroxide solution is usually 10 to 40%, preferably 15 to 35% (% calculated as normality). When the percentage of the aqueous alkali hydroxide solution is less than 10%, the aspect ratio of the obtained goethite seed crystal particles may be unsatisfactory. On the other hand, when the percentage of the aqueous alkali hydroxide solution is more than 40%, magnetite particles tend to be contained in the obtained goethite particles.

As the aqueous alkali carbonate solutions, there may be used an aqueous sodium carbonate solution, an aqueous potassium carbonate solution, an aqueous ammonium carbonate solution, or the like. As the aqueous alkali hydroxide solutions, there may be used am aqueous sodium hydroxide solution, potassium hydroxide solution or the like. As the aqueous alkali hydroxide solution, there may be used an aqueous sodium hydroxide solution, an aqueous potassium hydroxide solution, or the like.

The equivalent ratio of the mixed aqueous alkali solution to whole Fe in the aqueous ferrous salt solution is usually 1.3:1 to 3.5:1, preferably 1.5:1 to 2.5:1. When the equivalent ratio of the mixed aqueous alkali solution to whole Fe is less than 1.3;1, magnetite particles tend to be contained in the obtained goethite particles. On the other hard, when the equivalent ratio thereof is more than 3.5:1, the amount of the mixed aqueous alkali solution becomes large, which is disadvantageous from the industrial viewpoint.

The $Fe^{2+}$ concentration after mixing the aqueous ferrous salt solution with the mixed aqueous alkali solution, is usually 0.1 to 10 mol/liter, preferably 0.2 to 0.8 mol/liter. When the $Fe^{2+}$ concentration is less than 0.1 mol/liter, the yield of goethite particles becomes low, which is disadvantageous from the industrial viewpoint. On the other hand, when he $Fe^{2+}$ concentration is more than 1.0 mol/liter, the particle size distribution of the obtained goethite particles becomes disadvantageously large.

The pH value in the production reaction of the spindle-shaped goethite seed crystal particles, is usually 8.0 to 11.5, preferably 8.5 to 11.0. When the pH value is less than 8.0, a large amount of acid radicals tend to be contained in the obtained goethite particles. Since such acid radicals cannot be simply removed even by washing, the sintering between particles is caused when magnetic metal particles containing iron as a main component are produced from these goethite particles. On the other hand, when the pH value is more than 11.5, it is difficult to obtain magnetic metal particles having the aimed high coercive force.

The production reaction of the spindle-shaped goethite seed crystal particles may be conducted by the oxidation reaction by passing an oxygen-containing gas (e.g., air) through the solution.

The linear velocity of the oxygen-containing gas is usually 0.5 to 3.5 cm/s, preferably 1.0 to 3.0 cm/s.

The linear velocity means an amount of the oxygen-containing gas passed per a unit sectional area (a bottom sectional area of a column reactor, and a diameter and number of pores of a bottom plate are not taken into consideration), and is expressed by a unit of cm/second.

The temperature used for the production reaction of the spindle-shaped goethite seed crystal particles, is usually not more than 80° C. at which goethite particles are produced. When the temperature is more than 80° C., magnetite particles tend to be contained in the obtained spindle-shaped goethite particles. The temperature thereof is preferably 45 to 55° C.

In the production reaction of the spindle-shaped goethite seen crystal particles, as the Co compounds, there may be used cobalt sulfate, cobalt chloride, cobalt nitrate or the like. The Co compound may be added to the water suspension containing the $Fe^{2+}$-containing precipitate during the aging treatment thereof before the initiation of the oxidation reaction.

The amount of the Co compound added is usually 8 to 45 atm %, preferably 10 to 40 atm %, more preferably 10 to 35 atm % (calculated as Co) based on whole Fe. When the amount of the Co compound added is less than 8 atm %, the effect of improving magnetic properties of the finally produced magnetic metal particles may not be exhibited. On the other hand, when amount of the Co compound added is more than 45 atm %, the obtained particles are too fine to exhibit a small aspect ratio.

In the growth reaction of the goethite layer, the pH value thereof is usually 8.0 to 11.5, preferably 8.5 to 11.0. when the pH value is less than 8.0, a large amount of acid radicals may be contained in the obtained goethite particles. Since the acid radicals may not be simply removed even by washing, the sintered particles tend to be caused when the magnetic metal particles are produced from these goethite particles. On the other hand, when the pH value is more than 11.5, there cannot be obtained magnetic metal particles having the aimed high coercive force.

The growth reaction of the goethite layer may be conducted by the oxidation reaction by passing an oxygen-containing gas (e.g., air) through the solution.

In the growth reaction of goethite particles, the linear velocity of the oxygen-containing gas passed upon the growth reaction, is usually not less than two times, preferably 2 to 3.5 times that in the production reaction of the seed crystal particles. When the linear velocity is less than two times, the viscosity of the water suspension may be increased upon the addition of Al, so that the crystal growth in the minor axial direction may be accelerated and, therefore, the aspect ratio of the obtained particles may be lowered. More specifically, the linear velocity of the oxygen-containing gas passed upon the growth reaction, is usually 1.0 to 7.0 cm/s, preferably 2.0 to 6.0 cm/s.

The temperature used in the growth reaction of the goethite layer, is usually not more than 80° C. at which goethite particles are produced. When the temperature is more than 80° C., magnetite particles tends to be contained in the obtained goethite particles. The temperature thereof is preferably 45 to 55° C.

In the growth reaction of the goethite layer, as the Al compounds, there may be used acid salts such as aluminum sulfate, aluminum chloride or aluminum nitrate; or alumninates such as sodium aluminate, potassium aluminate or ammonium aluminate; or the like.

The Al compound may be added (i) simultaneously when the linear velocity of the oxygen-containing gas reaches not less than two times that upon the production reaction of the seed crystal particles, (ii) during or (iii) after passing the oxygen-containing gas at the linear velocity of not less than two times that upon the production reaction of the seed crystal particles. The addition of the Al compound is preferably conducted (i) simultaneously when the linear velocity of the oxygen-containing gas reaches not less than two tires that upon the production reaction of the seed crystal particles, or (ii) during passing the oxygen-containing gas at the linear velocity of not less than two times that upon the production reaction or the seed crystal particles. When the Al compound is added in parts, continuously or intermittently, the effect of the present invention may not be sufficiently exhibited.

The amount of the Al compound added is usually 5 to 20 atm %, preferably 6 to 15 atm %, more preferably 7 to 12 atm % (calculated as Al) based on whole Fe in the spindle-shaped goethite particles as a final product. When the amount of the Al compound added is less than 5 atm %, the anti-sintering effect may not be obtained. On the other hand, when the amount of the Al compound added is more than 20 atm %, particles other than goethite particles may be produced, so that the magnetic properties of the obtained particles, especially saturation magnetization, may be deteriorated.

Incidentally, prior to the growth reaction of the goethite layer, the obtained goethite seed crystal particles may be aged in a non-oxidative atmosphere before passing the oxygen-containing gas at the linear velocity thereof reaches not less than two times that upon the production reaction of the seed crystal particles. In such a case, the aging may be conducted under the same conditions as those used in the aging treatment conducted before the production reaction of the goethite seed crystal particles.

Next, the spindle-shaped hematite particles according to the present invention are described.

The spindle-shaped hematite particles according to the present invention has an average major axial diameter of usually 0.05 to 0.17 μm, preferably 0.05 to 0.15 μm, more preferably 0.05 to 0.14 μm, still more preferably 0.05 to 0.13 μm, a particle size distribution (standard deviation/average major axial diameter) of usually not more than 0.22, preferably 0.10 to 0.22, more preferably 0.10 to 0.20, an average minor axial diameter of usually 0.010 to 0.025 μm, preferably 0.010 to 0.023 μm, more preferably 0.010 to 0.022 μm, still more preferably 0.010 to 0.020 μm, and an aspect ratio (average major axial diameter/average minor axial diameter) of 4:1 to 8:1, preferably 4:1 to 7.5:1.

The BET specific surface area of the spindle-shaped hematite particles according to he present invention, is usually 30 to 150 m$^2$/g, preferably 50 to 120 m$^2$/g.

The spindle-shaped hematite particles according to the present invention contain cobalt in an amount of usually 8 to 45 atm %, preferably 10 to 40 atm %, more preferably 10 to 35 atm % (calculated as Co) based on whole Fe, aluminum in an amount of usually 5 to 20 atm %, preferably 6 to 15 atm %, more preferably 7 to 12 atm % (calculated as Al) based on whole Fe, and a rare earth element in an amount of preferably 1 to 15 atm %, more preferably 4 to 12 atm %, still more preferably 5 to 10 atm % (calculated as rare earth element) based on whole Fe.

As the suitable rare earth elements, there may be used at least one rare earth element selected from the group consisting of scandium, yttrium, Lanthanum, cerium, praseodymium, neodymium and samarium. Among them, yttrium and neodymium are preferable.

The spindle-shaped hematite particles according to the present invention, comprise a hematite seed portion (core particle), a hematite intermediate layer portion formed on the surface portion of the core particle, and an outer layer portion formed on the surface portion of the intermediate layer portion.

The seed portion of the spindle-shape hematite particles is a portion which is derived from the seed portion of the starting goethite particles. The seed portion is a portion which extends outwardly from the center of each particle. The weight percentage of such a seed portion is usually 30 to 80% by weight, preferably 40 to 70% by weight based on the weight of the seed portion and intermediate layer portion of the hematite particle.

The Co concentration of the seed portion of the hematite particle is represented by the relationship of the Co concentration of the seed portion of the hematite particle with that of the hematite particle. The Co concentration of the seed portion of the hematite particle is expressed by the Co content (atm %) in the seed portion of the hematite particle based on the Fe content in the seed portion of the hematite particle, and the Co concentration of the hematite particle is expressed by the whole Co content (atm %) in the hematite particle based on the whole Fe content in the hematite particle. The relationship of the Co concentration of the seed portion with that of the hematite particle is usually 50 to 95:100, preferably 60 to 90:100, when the Co concentration of the hematite particle is 100.

The intermediate layer portion is which is derived from the surface layer portion of the starting goethite particles. The intermediate layer portion is a portion which extends inwardly from an outer surface of each particle excluding the outer layer portion composed of rare earth element. The weight percentage of toe intermediate layer portion, is usually 20 to 70% by weight, preferably 30 to 60% by weight based on the weight of the seed portion and intermediate layer portion of the hematite particle.

The Co concentration in the intermediate layer portion of the hematite particle is more than that of the seed portion of the hematite particle. The Co concentration of the intermediate layer portion of the hematite particle is represented by the relationship of the Co concentration of the intermediate layer portion of the hematite particle with that of the hematite particle. The Co concentration of the intermediate layer portion of the hematite particle is expressed by the Co content (atm %) in the intermediate layer portion of the hematite particle based on the Fe content in the intermediate layer portion of the hematite particle, and the Co concentration of the hematite particle is expressed by the whole Co content (atm %) in the hematite particle based on the whole Fe content in the hematite particle. The relationship of the Co concentration of the intermediate layer portion with that of the hematite particle is usually 102 to 300:100, preferably 106 to 194:100, when the Co concentration of the hematite particle is 100.

Aluminum may exist only in the intermediate layer portion, and the Al content is usually 5 to 20 atm %, preferably 6 to 15 atm %, more preferably 7 to 12 atm % (calculated as Al) based on whole Fe. When the Al content is less than 5 atm %, the anti-sintering effect may not be obtained. On the other hand, when the Al content is more than 20 atm %, the obtained hematite particles are deteriorated in magnetic properties, especially saturation magnetization.

The outer layer portion may be composed of compounds of rare earth element.

The content of are earth element on the outer layer portion, is preferably 1 to 15 atm %, more preferably 4 to 12 atm %, still more preferably 5 to 10 atm % (calculated as the rare earth element) based on whole Fe. When the content of rare earth element in the outer layer portion is less than 1 atm %, the anti-sintering effect may not be obtained. On the other hand, when the content of rare earth element is more than 15 atm %, the saturation magnetization of the obtained hematite particles may be reduced.

Next, the process for producing the spindle-shaped hematite particles according to the present invention is described.

The spindle-shaped goethite particles used as starting particles may be coated with an anti-sintering agent to impart an anti-sintering property thereto, in advance of the heat-dehydration treatment.

As the anti-sintering agent, there may be used compounds of rare earth elements.

As the suitable compounds of rare earth elements, there may be exemplified compounds containing at least one rare earth element selected from the group consisting of scandium, yttrium, lanthanum, cerium, praseodymium, neodymium, samarium and the like. Examples of the compounds of rare earth elements may include chlorides, sulfates, nitrates, etc., of the above-mentioned rare earth elements. As the method of coating the goethite particles with the compounds of rare earth elements, there may be used either a dry-coating method or a wet-coating method. Among them, the wet-coating method is preferable.

The amount of the compound of the rare earth element uses is preferably 1 to 15 atm %, more preferably 4 to 12 atm %, still more preferably 5 to 10 atm % (calculated as the rare earth element) based on whole Fe. When the amount of the compound of the rare earth element used is less than 1 atm %, a sufficient anti-sintering effect may not be obtained, so that when magnetic metal particles are produced from such hematite particles, the particle coercive force distribution (SFDr) thereof may be deteriorated. On the other hand, when the amount of the compound of the rare earth element used is more than 15 atm %, the saturation magnetization of the obtained particles may be lowered.

In order to enhance the anti-sintering effect, there may be used one or more compounds containing at least one element selected from the group consisting of Al, Si, B, Ca, Mg, Ba and Sr, if necessary. These compounds not only can exhibit the anti-sintering effect, but also can control the reduction rate. Therefore, these compounds may be used in combination depending upon requirements. In the case where the compounds containing the other elements are used in combination with the rare earth compounds, the total amount of the rare earth compounds as the anti-sintering agent and the compounds containing the other elements than the rare earth element is preferably 1 to 15 atm % (calculated as the sum of respective elements) based on whole Fe in the spindle-shaped goethite particles. When the total amount is too small, a sufficient anti-sintering effect may not be obtained. On the other hand, when the total amount is too large, the saturation magnetization of the finally obtained magnetic metal particles may be deteriorated. Accordingly, the amounts of the rare earth compounds and the compounds of the other elements used may be appropriately selected according to the combination thereof to obtain an optimum effect.

By preliminary coating the spindle-shaped goethite particles with the anti-sintering agent or the like, there can be obtained spindle-shaped hematite particles which can be prevented from causing the sintering therewithin or therebetween, and can successively maintain a particle shape and aspect ratio of the spindle-shaped goethite particles, resulting in facilitating the production of independent magnetic metal particles containing iron as a main component which can well maintain the particle shape and the like of the starting goethite particles.

The spindle-shaped hematite particles can be produced by heat-treating he spindle-shaped goethite particles coated with the anti-sintering agent, at a temperature of 400 to 850° C., preferably 450 to 800° C. in a non-reducing atmosphere.

The thus-obtained hematite particles may be washed after the heat-treatment to remove impurity salts such as $Na_2SO_4$ therefrom In this case, the washing of the hematite particles is preferably conducted under such a condition that no anti-sintering agent as the coating layer is eluted out and only unnecessary impurity salts can be removed therefrom.

More specifically, in order to effectively remove cationic impurities, the pH value of the wash water is increased, while in order to effectively remove anionic impurities, the pH value of the wash water is decreased.

The particle shape of the starting spindle-shaped goethite particles is successively maintained, and the spindle-shaped hematite particles according to the present invention has a particle shape gradually tapered from the thick center portion to opposite ends, contain no dendritic particles and, therefore, can show an excellent particle size distribution.

The spindle-shaped hematite particles of second embodiment of the present invention, contain cobalt of usually more than 20 atm % and not more than 45 atm %, preferably 21 to 40 atm %, more preferably 21 to 35 atm % (calculated as Co) based on whole Fe, aluminum of usually 5 to 15 atm %, preferably 6 to 14 atm % (calculated as Al) based on whole Fe, and a rare earth element of usually 5 to 15 atm %, preferably 5 to 12 atm % (calculated as rare earth element) based on whole Fe.

The spindle-shaped hematite particles of second embodiment in the present invention, have an average major axial diameter of preferably 0.05 to 0.14 μm, more preferably 0.05 to 0.13 μm.

The spindle-shaped hematite particles of second embodiment in the present invention, have an aspect ratio (average major axial diameter/average minor axial diameter) of usually 4:1 to 8:1, preferably 4:1 to 7.5:1.

The spindle-shaped hematite particles of second embodiment in the present invention, have a crystallite size ($D_{104}$) of preferably 50 to 80 Å, more preferably 50 to 78 Å.

When the crystallite size ($D_{104}$) is less than 50 Å, the crystal growth of the spindle-shaped hematite particles may be lowered, so that control of the reduction rate may be sometimes insufficient. Further, due to destruction of the particle shape, it is sometimes difficult to obtain the aimed high coercive force. On the other hand, when the crystallite size ($D_{104}$) is more than 80 Å, due to excessive crystal growth of the spindle-shaped hematite particles, the crystal growth in the minor axial direction may also accelerated, so that he shape-anisotropy tends to be lowered and it is sometimes difficult to obtain a high coercive force.

The spindle-shaped hematite particles of second embodiment in the present invention, have a saturation magnetization ($\sigma s$) of preferably 0.5 to 2 emu/g, more preferably 0.5 to 1.5 emu/g.

When the saturation magnetization ($\sigma s$) is less than 0.5 emu/g, the spindle-shaped hematite particles show a good particle size distribution, but the magnetic spindle-shaped metal particles produced therefrom may be sometimes deteriorated in dispersibility in vehicle. On the other hand, when the saturation magnetization ($\sigma s$) is more than 2 emu/g, a large amount of spinel compounds may be produced upon the heat dehydration due to the cobalt contained therein, so that the crystal growth in the minor axial direction may be caused. Further, in the case where the crystal growth becomes excessive, the destruction of particle shape tends to be caused, so that it is sometimes difficult to obtain magnetic spindle-shaped metal particles having a high coercive force.

The spindle-shaped hematite particles of second embodiment in the present invention, have an average minor axial diameter of preferably 0.010 to 0.022 μm, more preferably 0.010 to 0.020 μm.

The particle size distribution (standard deviation/average major axial diameter) of the spindle-shaped hematite of second embodiment in the present invention, is usually not more than 0.22, preferably 0.10 to 0.22, more preferably 0.10 to 0.20, still more preferably 0.10 to 0.19.

The spindle-shaped hematite particles of second embodiment in the present invention, have a BET specific surface area of usually 30 to 150 m²/g, preferably 50 to 120 m²/g.

Next, the magnetic spindle-shaped metal particles containing iron as a main component according to the present invention are described.

The magnetic spindle-shaped metal particles containing iron as a main component according to the present invention, have an average manor axial diameter of usually 0.05 to 0.15 μm, preferably 0.05 to 0.14 μm, more preferably 0.05 to 0.13 μm, a particle size distribution (standard deviation/average major axial diameter) of usually not more than 0.20, preferably 0.10 to 0.20, more preferably 0.10 to 0.19, still more preferably 0.10 to 0.18, and an average minor axial diameter of usually 0.010 to 0.022 μm, preferably 0.010 to 0.020 μm, more preferably 0.010 to 0.018 μm and an aspect ratio (average major axial diameter/average minor axial diameter) of usually 4:1 to 8:1, preferably 4:1 to 7.5:1, preferably 4:1 to 7:1.

The BET specific surface area of the magnetic spindle-shaped metal particles containing iron as a main component according to the present invention, is usually 35 to 65 m²/g, preferably 40 to 60 m²/g.

The magnetic spindle-shaped metal particles containing iron as a main component according to the present invention, may contain cobalt in an amount of usually 8 to 45 atm %, preferably 10 to 40 atm %, more preferably 10 to 35 atm % (calculated as Co) based on whole Fe, aluminum in an amount of usually 5 to 20 atm %, preferably 6 to 15 atm %, more preferably 7 to 12 atm % (calculated as Al) based on whole Fe, and a rare earth element in an amount of usually 1 to 15 atm %, preferably 4 to 12 atm % (calculated as rare earth element) based on whole Fe.

The magnetic spindle-shaped metal particles containing iron as a main component according to the present invention, further have a coercive force of usually 1,800 to 2,500 Oe, preferably 1,900 to 2,500 Oe, more preferably 2,000 to 2,500 Oe, preferably 2,200 to 2,500 Oe, and a saturation magnetization σs of usually 110 to 160 emu/g, preferably 120 to 160 emu/g, more preferably 130 to 160 emu/g.

The particle coercive force distribution (SFDr) of the magnetic spindle shaped metal particles according to the present invention on which is obtained from the remanence (DC-erased residual magnetization) curve, is usually not more than 0.72, preferably not more than 0.718.

The X-ray crystallite size $D_{110}$ of the magnetic spindle-shaped metal particles according to the present invention, is usually 12.0 to 17.0 nm, preferably 13.0 to 16.5 nm, more preferably 13.0 to 16.0 nm.

The magnetic spindle-shaped metal particles containing iron as a main component according to the present invention, further have a change (Δσs) in saturation magnetization (σs) with passage of time of usually not more than 15%, preferably not more than 10%, more preferably not more than 8% (as an absolute value) after being subjected to an accelerated deterioration test for one week at a temperature of 60° C. and a relative humidity of 90%.

The magnetic spindle-shaped metal particles containing iron as a main component according to the present invention, further have good sheet characteristics which means magnetic characteristics obtained when forming a magnetic coating film, more specifically a sheet squareness (Br/Bm) of usually not less than 0.85, preferably not less than 0.86, and a sheet SFD (sheet coercive force distribution) of usually not more than 0.44, preferably not more than 0.42, preferably not more than 0.40.

Next, the magnetic spindle-shaped metal particles containing iron as a main component which are produced by using the spindle-shaped hematite particles of the above second embodiment in the present invention are described.

The magnetic spindle shaped metal particles containing iron as a main component of second embodiment in the present invention, may contain cobalt in an amount of usually more than 20 atm % and not more than 45 atm %, preferably 21 to 40 atm %, more preferably 21 to 35 atm % (calculated as Co) based on whole Fe, aluminum in an amount of usually 5 to 15 atm %, preferably 6 to 14 atm % (calculated as Al) based on whole Fe, and a rare earth element in an amount of 5 to 15 atm %, preferably 5 to 12 atm % (calculated as rare earth element) based on whole Fe.

The magnetic spindle-shaped metal particles containing iron as a main component of second embodiment in the present invention, have an average major axial diameter of usually 0.05 to 0.14 μm, preferably 0.05 to 0.13 μm, an aspect ratio (average major axial diameter/average minor axial diameter) of usually 4:1 to 8:1, preferably 4:1 to 7.5:1, an X-ray crystallite size $D_{110}$ of usually 12.0 to 17.0 nm, preferably 13.0 to 16.5 nm, a particle size distribution (standard deviation/average major axial diameter) of usually not more than 0.18, preferably 0.10 to 0.18, more preferably 0.10 to 0.17, and an average minor axial diameter of usually 0.010 to 0.020 μm, preferably 0.010 to 0.018 μm.

The magnetic spindle-shaped metal particles containing iron as a main component of second embodiment in the present invention, further have a BET specific surface area of usually 35 to 65 m²/g, preferably 40 to 60 m²/g.

The magnetic spindle-shaped metal particles containing iron as a main component of second embodiment in the present invention, further have a coercive force of usually 2,000 to 2,500 Oe, preferably 2,100 to 2,500 Oe, and a saturation magnetization σs of usually 130 to 160 emu/,g, preferably 135 to 160 emu/g.

The magnetic spindle-shaped metal particles containing iron as a main component of second embodiment in the present invention, further have a change (Δσs) in saturation magnetization as with passage of time (oxidation stability) of usually no more than 10%, preferably not more than 8% (as an absolute value) after being subjected to an accelerated deterioration test for one week at a temperature of 60° C. and a relative humidity of 90%.

As to characteristics of the magnetic coating film produced by using the magnetic spindle-shaped metal particles containing iron as a main component of second embodiment in the present invention, the sheet squareness (Br/Bm) is usually not less than 0.85, preferably not less than 0.86, and he sheet SFD is usually less than 0.40, preferably not more than 0.39.

Further, as to the characteristics of the magnetic coating film, the change (ΔBm) in saturation magnetic flux density (Bm) with passage of time which represents a weather resistance of the magnetic coating film after subjected to an accelerated deterioration test for one week at 60° C. and a relative humidity of 90%, is usually not more than 8%, preferably not more than 6% as an absolute value.

Next, the process for producing the magnetic spindle-shaped metal particles containing iron as a main component according to the present invention, is described.

In accordance with the present invention, the magnetic spindle-shaped metal particles containing iron as a vain component may be produced either by treating he spindle-shaped goethite particles according to the present invention, with the above anti-sintering agent, and then directly heat-reducing the thus-treated particles, or by heat-reducing the spindle-shaped hematite particles according to the present invention.

Further, the magnetic spindle-shaped metal particles containing iron as a main component may also be produced by continuously subjecting the spindle-shaped goethite particles treated with the anti-sintering agent, to heat-treatment in a non-reducing atmosphere and then to heat-reduction in a reducing atmosphere Although the aimed magnetic spindle-shaped metal particles containing iron as a main component may be produced by directly reducing the spindle-shaped goethite particles treated with the anti-sintering agent, in order to attain well-controlled magnetic properties, particle properties and particle shape, it is preferred that the spindle-shape goethite particles treated with the anti-sintering agent are preliminary heat-treated in the non-reducing atmosphere by an ordinary method in advance of the heat-reduction.

The non-reducing atmosphere may be formed by a gas flow or a gas stream composed of at least one gas selected from the group consisting of air, an oxygen gas, a nitrogen gas and the like. The heat-treatment temperature may be in the range of 400 to 850° C., and it is preferred that the heat-treatment temperature is appropriately selected depending upon kind of compounds used for coating the spindle-shaped goethite particles. When the heat-treatment temperature is more than 850° C., deformation of particles or sintering within or between particles tends to be disadvantageously caused.

In the process according to the present invention, the heat-reducing temperature is preferably 400 to 700° C. When the heat-reducing temperature is less than 400° C., the reduction reaction proceeds too slowly, so that the process time is disadvantageously prolonged. On the other hand, when the heat-reducing temperature is more than 700° C., the reduction reaction proceeds too rapidly, so that there tend to be caused disadvantages such as deformation of particles or sintering within or between particles.

The magnetic spindle-shaped metal particles containing iron as a main component according to the present invention which are obtained after the heat-reduction, may be taken out in air by known methods, e.g., by a method of immersing in an organic solvent such as toluene; a method of replacing the atmosphere or the magnetic spindle-shaped metal particles containing iron as a main component which are produced after the heat-reduction, with an inert gas, and then gradually increasing an oxygen content in the atmosphere until the atmosphere is finally replaced with air; a method of gradually conducting the oxidation using a mixed gas composed of oxygen and steam; or the like.

Alternatively, the magnetic spindle-shaped metal particles containing iron as a main component according to the present invention, may be produced by the following method. That is, either spindle-shaped goethite particles containing cobalt in an amount of usually 20 to 45 atm % (calculated as Co) based on whole Fe and having a major axial diameter of usually 0.05 to 0.15 $\mu$m, or spindle-shaped hematite particles obtained by heat-dehydrating such spindle-shaped goethite particles, are used as starting particles. The starting particles are charged into a fixed-bed reducing apparatus so as to form a fixed-bed having a height of usually not more than 30 cm, preferably 3 to 30 cm therein. Thereafter, the temperature within the reducing apparatus is increased to 400 to 700° C. in an inert gas atmosphere. After replacing the inert gas atmosphere with a reducing gas atmosphere, the starting material are reduced at 400 to 700° C. while passing the reducing gas therethrough at a linear velocity of 40 to 150 cm/s, thereby producing magnetic spindle-shaped metal particles containing iron as a main component.

Next, various conditions required for carrying out the present invention, are described.

In the present invention, as starting particles, there may be used the spindle-shaped goethite particles containing cobalt of usually 20 to 45 atm % (calculated as Co) based on whole Fe and having an average major axial diameter of usually 0.05 to 0.15 $\mu$m, or the spindle-shaped hematite particles obtained by heat-dehydrating such spindle-shaped goethite particles, as described above. The spindle-shaped hematite particles may contain cobalt of usually 20 to 45 atm % (calculated as Co) based whole Fe and have average major axial diameter of usually 0.05 to 0.13 $\mu$m.

The starting particles used in the present invention are spindle-shaped particles. The starting spindle-shaped particles contain no dendritic particles and show an excellent particle size distribution.

In the consideration of the anti-sintering effect or the control of reducing rate, it is preferred that the spindle-shaped goethite particles according to the present invention have an average minor axial diameter of preferable 0.010 to 0.023 $\mu$m, an aluminum content of preferable 5 to 15 atm % (calculated as Al) based on whole Fe, an aspect ratio (average major axial diameter/average minor axial diameter) of usually 4:1 to 8:1, and a BET specific surface area of usually 100 to 250 m$^2$/g.

The spindle-shaped goethite particles according to the present invention, may be coated with Co compounds, Al compounds and the afore-mentioned anti-sintering agents.

In order to further enhance the anti-sintering effect, one or more compounds containing at least one other element selected from the group consisting of Si, B, Ca, Mg, Ba, Sr and the like, may be added, if required. These compounds show not only the anti-sintering effect, but also can control the reduction rate. Therefore, these compounds may be used singly or in combination according to the requirements.

In the consideration of the anti-sintering effect and the control of reduction rate, it is preferred that the spindle-shaped hematite particles according to the present invention, further have an average minor axial diameter of preferably 0.010 to 0.022 $\mu$m, an aluminum content of preferably 5 to 15 atm % (calculated as Al) based on whole Fe, a rare earth content of usually 5 to 15 atm % (calculated as rare earth element) based on whole Fe, an aspect ratio (average major axial diameter/average minor axial diameter) of usually 4:1 to 8:1, and a BET specific surface area of usually 50 to 120 m$^2$/g.

The spindle-shaped hematite particles according to the present invention, are preferably produced by heat-dehydrating the spindle-shaped goethite particles at 150 to 350° C. in an oxidative atmosphere, and then heat-treating the obtained particles at a temperature of more than 450° C. and less than 700° C. in the same atmosphere.

Further, after the heat-treatment, in order to remove impurity salts such as Na$_2$SO$_4$ which are contained due to the production reaction of the spindle-shaped goethite particles, the spindle-shape hematite particles may be washed. In this case, the washing treatment is preferably conducted under such a condition that no coating anti-sintering agent is eluted out and only the impurity salts are removed.

As the heat-reducing apparatuses usable in the heat-reduction step, there are known a fluidized bed-type reducing apparatus for heat-reducing a starting material while flowing the material in the form of particles, a fixed bed-type reducing apparatus for heat-reducing a fixed bed composed of granules obtained by granulating the starting material.

With the increased demand for magnetic metal particles, there has been a strong requirement for providing mass-production techniques therefor. Consequently, the fixed bed-type reducing apparatus is industrially and economically advantageous, since t is possible to mass-produce magnetic metal particles without scattered particles even when the flow rate of a reducing gas such as hydrogen is increased.

However, in the case where the heat-reduction is carried out in a nyarogen atmosphere using the fixed bed-type reducing apparatus, a lower portion of the fixed bed is more rapidly reduced than an upper portion thereof, thereby causing the increase in steam partial pressure. Therefore, he particles in the upper portion of the fixed bed are more likely to undergo destruction of particle shape and to bring about crystal growth in the minor axial direction, as compared to those in the lower portion. As a result, there is a tendency that properties of the particles obtained from the lower portion of the fixed bed are different from those of the upper portion.

On the other hand, by the production process according to the present invention using a fixed bed-type reducing apparatus, there is provided particles obtained from lower and upper portions of the fixed bed in the reducing apparatus can show uniform properties, in which the destruction of particle shape can be prevented as effectively as possible.

In the present invention, before charging into the fixed-bed reducing apparatus, it is preferred that the starting particles are granulated by an ordinary method to obtain granules having an average particle size of usually 1 to 5 mm, preferably 2 to 4 mm.

As the preferred fixed-bed reducing apparatuses, there may be exemplified a stationary reducing apparatus (batch-type), or a movable reducing apparatus (continuous-type) in which a fixed-bed is formed on a movable belt and reduced while moving the belt.

In the present invention, the height of the fixed-bed composed of the starting particles is usually not more than 30 cm. When the height is more than 30 cm, the reduction reaction of the fixed-bed may be remarkably accelerated due to a large content of Co. However, a lower portion of the fixed-bed undergoes too rapid reduction reaction, so that a water-vapor partial pressure may be considerably increased, thereby causing problems such as deterioration in coercive force of an upper portion of the fixed-bed. This results in deteriorating properties of the obtained particles as a whole. From the viewpoint of industrial productivity, the height of the Fixed-bed is preferably 3 to 30 cm. The batch-type reducing apparatuses (Japanese Patent Application Laid-Open (KOKAI) Nos. 54-62915(1979) and 4-224609(1992), etc.) are different in productivity from continuous-type reducing apparatuses (Japanese Patent Application Laid-Open (KOKAI) No. 6-93312(1994), etc.). Therefore, in the case of the batch-type fixed-bed reducing apparatuses, the height of the fixed-bed is preferably more than 8 cm and not more than 30 cm, more preferably 10 to 30 cm.

In the process using the fixed-bed reducing apparatuses according to the present invention, the atmosphere in which the reducing temperature is increased to 400 to 700° C., is an inert gas atmosphere. As the preferred inert gases used therefor, there may be exemplified a nitrogen gas, a helium gas, an argon gas or the like. Among them, the nitrogen gas is more preferred. In an atmosphere other than the inert gas atmosphere, the particles are reduced during the temperature rise (during which the temperature is changed with passage of time) before reaching a predetermined reducing temperature. Therefore, since the reducing temperature upon production of he magnetic metal particles varies, a uniform crystal growth may not be attained and a high coercive force may not be obtained.

Incidentally, the temperature rise rate is preferably 2 to 100° C./min, more preferably 5 to 100° C./min.

The linear velocity of the inert gas upon the temperature rise may be adjusted such that the granules as the starting particles is prevented from being scattered or destroyed. In the present invention, the linear velocity of the inert gas is preferably 10 to 50 cm/s, more preferably 20 to 50 cm/s.

Meanwhile, the method of changing-over the inert gas atmosphere upon the temperature rise to the reducing gas atmosphere upon the heat reduction step, varies depending upon kinds of reducing apparatuses used. From the industrial viewpoint, in the case of the batch-type reducing apparatuses, the charging-over of the atmosphere is preferably conducted stepwise while controlling an inner pressure thereof, and in the case of the continuous-type reducing apparatuses, the temperature rise zone is preferably separated from the reducing zone. In any case, it is preferred that the changing-over is completed in a short time, specifically within 10 minutes.

The atmosphere used upon the heat-reduction step according to the present invention, may be a reducing gas atmosphere. As the reducing gas used for forming the reducing gas atmosphere, hydrogen is preferred.

The heat-reducing temperature of the heat-reduction step in the process using the fixed-bed reducing apparatuses according to the present invention, is 400 to 700° C. The heat-reducing temperature can be appropriately selected from the above-mentioned temperature range according to kind and amount of the compound used for coating the starting particles. When the heat-reducing temperature is less than 400° C., the reduction reaction proceeds too slowly and, therefore, may be industrially disadvantageous, so that the saturation magnetization of the obtained magnetic metal particles may be lowered. On the other hand, when the heat-reducing temperature is more than 700° C., the reduction reaction proceeds too rapidly, so that the destruction of particle shape or the sintering within or between particles may be caused, resulting in deterioration in coercive force of the obtained particles.

The linear velocity of the reducing gas used in the heat-reduction step according to the present invention, is 40 to 150 cm/s, preferably 50 to 150 cm/s. When the linear velocity of the reducing gas is Loss than 40 cm/s, the steam produced upon reduction of the starting particles may be discharged out of the system too slowly, so that the upper portion of the fixed-bed may be deteriorated in coercive force and SFD, thereby failing to obtain a high coercive force as a whole. On the other hand, when the linear velocity of the reducing gas is more than 150 cm/s, although the aimed magnetic spindle-shaped metal particles can be obtained, it may be required to use a higher heat-reducing temperature, or there tend to be caused problems such as scattering and destruction of the granulated material.

On the other hand, by the production process according to the present invention using a fixed bed-type reducing apparatus, there can be provided magnetic spindle-shaped metal particles containing iron as a main component, having a high coercive force, for example, preferably not less than 2,100 Oe, and a large saturation magnetization, for example, preferably not less than 135 emu/g, though the crystallite size ($D_{110}$) thereof is small, especially, preferably not more than 160 Å.

The thus obtained magnetic spindle-shaped metal particles containing iron as a main component, contain cobalt in an amount of preferably 20 to 45 atm %, more preferably 20 to 40 atm %, still more preferably 20 to 35 atm % (calculated as Co) based on whole Fe, and have an average major axial diameter of preferably 0.05 to 0.12 $\mu$m, a coercive force of 2,100 to 2,500 Oe, a saturation magnetization of 135 to 160 emu/g and a crystallize size ($D_{110}$) 135 to 160 Å.

Meanwhile, with reference to the relationship between crystallite size and coercive force of known spindle-shaped magnetic metal particles, in Japanese Patent Application Laid-Open (KOKAI) No. 4-61302(1992), it has been described that "there is a tendency that the smaller the crystallite size, the lower the coercive force . . . it has been strongly demanded to provide magnetic particles capable of exhibiting a small crystallite size while keeping the coercive force thereof as high as possible". Thus, since the reduction of crystallite size and the increase of coercive force have a conflicting relationship with each other, it has been extremely difficult to obtain magnetic metal particles having a small crystallite size and a high coercive force simultaneously.

In fact, in the method described in the above Japanese Patent Application Laid-Open (KOKAI) No. 54-62915 (1979), the Co content is small and the linear velocity of gas passed is low, so that the coercive force of the obtained magnetic metal particles is as low as about 120 Oe. In addition, as shown in Comparative Example hereinafter, since the coercive force is extremely low and the crystallite size is considerably small, properties of the magnetic metal particles are not satisfactory.

Also, in the method described in the above Japanese Patent Application Laid-Open (KOKAI) No. 6-93312 (1994), the obtained particles contain no Co. In addition, as shown in Comparative Example hereinafter, when the atmosphere upon temperature rise is composed of a reducing gas, the coercive force of the obtained magnetic metal particles is as low as about 1,600 Oe. Further, in comparison with particles obtained in Examples of the present invention as described hereinafter, in the case of the same crystallite size, the conventional magnetic metal particles show a lower coercive force and a smaller saturation magnetization. Therefore, properties of such conventional magnetic metal particles are not satisfactory.

In order to improve a particle shape or the like of the goethite particles used as starting particles of the magnetic metal particles containing iron as a main component, various metal salts may be added thereto. In this case, cobalt can act for forming a solid solution with Fe in the magnetic metal particles produced and, therefore, can enhance the saturation magnetization and the coercive force Hc thereof, and also contribute to enhancement of the oxidation stability aluminum can impart an anti-sintering property to the magnetic metal particles produced, and further can impart thereto an excellent shape-retention property and an excellent dispersibility in a binder resin having sodium sulfonate functional groups, which resin has beer ordinarily used in the production of magnetic recording media containing magnetic metal particles.

It is known that in the case where cobalt exists inside of goethite particles, the magnetic metal particles obtained therefrom can show a larger saturation magnetization as compared to that of the particles wherein Co exists in an outside portion thereof. It is also known that in the case where the goethite particles are coated with Al, magnetic properties such as coercive force of the magnetic metal particles obtained therefrom are deteriorated and, therefore, it is preferred that Al exists in the form of a solid solution in a surface layer portion of each particle, thereby enhancing the shape-retention property and the oxidation stability.

Further, it is also known that in the case where Co is allowed to form a solid solution and both alkali carbonate and alkali hydroxide are jointly used in the production reaction of goethite particles, there can be obtained fine goethite particles which have a small minor axial diameter, resulting in an appropriately large aspect ratio. It is also known that Al snows a crystal growth-controlling effect, and considerably different aspect ratios are obtained by varying the timing of addition of Al or the amount of Al added. However, there is known no goethite particles which are fine particles, can show maintain an appropriate aspect ratio and an excellent particle size distribution, and contain a large amount of Co and Al therein.

Under the circumstances, by dividing the production reaction of goethite particles into a seed crystal production reaction and a growth reaction, adding Co showing effects of forming fine particles and appropriately enhancing an aspect ratio, upon the aging treatment before the seed crystal production reaction, allowing Co to form a solid solution such that the Co exists in the goethite seed portion at a lower concentration gradient than that in the surface layer portion, passing an oxygen-containing gas upon the growth reaction of the goethite seed crystal particles at a linear velocity which is not less than two times that upon the seed crystal production reaction, and adding Al having an anti-sintering effect simultaneously with or subsequently to the passing step of the oxygen-containing gas, there can be obtained spindle-shaped goethite particles which are free from deterioration in aspect ratio due to the addition of a large amount of Al, are fine particles, can show an appropriate aspect ratio and an excellent particle size distribution, and contain an large amount of Co and Al.

The reason why the spindle-shaped goethite particles containing a large amount of Co and Al can be produced, is considered as follows. That is, it has been hitherto considered that although the crystal growth in the major axial direction can be appropriately suppressed by adding Al during the growth reaction of the seed crystal particles, the addition of a large amount of Al causes the increase in viscosity of the water suspension containing the seed crystal particles, so that there arise problems such as deterioration in aspect ratio and particle size distribution due to excessive crystal growth in the minor axial direction. However, by adjusting the linear velocity of the oxygen-containing gas passed upon the growth reaction to not less than two times that upon the seed crystal production reaction, the viscosity of the water suspension containing the seed crystal particles is effectively reduced, so that it is possible to form a more uniform surface layer over the surface of each seed crystal particle.

Further, when the magnetic metal particles containing iron as a main component are produced by subjecting goethite particles to heat-dehydration and then reduction reaction, by using compounds of rare earth element as an anti-sintering agent, there can be obtained magnetic spindle-shaped metal particles containing iron as a main component, which are free from inclusion of dendritic particles, and can show not only an excellent particle size distribution, an appropriate particle shape and an appropriate aspect ratio, but also a high coercive force, an excellent particle coercive force distribution (particle SFDr), a large saturation magnetization and an excellent oxidation stability. Further, when the obtained magnetic spindle-shaped metal particles and a binder resin having sodium sulfonate functional groups are mixed and formed into a sheet, it is possible to obtain good sheet characteristics such as sheet squareness (Br/Bm) and sheet SFD (coercive force distribution).

Alternatively, there can be obtained preferable spindle-shaped hematite particles which have an average manor axial diameter of 0.05 to 0.14 $\mu$m, an aspect ratio of 4:1 to 8:1, a crystallite size ($D_{104}$) of 50 to 80 Å and a saturation magnetization of 0.5 to 2 emu/g, and contain cobalt in an amount of more than 20 atm % and not more than 45 atm % (calculated as Co) based on whole Fe, aluminum in an amount of 5 to 15 atm % (calculated as Al) based on whole Fe, and a rare earth compound in an amount of 5 to 15 atm % (calculated as rare earth element) based on whole Fe. The thus-obtained spindle-shaped hematite particles can be prevented as more effectively as possible from undergoing destruction of the particle shape upon the heat-reduction step.

The reason why the destruction of particle shape can be prevented as more effectively as possible, is considered as follows. That is, it is considered that the merit is attributed to a synergistic effect of the suppression of the production of spinel-type iron oxide in the spindle-shaped hematite particles, the an appropriate crystallite size, and the containing of aluminum and rare earth element in specific amounts.

Further, it is considered that since the spindle-shaped goethite particles s heat-dehydrated at not more than 350° C. in an oxidative atmosphere and then heat-treated at 450 to 700° C. in an oxidative gas atmosphere, the production of spinel-type iron oxide can be effectively suppressed and, therefore, the destruction of particle shape can be prevented as effectively as possible, so that it is possible to produce spindle-shaped hematite particles having an appropriate crystallite size and a good particle size distribution.

By using such spindle-shaped hematite particles, it is possible to produce magnetic spindle-shaped metal particles containing iron as a main component, which can be prevented from undergoing destruction of particle shape and deterioration in coercive force, and can show an excellent dispersibility in vehicle.

Further, since cobalt is contained in an amount of more than 20 atm % and not more than 45 atm % (calculated as Co) based on whole Fe, the oxidation stability of the resultant particles can also be enhanced. Furthermore, since the anti-sintering property is further enhanced as described above, the distribution of particle shape upon various heat-treatments can be further improved, so that the particle size distribution becomes narrower, thereby producing magnetic spindle-shaped metal particles which are synergistically improved in oxidation stability.

In the case where the spindle-shaped hematite particles according to the present invention is used as starting particles, there can be obtained magnetic spindle-shaped metal particles containing iron as a main component, which can show a high coercive force, a large saturation magnetization, an excellent oxidation stability and a good dispersibility in a binder resin. Further, when the magnetic spindle-shaped metal particles are used for forming a magnetic coating film, it is possible to produce a magnetic coating film which can exhibit a high coercive force, a good sheet squareness (Br/Bm), a good sheet SFD and a good weather resistance.

The reason why the magnetic metal particles having a small crystallite size, a high coercive force and a large saturation magnetization irrespective of the small crystallite size can be produced, is considered as follows. That is, by adjusting the height of the fixed-bed to not more than 30 cm and increasing the temperature in an inert gas atmosphere, the crystallite size of magnetite or wustite can be increased to such an extent that neither destruction of the particle shape nor crystal growth in the minor axial direction are induced due to rapid increase of the water-vapor partial pressure at an initial stage of the reduction reaction. Further, due to the effects of lowering the specific surface area and decreasing the velocity of subsequent reduction reaction into pure iron, the crystal growth of particles can be well controlled and the destruction of particle shape can be considerably suppressed. As a result, it is considered that the crystallite size can be effectively reduced.

Further, by adjusting the height of the fixed-bed to not more than 30 cm, preferably 3 to 30 cm and increasing the temperature in the inert gas atmosphere, the reduction reaction can be inhibited during such a period in which the temperature is elevated with passage of time, till reaching the predetermined reducing temperature, thereby conducting the reduction reaction under a uniform condition. Further, by changing-over the inert gas atmosphere to the reducing gas atmosphere and controlling the linear velocity of the reducing gas to 40 to 150 cm/s in the specific temperature range, even though the water-vapor partial pressure is rapidly increased at an initial stage of the reduction reaction, neither destruction of particle shape of magnetite or wustite nor crystal growth in the minor axial direction are induced, so that the reduction reaction can proceed uniformly over a whole portion of the fixed-bed. For this reason, it is considered that the obtained magnetic spindle-shaped metal particles can show a high coercive force and a large saturation magnetization vale as a whole.

The spindle-shaped goethite particles and the spindle-shaped hematite according to the present invention, are fine particles and free from inclusion of dendritic particles, and can exhibit a good particle size distribution and an appropriate particle shape. Therefore, when these particles are used as starting particles, the obtained magnetic spindle-shaped metal particles containing iron as a main component not only are fine particles and free from inclusion of dendritic particles and can exhibit a good particle size distribution and an appropriate particle shape, but also can show a high coercive force, an excellent particle coercive force distribution (SFDr), a large saturation magnetization, an excellent oxidation stability, a good dispersibility in a binder resins and a good sheet squareness (Br/Bm) due to the good dispersibility in a binder resin. Accordingly, the magnetic spindle-shaped metal particles containing iron as a main component according to the present invention, can be suitably used as magnetic particles for attaining high recording density, high sensitivity and high output.

Since the spindle-shaped hematite particles according to the present invention have a limited content of spinel-type iron oxide and an appropriate crystallite size, the destruction of particle shape upon the heat-reduction thereof can be prevented as effectively as possible. Accordingly, the spindle-shaped hematite particles according to the present invention car be suitably used as starting particles of the magnetic spindle-shaped metal particles containing iron as a main component.

In the process for producing the magnetic spindle-shaped metal particles containing iron as a man component according to the present invention, the destruction of particle shape upon the heat-reduction step can be prevented as effectively as possible, and the upper and lower portions of the fixed-bed composed of the starting particles can be uniformly reduced. As a result, it becomes possible to obtain magnetic spindle-shaped metal particles satisfying a small crystallite size, a high coercive force and a large saturation magnetization simultaneously.

EXAMPLES

The present invention will now be described in more detail with reference to the following examples, but the present invention is not restricted to those examples and various modifications are possible within the scope of the invention.

(1) The average major axial diameter, the average minor axial diameter and the aspect ratio of particles were respectively expressed by the average of values measured from electron micrographs.

(2) The size distribution of the particles is expressed by the ratio of a standard deviation to the average major axial diameter.

The major axial diameters of 300 Particles in an electron microphotograph (×200,000 magnification) were measured. The actual major axial diameters and the number of the particles were obtained from the calculation on the basis of the measured values.

The standard deviation (s) was obtained by the following equation.

$$s = \sqrt{\sum_{i=1}^{n}(x_1 - \bar{x})^2/n}$$

wherein $x_1$, $x_2$, , $x_n$ represent the determined major axial diameter of the each specimen, $\bar{x}$ represents an average major axial diameter determined of the each specimen.

(3) The specific surface area of particles was expressed by the values measured by a BET method using "Monosorb MS-11" (manufactured by Cantachrom Co., Ltd.).

(4) The X-ray crystallite size ($D_{020}$ and $D_{110}$ of spindle-shaped goethite particles, $D_{104}$ of spindle-shaped hematite particle or $D_{110}$ of spindle-shaped magnetic metal particles containing iron as a main component) was expressed by the thickness of crystallite in the direction perpendicular to the crystal planes (020) and (110) of the spindle-shaped goethite particles, the crystal plane (104) of the spindle-shaped hematite particle or he crystal plane (110) of the spindle-shaped magnetic metal particles containing iron as a main component which were measured by an X-ray diffraction method using "X-ray diffractometer" (manufactured by Rigaku Denki Kogyo Co., Ltd.) (measuring conditions: target: Fe; tube voltage: 40 kV; and tube current: 40 mA), respectively. The value was calculated from the X-ray diffraction peak curve obtained with respect to the respective crystal planes by using the following Scherrer's formula:

$$D_{110}, D_{020} \text{ or } D_{104} = K\lambda/\beta \cos\theta$$

wherein $\beta$ is a true half-width of the diffraction peak which was corrected with respect to the width of machine used (unit: radian); K is a Scherrer constant (0.9); $\lambda$ is a wavelength of X-ray (Fe K$\alpha$-ray 0.1935 nm); and $\theta$ is a diffraction angle (corresponding to a diffraction peak of the crystal plane (110) and (020) and the crystal plane (104)).

The X-ray diffraction of spindle-shaped hematite particles was measured at a diffraction angle 2$\theta$ of 10 to 60° using the above X-ray diffractometer.

The smaller the production amount of the spinel-shaped iron oxide (the lower the peak shown with "B" in the X-ray diffraction peak curve), the lower the $\sigma$s of the spinel-shaped hematite particles becomes.

(5) The magnetic properties or magnetic metal particles containing iron as a main component and hematite particles, were measured using a vibration sample magnetometer "VSM-3S-15" (manufactured by Toei Kogyo Co., Ltd.) by applying an external magnetic field of 10 kOe.

(6) The SFDr of particles was measured using a torque/vibration sample magnetometer (manufactured by Digital Measurement Systems Co., Ltd.) as follows.

The magnetic metal particles containing iron as a main component were first packed into a capsule. After an external magnetic field of 10 kOe was applied to the magnetic metal particles (the direction of the initially applied external magnetic field was regarded as a positive direction), the magnetic field was set to zero to measure a residual magnetization $\sigma$r (0) of the particles. Thereafter, an external magnetic field of 100 Oe was applied in the reverse direction (negative direction), and then the magnetic field was set to zero to measure a residual magnetization $\sigma$r (100) of the particles. Next, an external magnetic field of 10 kOe was applied again in the positive direction, and the magnetic field was set to zero to measure a residual magnetization $\sigma$r (0) of the particles. Then, after an external magnetic field of 200 Oe was applied in the negative direction, the magnetic field was set to zero to measure a residual magnetization $\sigma$r (200) of the particles. Subsequently, the measurement of the residual magnetization was repeated n times in such a manner that the external magnetic field applied in the positive direction was kept constant at 10 KOe each time, while that applied in the negative direction was increased with an increment of 100 Oe, thereby obtaining residual magnetizations $\sigma$r (100×n). The measured values of the residual magnetization $\sigma$r were plotted based on the values of external magnetic field applied in the negative direction, thereby obtaining a remanence (DC-erased residual magnetization) curve. Using the remanence curve, an external magnetic field value Hr at which the residual magnetization was zero was obtained by interpolation method. Further, the half-width value $\Delta$Hr of the peak on a differential curve of the above remanence curve was obtained. The SFDr value of particles was calculated from the following formula:

$$SFDr = \Delta Hr/Hr$$

(7) The contents of Co, Al, rare earth elements and other metal elements in the spindle-shaped goethite particles, the spinel-shaped hematite particles or the magnetic spindle-shaped metal particles containing iron as a main component, were measured by using an inductively coupled plasma atomic emission spectroscope "SPS4000" (manufactured by Servko Denshi Kogyo Co., Ltd.).

(8) The sheet magnetic characteristics were measured by using a sheet test specimen prepared by the following method.

The respective components as show below were charged into a plastic bottle, and then mixed and dispersed together for 8 hours using a paint shaker (manufactured by Reddevil Co., Ltd.), thereby preparing a magnetic coating material. The thus-prepared magnetic coating material was applied on a 25 $\mu$m-thick polyethylene telephthalate film using an applicator, and then cried in a magnetic field of 5 kGauss, thereby obtaining the sheet test specimen on which a magnetic coating layer having a thickness of 50 $\mu$m was formed.

| Composition of magnetic paint | |
|---|---|
| 3 mm$\phi$ steel balls | 800 parts by weight |
| Magnetic spindle-shaped metal particles containing iron as a main component | 100 parts by weight |
| Polyurethane resin containing sodium sulfonate groups | 20 parts by weight |
| Cyclohexanone | 83.3 parts by weight |
| Methyl ethyl ketone | 83.3 parts by weight |
| Toluene | 83.3 parts by weight |

(9) The $\Delta\sigma$s for evaluating an oxidation stability of the saturation magnetization $\sigma$s of particles, and the $\Delta$Bm for evaluating an oxidation stability of the sheet saturation magnetic flux density Bm, were measured as follows.

The test particles or the sheet test specimen were placed in a constant-temperature oven maintained at 60° C. and a relative humidity of 90%, and allowed to stand therein for one week to conduct an accelerated deterioration test. Thereafter, the test particles and the sheet test specimen were measured with respect to the saturation magnetization and the saturation magnetic flux density, respectively. The differences Δσs and ΔBm (as an absolute value), were respectively calculated from the values σs and Bm measured before the accelerated test and the values σs' and Bm' measured after the one-week accelerated test.

Example 1

30 liters of a mixed aqueous alkali solution containing sodium carbonate of 25 mol and sodium hydroxide of 20 mol (the concentration or sodium hydroxide being 28.6 mol % based on mixed alkali) were charged into a reaction vessel and the temperature thereof was adjusted to 47° C. while passing a nitrogen gas through the reaction vessel at a linear velocity of 2.21 cm/s. Then, 20 liters of an aqueous ferrous sulfate solution containing 20 mol of $Fe^{2+}$ (the concentration of the mixed aqueous alkali solution being 1.75 equivalents based on the ferrous sulfate) were charged into the reaction vessel and the contents of the reaction vessel were aged therein for 30 minutes. Thereafter, 4 liters of an aqueous cobalt sulfate solution containing 4.0 mol of $Co^{2-}$ (equivalent to 20 atm % (calculated as Co) based on whole Fe) was added to the reaction vessel and the contents of the reaction vessel were aged therein for 4 hours and 30 minutes. After aging, air was passed through the reaction vessel at a linear velocity of 1.32 cm/s to conduct the oxidation reaction until the percentage of oxidation of $Fe^{2+}$ reached 40%, thereby goethite seed crystal particles.

A part of the water suspension containing the goethite seed crystal particles wherein the oxidation percentage of $Fe^{2+}$ was proceeded to 40%, was taken out and rapidly washed with a diluted aqueous acetic acid solution, followed by filtering and then washing with water. As a result of the composition analysis of the obtained goethite seed crystal particles, it was determined that the Fe content was 49.54% by weight and the Co content was 6.43% by weight.

Next, after the linear velocity of air passing through the reaction vessel was increased to 3.31 cm/s, 1 liter of an aqueous aluminum sulfate solution containing 2.4 mol of $Al^{3+}$ (equivalent to 12 atm % (calculated as Al) based on whole Fe) was added into the reaction vessel at a feed rate of not more than 3 ml/sec to conduct the oxidation reaction, and the reaction mixture was washed with water using a filter press until the electric conductivity reached 60 μs, thereby obtaining a press cake.

A part of the obtained press cake was dried and pulverized by an ordinary method, thereby obtaining goethite particles. As recognized from the transmission electron micrograph shoos in FIG. 1, the obtained goethite particles were of a spindle shape, and had a BET specific surface area of 180.3 $m^2/g$, an average major axial diameter of 0.130 μm, a standard deviation σ of 0.0251 μm, a particle size distribution (standard deviation/average major axial diameter) of 0.193, an average minor axial diameter of 0.0173 μm, an aspect ratio (average major axial diameter/average minor axial diameter) of 7.5:1, an X-ray crystallite ($D_{020}$) of 22.4 nm, an X-ray crystallite ($D_{110}$) of 8.9 nm, and an X-ray crystallite size ratio ($D_{020}/D_{110}$) of 2.52.

Further, the obtained goethite particles contained no dendritic particles. The obtained goethite particles comprised 44.5% by weight of Fe based on the weight of the particle, 9.39% by weight of Co based on the weight of the particle and 2.58% by weight of Al based on the weight of the particle. As a result of the comparison of these values with those of the goethite seed crystal particles, it was determined that the Co content in the seed portion was 12.3 atm % (calculated as Co) based on the Fe in the seed portion; the relationship of the Co concentration of the seed portion of the goethite particle with that of the goethite particle was 61.5:100 and the relationship of the Co concentration of he surface layer portion of the goethite particle with that of the goethite particle was 125.7:100, when the Co concentration of the goethite particle is 100; the Co content in a whole particle was 20 atm % (calculated as Co) based on whole Fe; and the Al content was 12 atm % (calculated as Al; based on whole Fe. Further, it was determined that Al existed only in the surface layer portion.

Example 2

A press cake containing 1,000 g of the spindle-shaped goethite particles obtained in Example 1 (7.97 mol as Fe) was sufficiently dispersed in 40 liters of water. 2 liters of an aqueous yttrium nitrate solution containing 245 g of yttrium nitrate hexahydrate (equivalent to 8 atm % (calculated as Y) based on whole Fe) was added to the dispersion, and then stirred. Further, after a 25.0 wt % aqueous sodium carbonate solution as a precipitating agent was added so as to adjust the pH value of the dispersion to 9.5, the dispersion was washed widen wager using a filter press. The obtained press cake was extrusion-molded using a compression molding machine equipped with a mold plate having an orifice diameter of 3 mm, and the resultant molded product were dried at 120° C., thereby obtaining goethite particles coated with the yttrium compound. The Co content in the obtained goethite particles was 20 atm % (calculated as Co) based or whole Fe; the Al content thereof was 12 atm % (calculated as Al) based on whole Fe; and the Y content thereof was 8 atm % (calculated as Y) based on whole Fe. Further, it was determined that Al existed only in the intermediate layer portion and yttrium existed only in the outer layer portion.

The spindle-shaped goethite particles coated with the yttrium compound were heat-dehydrated in air at 600° C. for 1 hours, thereby producing spindle-shaped hematite particles having an outer layer composed of the yttrium compound.

Figure 2:
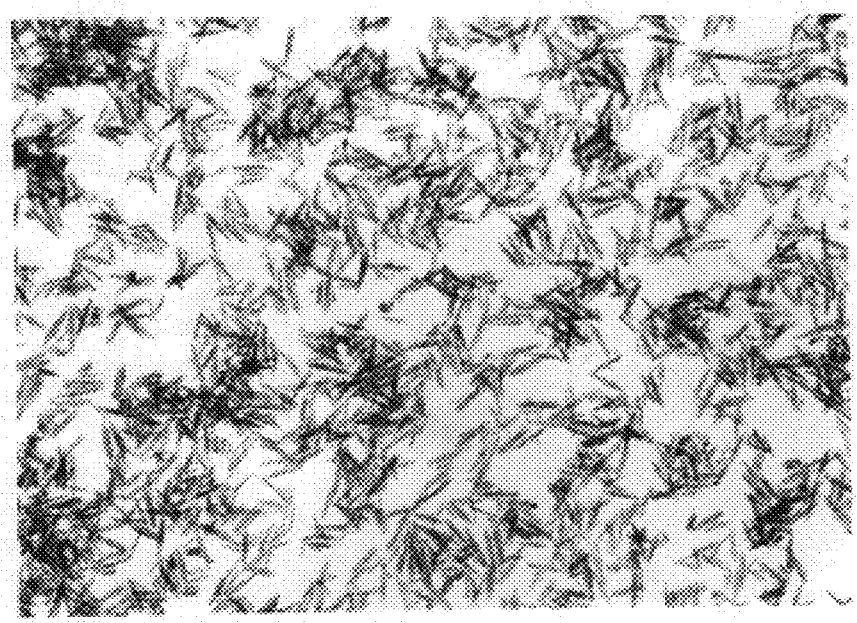
FIG. 2 is a transmission electron micrograph (×30,000) showing a particle shape of spindle-shaped hematite particles obtained in Example 2 according to the present invention.

As recognized from the transmission electron micrograph shown in FIG. 2, the obtained spindle-shaped hematite particles had an average major axial diameter of 0.121 μm, a standard deviation σ of 0.0223 μm, a particle size distribution (standard deviation/average major axial diameter) of 0.184, an average minor axial diameter of 0.0166 μm, an aspect ratio (average major axial diameter/average minor axial diameter) of 7.3:1 and a BET specific surface area of 87.3 $m^2/g$. The Co content in the particles was 20 atm % (calculated as Co) based on whole Fe; the Al content was 12 atm % (calculated as Al) based on whole Fe; and the Y content was 8 atm % (calculated as Y) based on whole Fe.

Example 3

100 g of the spindle-shaped hematite particles having the outer layer composed of the yttrium compound which were obtained in Example 2, were charged into a fixed-bed reducing apparatus having an inner diameter of 72 mm. While a hydrogen ($H_2$) gas was passed through the reducing apparatus at a flow rate of 35 liter/min, the spindle-shaped hematite particles were heat-reduced at 600° C. for 2 hours. After the hydrogen gas was replaced with a nitrogen gas, the particles were cooled to 80° C., and then the oxygen partial pressure in the reducing apparatus was gradually increased by passing a water vapor therethrough until the oxygen content therein reached the same content as in air, thereby forming a stable oxide layer on the surface of each particle.

Figure 3:
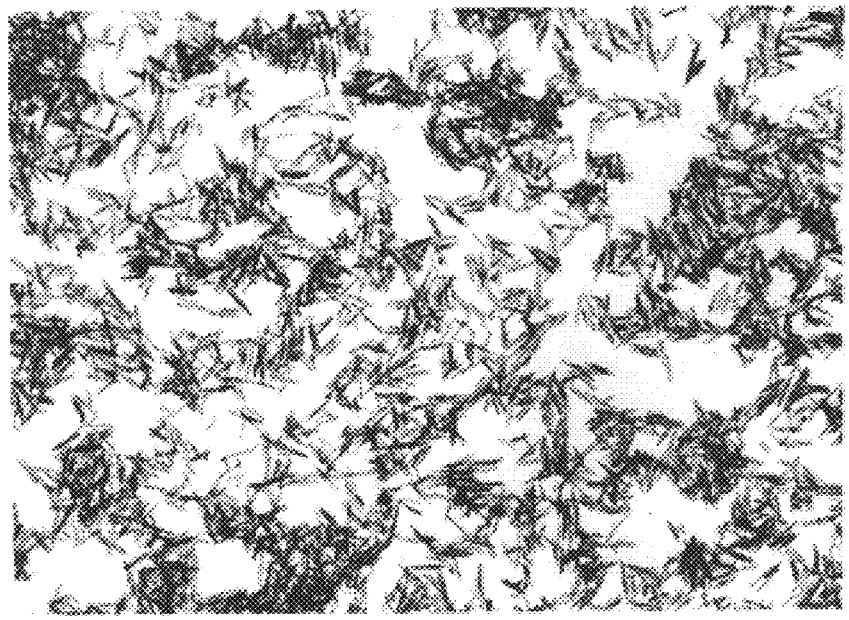
FIG. 3 is a transmission electron micrograph (×30,000) snowing a particle shape of magnetic spindle-shaped metal particles containing iron as a main component which were obtained in Example 3 according to the present invention.

As recognized from the transmission electron micrograph shown in FIG. 3, the obtained magnetic metal particles containing iron as a main component and further containing Co, Al and Y, had an average manor axial diameter of 0.108 µm, a standard deviation σ of 0.0171 µm, a particle size distribution (standard deviation/average major axial diameter) of 0.158, an average minor axial diameter of 0.0158 µm, an aspect ratio (average major axial diameter/ average minor axial diameter) of 6.8:1, a BET specific surface area of 47.0 m$^2$/g and an X-ray crystallite ($D_{110}$) of 15.2 nm. Further, the magnetic metal particles containing iron as a main component had a spindle shape and a uniform particle size, and contained no dendritic particles. The Co content in the particles was 20 atm % (calculated as Co) based on whole Fe; the Al content was 12 atm % (calculated as Al) based on whole Fe; and the Y content was 8 atm % (calculated as Y) based on whole Fe. As to the magnetic properties of the magnetic metal particles, the coercive force thereof was as high as 2,310 Oe; the saturation magnetization σs was 141.0 emu/g; the squareness (σr/σs) was 0.535; the particle SFDr was 0.710; and the oxidation stability Δσs of the saturation magnetization was 8.6% as an absolute value (measured value: −8.6%). Further, as to sheet magnetic characteristics, the sheet coercive force Hc was 2,365 Oe; the sheet squareness (Br/Bm, wherein Bm was 3,901 G), was 0.870; the sheet SFD was 0.395; and ΔBm was 6.0% (measured value: −6.0%).

Example 4

Production Spindle-shaped Goethite Articles 30 liters of a mixed aqueous alkali solution containing sodium carbonate of 25 mol and sodium hydroxide of 20 mol (the concentration of sodium hydroxide being equivalent to 28.6 mol % based on mixed alkali) were charged into a reaction vessel and the temperature thereof was adjusted to 47° C. whole passing a nitrogen gas through the reaction vessel at a linear velocity of 2.21 cm/s. Then, 20 liters of an aqueous ferrous sulfate solution containing 20 mol of $Fe^{2+}$ (the concentration of the mixed aqueous alkali solution being 1.75 equivalents based on the ferrous sulfate) were charged into the reaction vessel and the contents of the reaction vessel were aged therein for 20 minutes. Thereafter, 4 liters of an aqueous cobalt sulfate solution containing 4.2 mol of $Co^{2+}$ (equivalent to 21 atm % (calculated as Co) based on whole Fe) was added to the reaction vessel and the contents of the reaction vessel were further aged therein for 4 hours and 40 minutes. After aging, air was passed through the reaction vessel at a linear velocity of 1.32 cm/s to conduct the oxidation reaction until the percentage of oxidation of $Fe^{2+}$ reached 40%, thereby goethite seed crystal particles.

A part of the water suspension containing the goethite seed crystal particles wherein the oxidation percentage of $Fe^{2+}$ was proceeded to 40%, was taken out and rapidly washed with a diluted aqueous acetic acid solution, followed by filtering and teen washing with water. As a result of the composition analysis of the obtained goethite seed crystal particles, it was determined that the Fe content was 48.60% by weight and the Co content was 6.66% by weight.

Next, after the linear velocity of air passing through the reaction vessel was increased to 3.31 cm/s, 1 liter of an aqueous aluminum sulfate solution containing 2.4 mol of $Al^{3+}$ (equivalent to 2 atm % (calculated as Al) based on whole Fe) was added into the reaction vessel at a feed rate of not more than 3 ml/sec to conduct the oxidation reaction, and the reaction mixture was washed with water using a filter press until the electric conductivity reached 60 µS, thereby obtaining a press cake.

Figure 9:
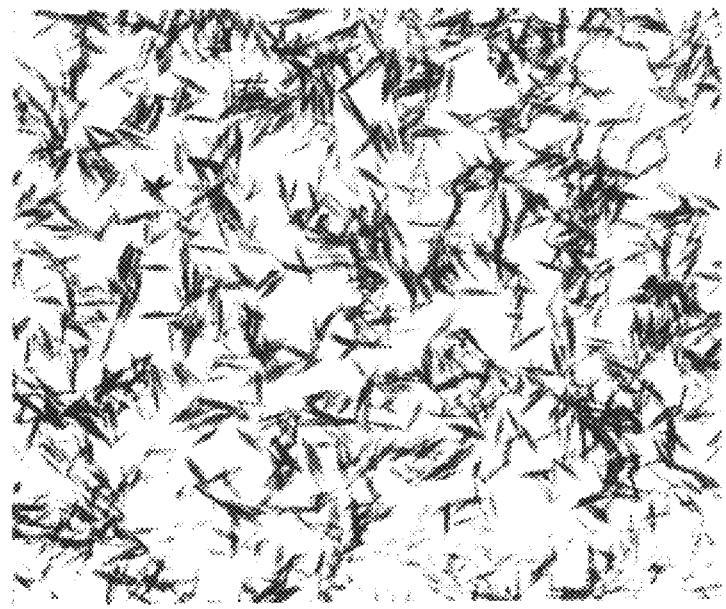
FIG. 9 is a transmission electron micrograph (×30,000) showing a particle shape of spindle-shaped goethite particles obtained in Example 4 according to the present invention.

A part of the obtained press cake was dried and pulverized by an ordinary method, thereby obtaining goethite particles. As recognized from the transmission electron micrograph shown in FIG. 9, the obtained goethite particles were of a spindle shape, and had a BET specific surface area of 179.2 m$^2$/g, an average major axial diameter of 0.131 µm, a standard deviation σ of 0.0250 µm, a particle size distribution (standard deviation/average major axial diameter) of 0.191, an average minor axial diameter of 0.0175 µm and an aspect ratio (average major axial diameter/average minor axial diameter) of 7.5:1. Further, the obtained goethite particles contained no dendritic particles. In addition, the obtained goethite particles comprised 44.0% by weight of Fe based on the weight of the particle, 9.76% by weight of Co based on the weight of the particle and 2.55% by weight of Al based on the weight of the particle. As a result of the comparison of these values with those of the goethite seed crystal particles, it was determined that the Co content in the seed portion was 13.0 atm % (calculated as Co) based on the Fe in the seed portion; the relationship of the Co concentration of the seed portion of the goethite particle with that of the goethite particle was 61.9:100 and the relationship of the Co concentration of the surface layer portion of the goethite particle with that of the goethite particle was 125.4:100, when the Co concentration of the goethite particle is 100; the relationship of the Co concentration of the seed portion of the goethite particle with that of the goethite particle was 61.5:100 and the relationship of the Co concentration of the surface layer portion of the goethite particle with that of the goethite particle was 125.7:100, when the Co concentration of the goethite particle is 100; and the Al content was 12 atm % (calculated as Al) based on whole Fe. Further, it was determined that Al existed only in the surface layer portion.

Example 5

The press cake containing 1,000 g of the spindle-shaped goethite particles obtained in Example 4 (7.88 mol as Fe) was sufficiently dispersed in 40 liters of water. 2 liters of an aqueous yttrium nitrate solution containing 243 g of yttrium nitrate hexahydrate (equivalent to 8 atm % (calculated as Y) based on whole Fe in the spindle-shaped goethite particles) and 2 liters of an aqueous cobalt sulfate solution containing 197 g of cobalt sulfate heptahydrate (equivalent to 9 atm % (calculated as Co) based on whole Fe in the spindle-shaped goethite particles) were added to the dispersion, and then stirred. Further, after a 25.0 wt% aqueous sodium carbonate solution as a precipitating agent was added so as to adjust the pH value of the dispersion to 9.5, the dispersion was washed with water using a filter press. The obtained press cake was extrusion-molded using a compression molding machine equipped with a mold plate having an orifice diameter of 3 mm, and the resultant molded particles were dried at 120° C., thereby obtaining spindle-shaped goethite particles coated with the yttrium and cobalt compounds. The Co content in the obtained spindle-shaped goethite particles was 30 atm % (calculated as Co) based on whole Fe; the Al content was 12 atm % (calculated as Al) based on whole Fe; and the Y content was 8 atm % (calculated as Y) based on whole Fe. Farther, it was determined that Al existed only in the intermediate Layer portion and yttrium existed only in the outer layer portion.

The spindle-shaped goethite particles coated with the yttrium and cobalt compounds were heat-dehydrated in air at 300° C., and further heat-dehydrated in the same atmosphere at 600° C. for 1 hours, thereby producing spindle-shaped hematite particles.

Figure 10:
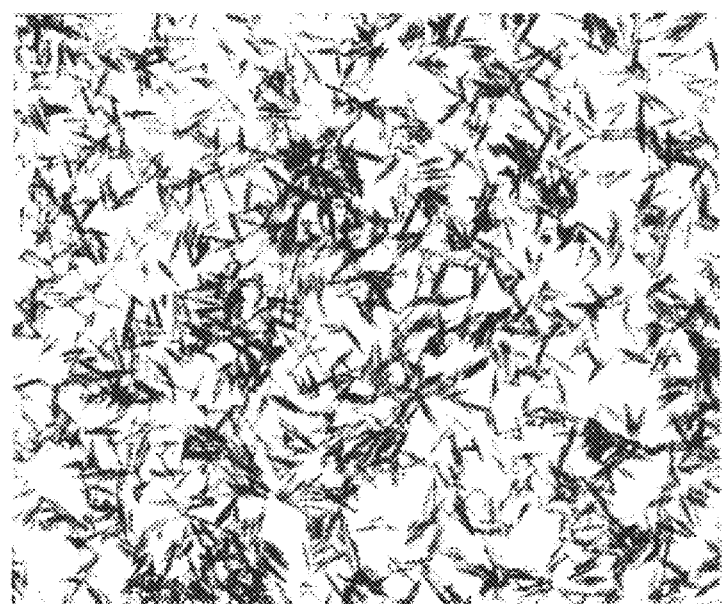
FIG. 10 is a transmission electron micrograph (×30,000) showing a particle shape of spindle-shaped hematite particles obtained in Example 5 according to the present invention.

As recognized from the transmission electron micrograph shown in FIG. 10, the obtained spindle-shaped hematite particles had an average major axial diameter of 0.122 μm, a standard deviation σ of 0.0218 μm, a particle size distribution (standard deviation/average major axial diameter) of 0.179, an average minor axial diameter of 0.0168 μm, an aspect ratio (average manor axial diameter/average minor axial diameter) of 7.3: and a BET specific surface area of 95.7 m$^2$/g. The Co content in the spindle shaped hematite particles was 30 atm % (calculated as Co) based on whole Fe; the Al content thereof was 12 atm % (calculated as Al) based on whole Fe; and the Y content thereof was 8 atm % (calculated as Y) based on whole Fe. In addition, the crystallite size ($D_{104}$) of the spindle-shaped hematite particles was 76 Å and the saturation magnetization thereof was 1.0 emu/g.

Example 6

Production of Magnetic Spindle-shaped Metal Particles 100 g of the spindle-shaped hematite particles obtained in Example 5, were charged into a fixed-bed reducing apparatus having an inner diameter of 72 mm. While a hydrogen ($H_2$) gas was passed through the reducing apparatus at a flow rate of 35 liter/min, the spindle-shaped hematite particles were heat reduced at 600° C. for 2 hours. The hydrogen gas was replaced with a nitrogen gas, and the temperature of the reducing apparatus was cooled to 80° C. Then, the oxygen partial pressure in the reducing apparatus was gradually increased while passing steam therethrough until the oxygen content therein reached the same content as in air, thereby forming a stable oxide layer on the surface of each particle.

Figure 11:
FIG. 11 is a transmission electron micrograph (×30,000) showing a particle shape of magnetic spindle-shaped metal particles containing iron as a main component which were obtained in Example 6 according to the present invention.
Figure 12:
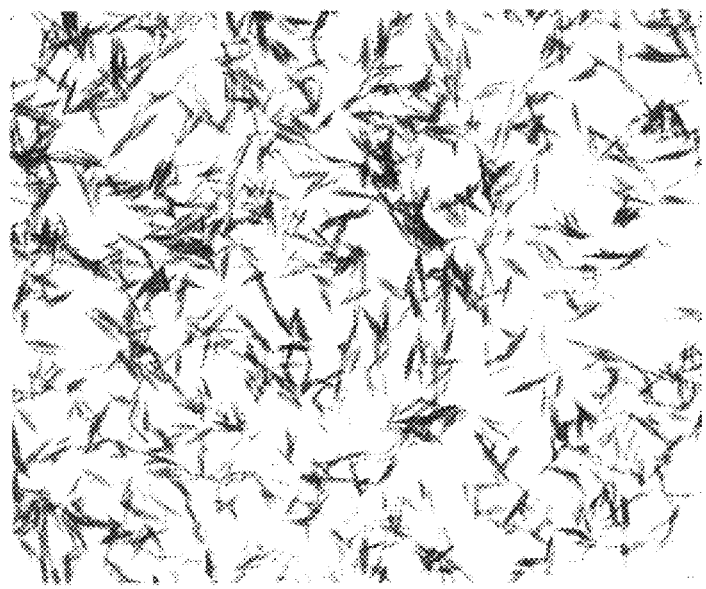
FIG. 12 is a transmission electron micrograph (×30,000) showing a particle shape of spindle-shaped goethite particles 1 as starting particles.
Figure 13:
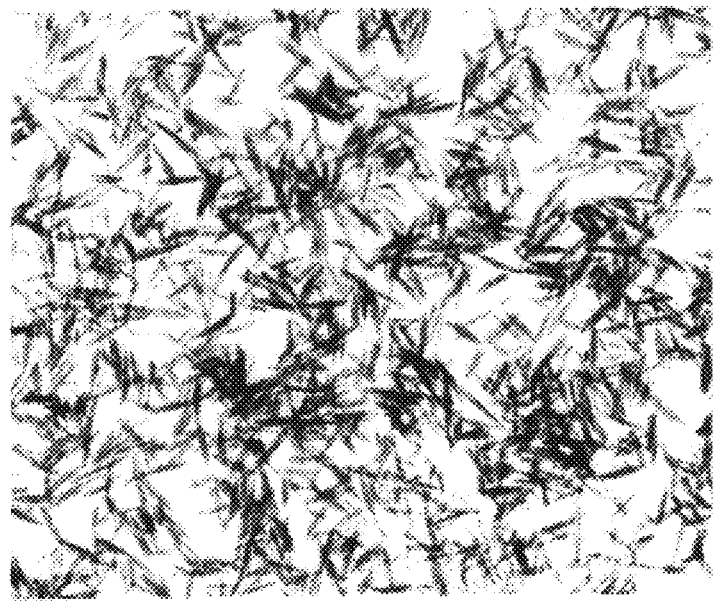
FIG. 13 is a transmission electron micrograph (×30,000) showing a particle shape of spindle-shaped goethite particles 2 as starting particles.
Figure 14:
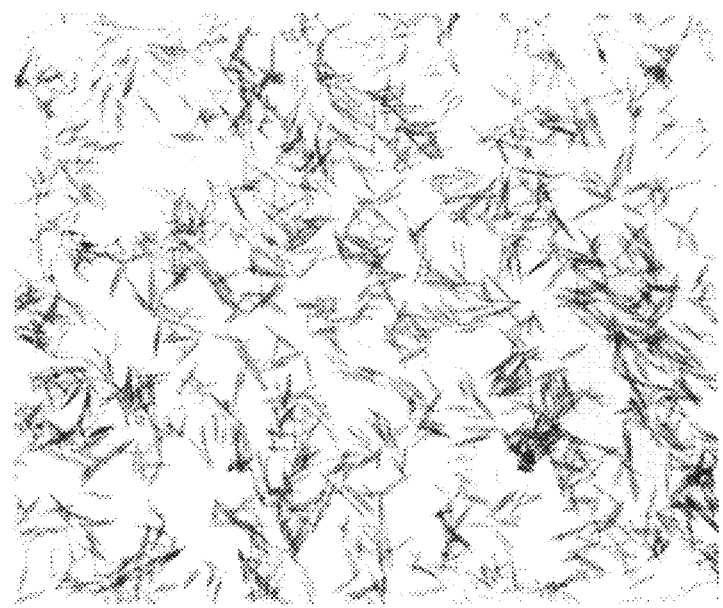
FIG. 14 is a transmission electron micrograph (×30,000) showing a particle shape of spindle-shaped goethite particles 3 as starting particles.
Figure 15:
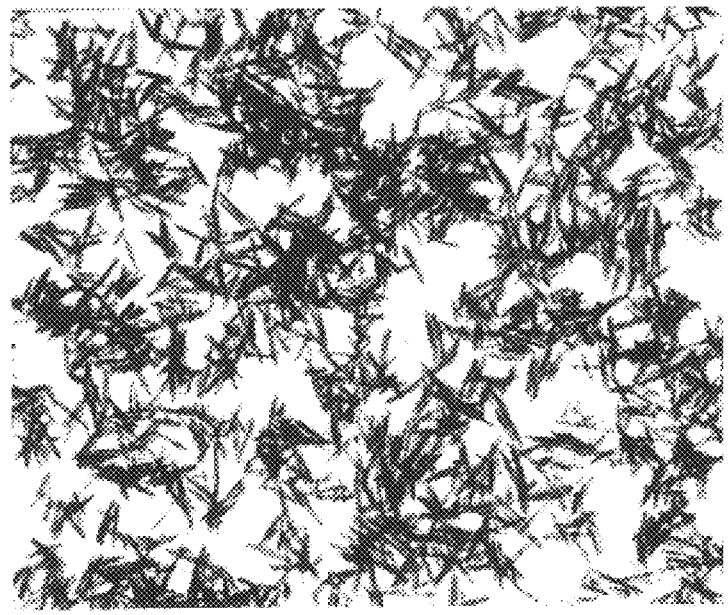
FIG. 15 is a transmission electron micrograph (×30,000) showing a particle shape of spindle-shaped hematite particles obtained in Example 30 according to the present invention.
Figure 16:
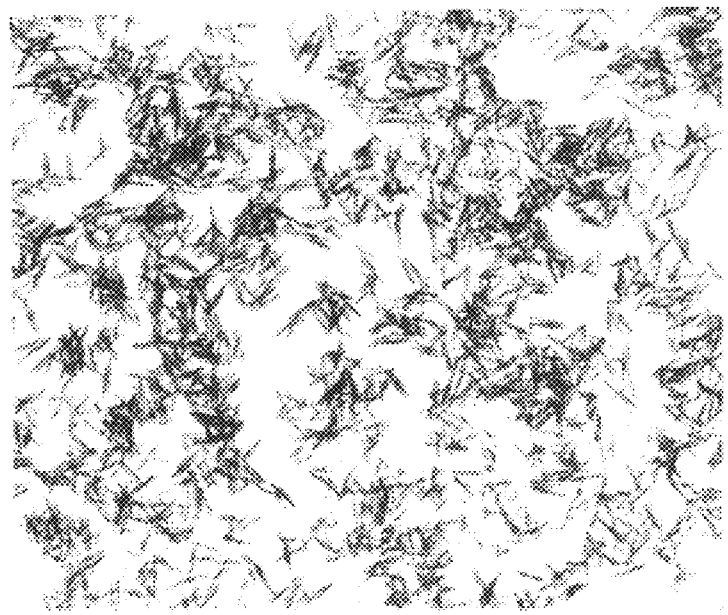
FIG. 16 is a transmission electron micrograph (×30,000) showing a particle shape of spindle-shaped hematite particles obtained in Example 31 according to the present invention.
Figure 17:
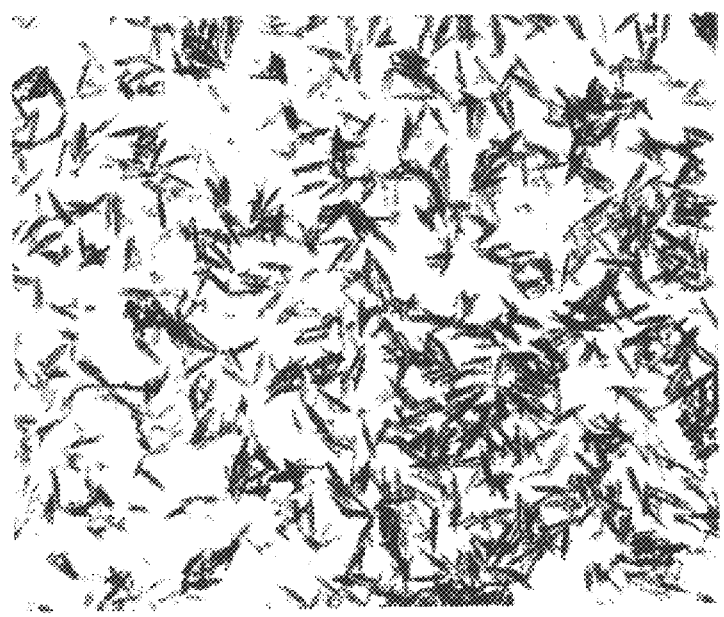
FIG. 17 is a transmission electron micrograph (×30,000) showing a particle shape of spindle-shaped hematite particles obtained in comparative Example 15.
Figure 18:
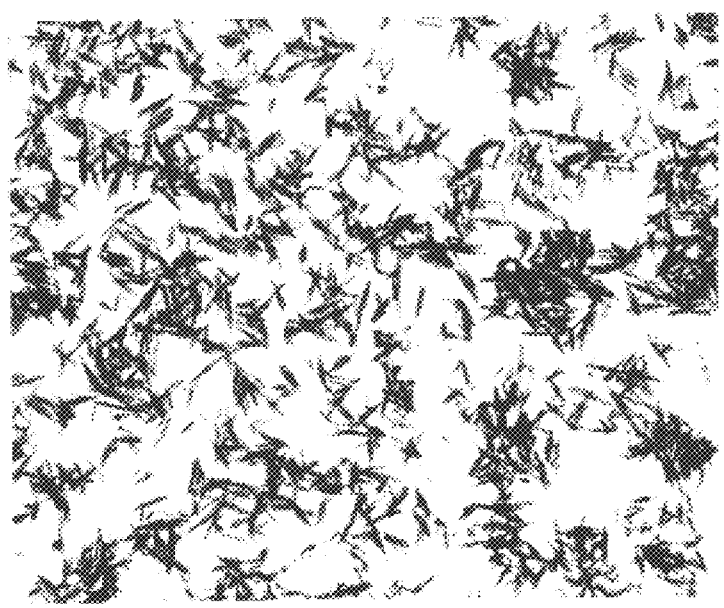
FIG. 18 is a transmission electron micrograph (×30,000) showing a particle shape of spindle-shaped hematite particles obtained in Comparative Example 17.
Figure 19:
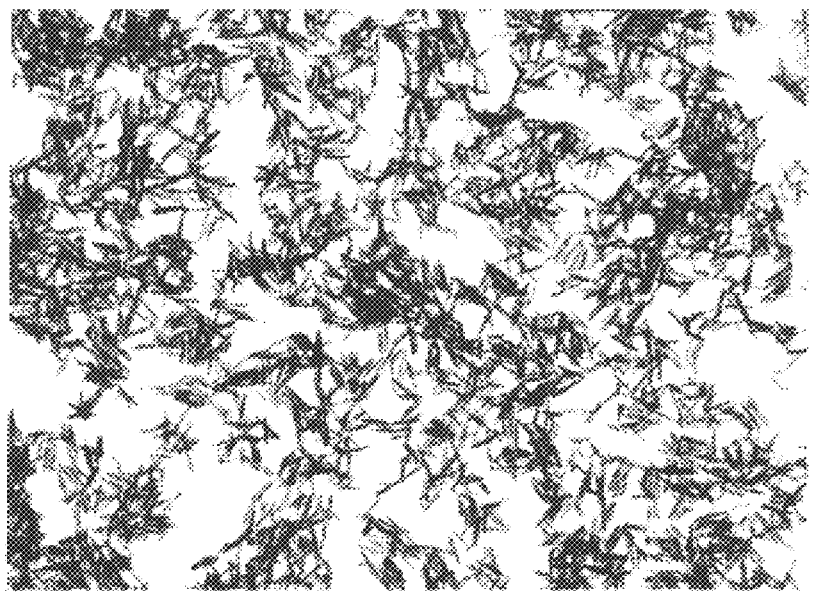
FIG. 19 is a transmission electron micrograph (×30,000) showing a particle shape of magnetic spindle-shaped metal particles obtained in Example 34 which were produced from spindle-shaped hematite particles obtained n Example 30.
Figure 20:
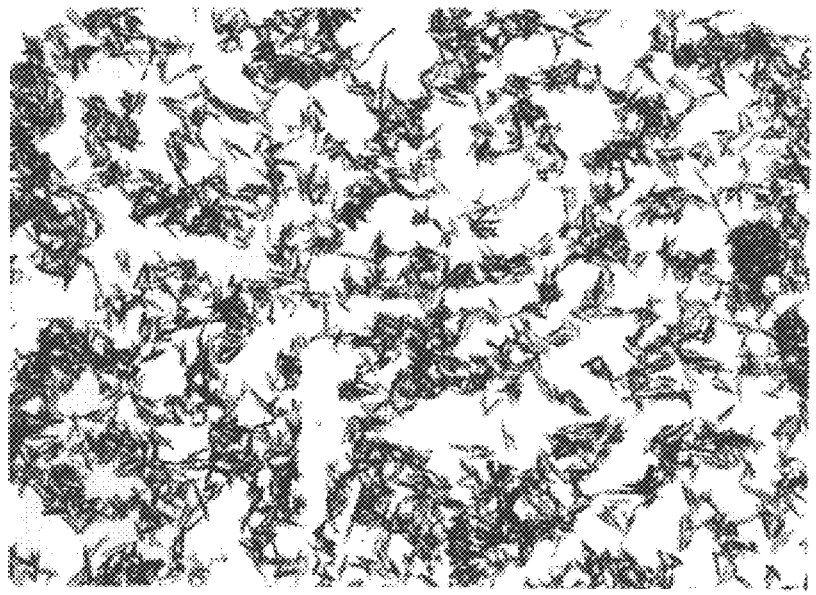
FIG. 20 is a transmission electron micrograph (×30,000) snowing a particle shape of magnetic spindle-shaped metal particles obtained in Example 35 which were produced from spindle-shaped hematite particles obtained in Example 31.
Figure 21:
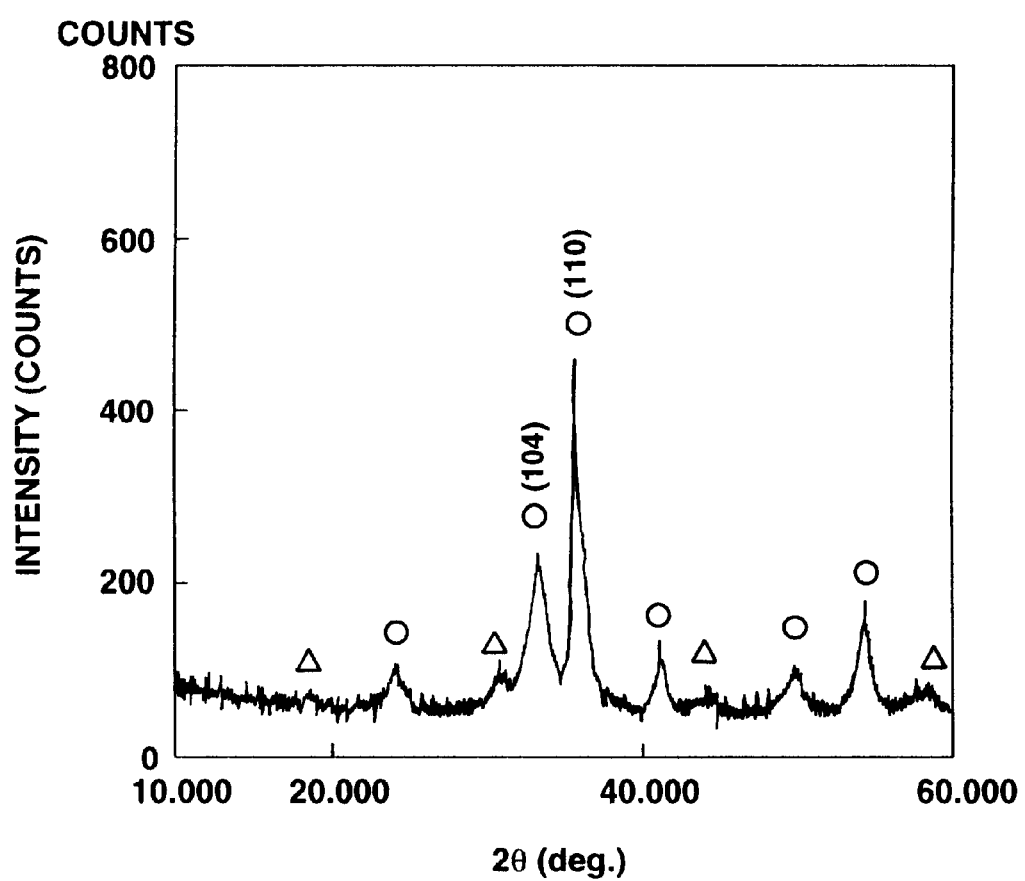
FIG. 21 shows an X-ray diffraction pattern (mark o: hematite, and mark: spinel-type iron oxide) of spindle-shaped hematite particles obtained in Example 5.
Figure 22:
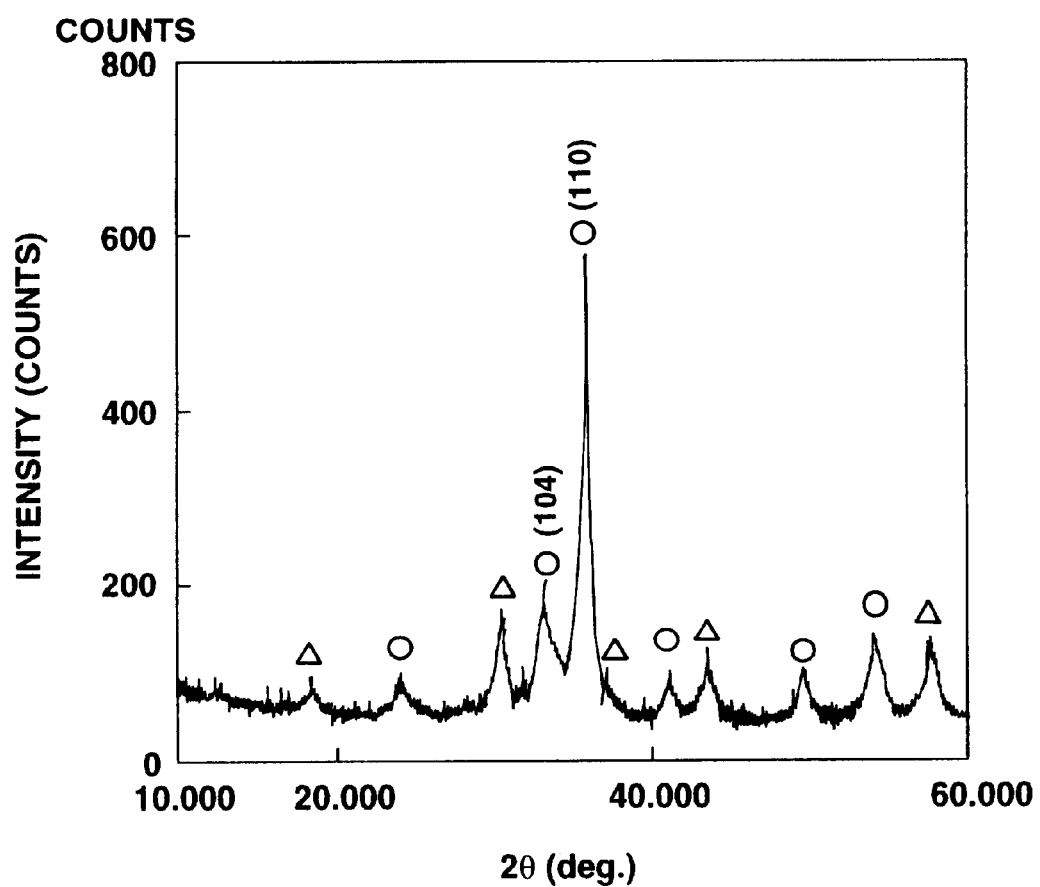
FIG. 22 shows an X-ray diffraction pattern (mark o: hematite, and mark: spinel-type iron oxide) of spindle-shaped hematite particles obtained in Comparative Example 15.
Figure 23:
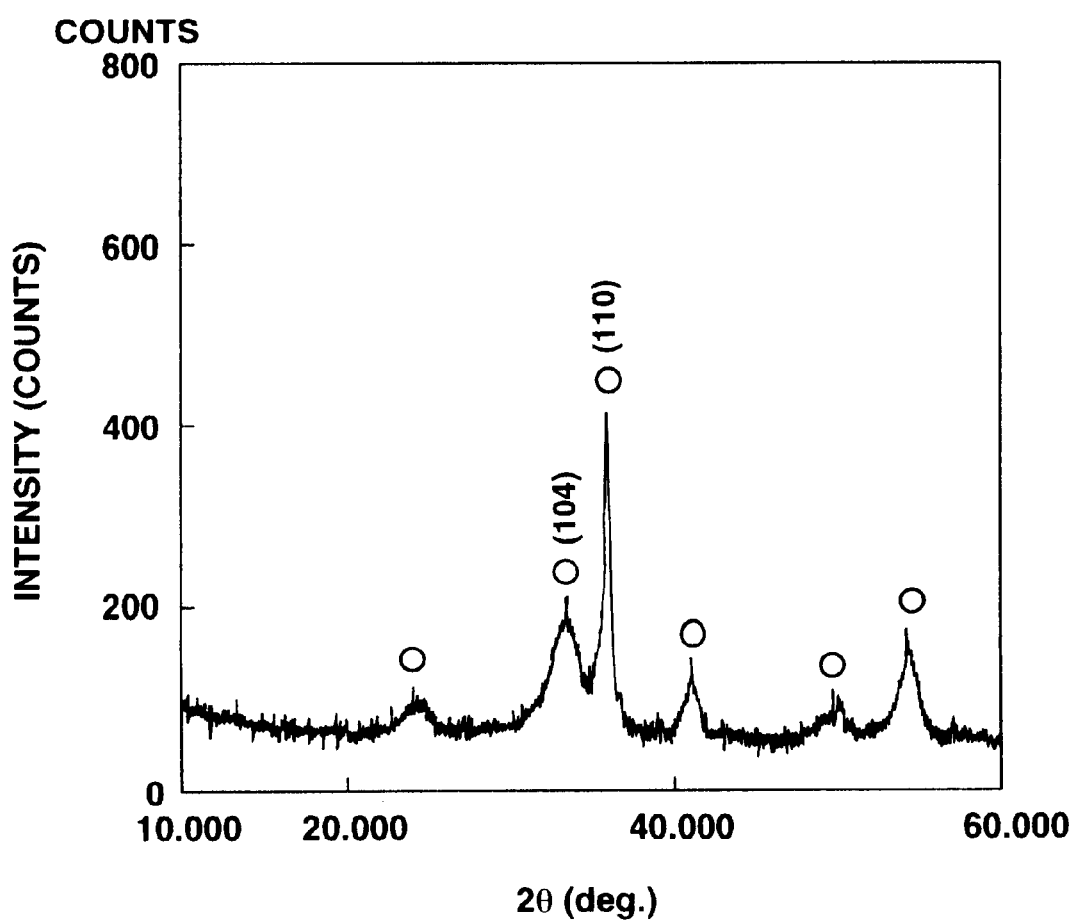
FIG. 23 shows an X-ray diffraction pattern (mark o: hematite) of spindle-shaped hematite particles obtained in Comparative Example 16.

As recognized from the transmission electron micrograph shown in FIG. 11, the obtained magnetic spindle-shaped metal particles had an average major axial diameter of 0.105 μm, a standard deviation σ of 0.0163 μm, a particle size distribution (standard deviation/average major axial diameter) of 0.155, an average minor axial diameter of 0.0154 μm, an aspect ratio (average major axial diameter/average minor axial diameter) of 6.8:1, a BET specific surface area of 50.1 m$^2$/g and an X-ray crystallite size ($D_{110}$) of 15.2 nm. Further, the magnetic metal particles had a spindle shape and a uniform particle size, and contained no dendritic particles. The Co content in the particles was 30 atm % (calculated as Co) based on whole Fe; the Al content was 12 atm % (calculated as Al) based or whole Fe; and the Y content was 8 atm % (calculated as Y) based on whole Fe. As to the magnetic properties of the magnetic spindle-shaped metal particles containing iron as a main component, the coercive force thereof was as high as 2,362 Oe; the saturation magnetization σs was 140.5 emu/g; the squareness (σr/σs) was 0.543; and the oxidation stability Δσs of the saturation magnetization was 7.0% as an absolute value (measured value: −7.0%). Further, as to magnetic characteristics of magnetic coating film, the film coercive force Hc was 2,411 Oe; the squareness (Br/Bm) was 0.873; the SFD was 0.382; and ΔBm was 5.1% (measured value: −5.1%)

Example 7

Production of Magnetic Spindle-shaped Metal Particles 500 g of molded granules (average particle size: 2.6 mm) composed of the spindle-shaped hematite particles obtained in Example 6 were charged into a fixed-bed reducing apparatus having an inner diameter of 72 mm and a bed height of 27 cm, and heated up to 600° C. while passing a nitrogen gas through the reducing apparatus at a linear velocity of 20 cm/s. After the nitrogen gas was replaced with a hydrogen gas, the contents of the reducing gas was heal-reduced at 600° C. while passing the hydrogen gas at a linear velocity of 50 cm/s until the dew point of the exhaust gas reached −30° C. Thereafter, the hydrogen gas was replaced again with the nitrogen gas, and the reducing apparatus was cooled down to 80° C. Steam and then air were mixed in the nitrogen gas, and the mixed gas was passed through the reducing apparatus to gradually increase the oxygen partial pressure, thereby forming a stable oxide layer or each particle. As a result, there was obtained magnetic spindle-shaped metal particles.

A part (about 10 g) of the thus obtained magnetic spindle-shaped metal particles were taken out from both a lower bed portion (bed height: not more than 3 cm) and an upper bed portion (bed height: not less than 25 cm), and measured as to magnetic properties and crystallite size thereof.

The obtained magnetic metal particles had an average major axial diameter of 0.104 μm, a standard deviation σ of 0.0165 μm, a particle size distribution (standard deviation/average major axial diameter) of 0.159, an average minor axial diameter of 0.0153 μm, an average aspect ratio (average major axial diameter/average minor axial diameter) of 6.8:1, a BET specific surface area of 52.4 m$^2$/g and a crystallite size ($D_{110}$) of 153 Å. Further, the magnetic metal particles had a spindle shape and a uniform particle size, and contained no dendritic particles. The Co content in the particles was 30 atm % (calculated as Co) based on whole Fe; the Al content was 12 (calculated as Al) atm % based on whole Fe; and the Y content was 8 atm % (calculated as Y) based on whole Fe.

As to the magnetic properties of the magnetic spindle-shaped metal particles, the coercive force Hc thereof was 2,321 Oe; the saturation magnetization σs was 146.5 emu/g; the squareness (σr/σs) was 0.540; and the oxidation stability Δσs of the saturation magnetization was 9.3% as an absolute value (measured value: −9.3%). Further, as to magnetic characteristics of magnetic coating film, the coercive force was 2,370 Oe; the squareness (Br/Bm) was 0.875; the SFD was 0.380; and the oxidation stability ΔBm was 7.1% as an absolute value (measured value: −7.1%)

Incidentally, the magnetic spindle-shaped metal particles taken out from the lower bed portion, showed a coercive force Hc of 2,335 Oe, a saturation magnetization σs of 145.9 emu/g, a squareness (σr/σs) of 0.541 and a crystallite size ($D_{110}$) of 152 Å. Whereas, the magnetic spindle-shaped metal particles taken out from the upper bed portion showed a coercive force Hc of 2,311 Oe, a saturation magnetization σs of 146.8 emu/g, a squareness (σr/σs) of 0.538 and a crystallite size ($D_{110}$) of 155 Å.

Examples 8 to 14

The same procedure as defined in Example 1 was conducted except that production conditions of the spindle-shaped goethite particles, i.e., the production reaction conditions of goethite seed crystal particles and the growth reaction conditions thereof, were varied as shown in Table 1, thereby obtaining spindle-shaped goethite particles. Various properties of the obtained spindle-shaped goethite particles are shown in Table 2.

Figure 4:
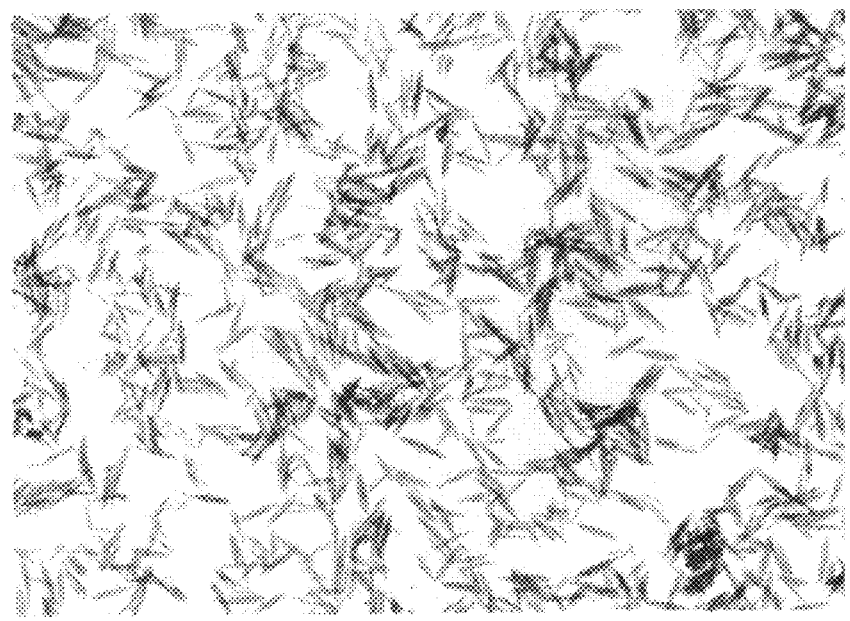
FIG. 4 is a transmission electron micrograph (×30,000) showing a particle shape of spindle-shaped goethite particles obtained in Example 9 according to the present invention.

Further, in FIG. 4, there is shown an electron micrograph of a particle structure of the goethite particles obtained in Example 9.

Comparative Example 1

The same procedure as defined in Example 1 was conducted except that the production reaction conditions of goethite particles were changed such that the linear velocity of the oxygen-containing gas passed through the reaction vessel upon the growth reaction was adjusted to 1.32 cm/s equal to that upon the production reaction of goethite seed crystal particles, thereby producing goethite particles.

Figure 7:
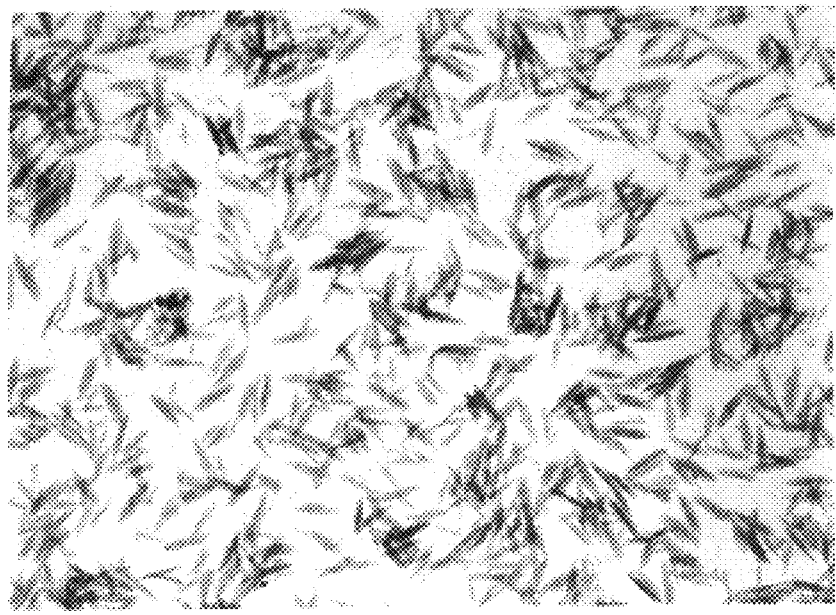
FIG. 7 is a transmission electron micrograph (×30,000) showing a particle shape of spindle-shaped goethite particles obtained in Comparative Example 1.

As recognized from the transmission electron micrograph shown in FIG. 7, the obtained goethite particles showed crystal growth in the minor axial direction, resulting in deterioration in aspect ratio and particle size distribution thereof.

Comparative Example 2

The same procedure as defined in Example 1 was conducted except that the production reaction conditions of goethite particles were changed such that the linear velocity of the oxygen-containing gas passed through the reaction vessel upon the growth reaction was adjusted to 1.98 cm/s which was 1.5 times that upon the production reaction of goethite seed crystal particles, thereby producing goethite particles.

The obtained goethite particles showed crystal growth in the minor axial direction, resulting in deterioration in aspect ratio and particle size distribution thereof.

Comparative Example 3

The same procedure as defined in Example 1 was conducted except that the production reaction conditions of goethite particles were charged such that Al to be added, was added when the percentage of oxidation of $Fe^{2+}$ reached 100%, i.e., when no unreacted $Fe^{2+}$ remained therein, thereby producing goethite particles.

The obtained goethite particles showed crystal growth in the major axial direction, thereby improving an aspect ratio thereof, but the particle size distribution thereof was deteriorated.

Comparative Example 4

The same procedure as defined in Example 1 was conducted except that the contents of the Co and Al compounds added were changed to 5 atm % (calculated as Co) and 3 atm % (calculated as Al) based on Fe, and other conditions were shown in Table 1, thereby producing goethite particles.

The obtained goethite particles showed crystal growth in the major axial direction, thereby improving an aspect ratio thereof, but the particle size distribution thereof was deteriorated.

Examples 15 to 20 and Comparative Examples 5 to 9

Production of Spindle-shaded Hematite Particles

The same procedure as defined in Example 2 was conducted except that kind of the spindle-shaped goethite particles as precursor, kind and amount of the coating material used for the anti-sintering treatment, the heat-dehydration temperature and the subsequent heat-treatment temperature were varied, thereby producing spindle-shaped hematite particles. Production conditions and various properties of the obtained spindle-shaped hematite particles are shown in Table 3.

Figure 5:
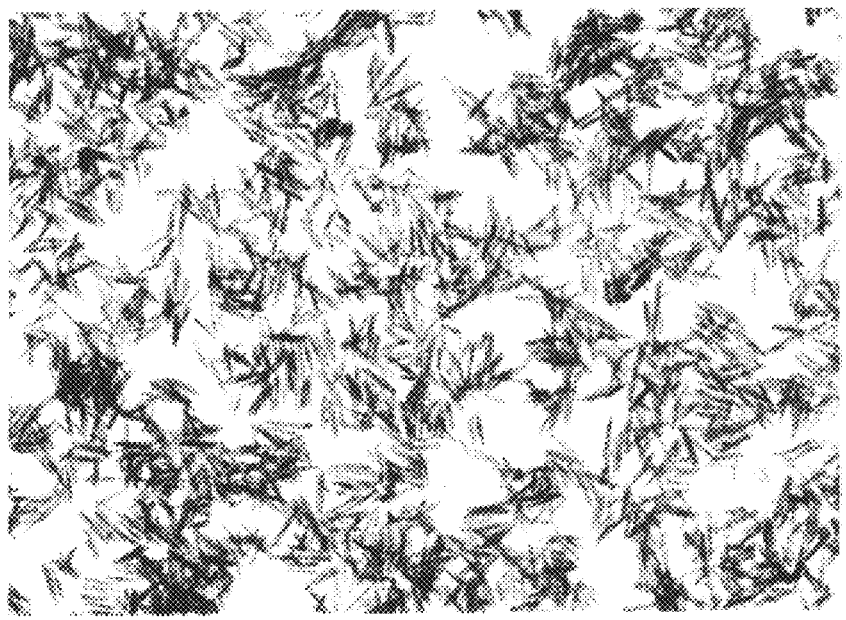
FIG. 5 is a transmission electron micrograph (×30,000) showing a particle shape of spindle-shaped hematite particles obtained in Example 16 according to the present invention.

FIG. 5 is a transmission electron micrograph showing a particle structure of the hematite particles obtained in Example 16.

Examples 21 to 26 and Comparative Examples 10 to 14

Production of Magnetic Spindle-shaped Metal Particles Containing Iron as a Main Component The same procedure as defined in Example 3 was conducted except that kind of particles to be treated, kind and amount of the coating material used for the anti-sintering treatment, the heating temperature and the reducing temperature upon the heat-reduction step were varied, thereby producing magnetic metal particles containing iron as a main component. Reduction conditions and various properties of the obtained magnetic metal particles containing iron as a main component, are shown in Table 4.

Figure 6:
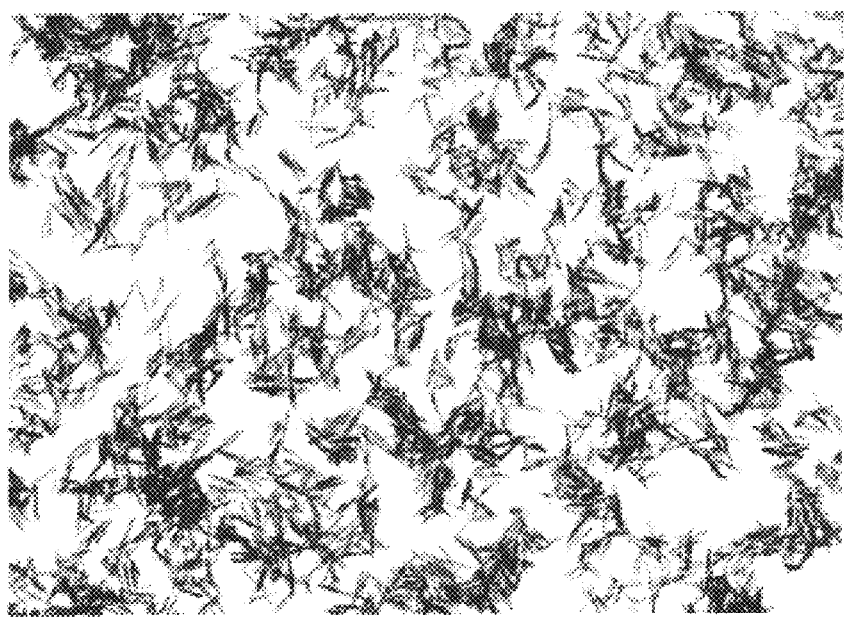
FIG. 6 is a transmission electron micrograph (×30,000) showing a particle shape of magnetic spindle-shaped metal particles containing iron as a main component which were obtained in Example 22 according to the present invention.
Figure 8:
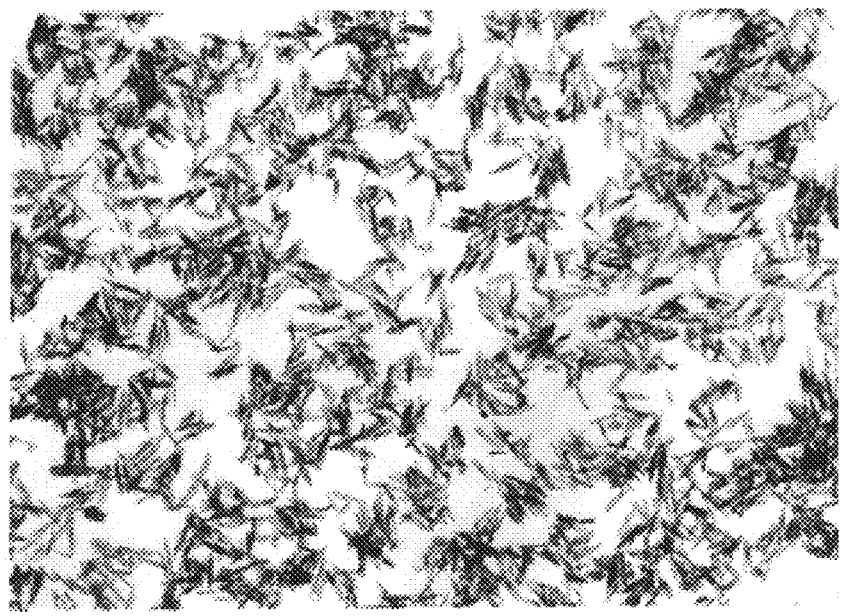
FIG. 8 is a transmission electron micrograph (×30,000) showing a particle shape of magnetic spindle-shaped metal particles containing iron as a main component which were obtained in Comparative Example 10.

FIG. 6 is a transmission electron micrograph showing a particle structure of the magnetic metal particles containing iron as a main component which were obtained in Example 22. Further, FIG. 8 is a transmission electron micrograph showing a particle structure of the magnetic metal particles containing iron as a main component which were obtained in Comparative Example 10.

Example 27

The spindle-shaped goethite particles were subjected to anti-sintering treatment, and then directly heat-reduced in hydrogen at 600° C., thereby producing magnetic spindle-shaped metal particles containing iron as a main component. Production conditions and various properties of the obtained magnetic metal particles containing iron as a main component, are shown in Table 4.

Goethite Particles 1 to 4

Four kinds of spindle-shaped goethite particles as sharing particles having various properties shown in Table 5, were prepared in the similar manner to production method as defined in Example 4.

Examples 28 to 31 and Comparative Examples 15 to 18

The same procedure as defined in Example 5 was conducted except that kind of stating particles, kind and composition ratio of the coating material used for the anti-sintering treatment, and the dehydrating temperature, the heating temperature and the atmosphere upon transforming the starting particles into hematite particles, were varied, thereby producing spindle-shaped hematite particles. Anti-sintering treatment conditions and conditions of the production of hematite particles are shown in Table 6, and various properties of the obtained spindle-shaped hematite particles are shown in Table 7.

Reference Example 1

According to the method of transforming goethite into hematite as described in Japanese Patent Application Laid-Open (KOKAI) No. 9-316461(1997), spindle-shaped goethite particles which were previously subjected to an anti-sintering treatment, were heated at 600° C., thereby producing spindle-shaped hematite particles.

Reference Example 2

According to the method of transforming goethite into hematite as described in Japanese Paten. Application Laid-Open (KOKAI) No. 9-31646(1997), spindle-shaped goethite particles which were previously subjected to anti-sintering treatment, were heated at 650° C., thereby producing spindle-shaped hematite particles.

The treatment conditions are shown in Table 6, and various properties of the obtained spindle-shaped hematite particles are shown in Table 7.

Examples 31 to 35 Reference Examples 3 to 4 and Comparative Examples 19 to 22

Respective spindle-shaped hematite particles as shown in Table 7, were heat-reduced at 600° C. In the same manner as in Example 6, thereby producing magnetic spindle-shaped metal particles.

Various properties of the obtained magnetic spindle-shaped metal particles are shown in Table 8.

The respective magnetic spindle-shaped metal particles as shown in Table 8, were treated in the same manner as in Example 6, thereby producing magnetic coating films.

Various properties of the obtained magnetic coating films are shown in Table 9.

Spindle-shaped Goethite Particles 5 to 6

Two kinds of spindle-shaped goethite particles as starting particles having various properties shown in Table 10, were prepared in the similar manner to production method as defined on Example 4.

Spindle-shaped Hematite Particles 1 to 4

The same procedure as defined in Example 5 was conducted except that kind of the spindle-shaped goethite particles, kind and amount of fine coating material used for the anti-sintering treatment and the heat-dehydrating temperature were varied, thereby producing spindle-shaped hematite particles. Production conditions and various properties of the obtained spindle-shaped hematite particles are shown in Tables 11 and 12.

Examples 36 to 40 and Comparative Examples 23 to 29

The same procedure as defined in Example 7 was conducted except that kind of the spindle-shaped hematite particles, the fixed-bed height, kind of the heating gas, kind of the reducing gas, the linear velocity and the reducing temperature were varied, thereby producing magnetic spindle-shaped metal particles. Production conditions and various properties of the obtained magnetic spindle-shaped metal particles are shown in Tables 13 and 14.

In Example 36 and Comparative Example 23, a part of the magnetic spindle-shaped metal particles were taken out from the lower and upper portions of the fixed-bed in the same manner as in Example 7. Various properties of the magnetic spindle-shaped metal particles take out from the fixed-bed, are shown in Table 15.

Using the respective magnetic spindle-shaped metal particles as shown in Table 14, magnetic coating films were produced in the same manner as in Example 7. Various properties of the obtained magnetic coating films are shown in Table 16.

TABLE 1

Production of spindle-shaped goethite particles
Production reaction of spindle-shaped goethite seed crystal particles

| Examples and Comparative Examples | Mixed aqueous alkali solution | | | | | | Aqueous ferrous salt solution | | Equivalent ratio: whole alkali /$Fe^{2+}$ (*) | Aging | | Linear velocity of nitrogen passed (cm/s) |
|---|---|---|---|---|---|---|---|---|---|---|---|---|
| | Aqueous alkali carbonate solution | | Aqueous alkali hydroxide solution | | Alkali ratio: 1/2 × alkali hydroxide /whole alkali (%) | | | | | Temperature (° C.) | Time (hr) | |
| | Kind | Amount used (mol) | Kind | Amount used (mol) | | Kind | Amount used (mol) | | | | | |
| Example 8 | $Na_2CO_3$ | 25 | NaOH | 20 | 28.6 | $FeSO_4$ | 20 | 1.75 | 47 | 5 | 3.31 |
| Example 9 | $Na_2CO_3$ | 25 | NaOH | 20 | 28.6 | $FeSO_4$ | 20 | 1.75 | 47 | 5 | 2.21 |
| Example 10 | $Na_2CO_3$ | 25 | NaOH | 20 | 28.6 | $FeSO_4$ | 20 | 1.75 | 47 | 5 | 2.21 |
| Example 11 | $Na_2CO_3$ | 25 | NaOH | 24 | 32.4 | $FeSO_4$ | 20 | 1.85 | 47 | 5 | 4.42 |
| Example 12 | $Na_2CO_3$ | 25 | NaOH | 24 | 32.4 | $FeSO_4$ | 20 | 1.85 | 47 | 5 | 4.42 |
| Example 13 | $Na_2CO_3$ | 25 | NaOH | 24 | 32.4 | $FeSO_4$ | 20 | 1.85 | 47 | 5 | 4.42 |
| Example 14 | $Na_2CO_3$ | 25 | NaOH | 20 | 28.6 | $FeSO_4$ | 20 | 1.75 | 47 | 5 | 2.21 |
| Comparative Example 1 | $Na_2CO_3$ | 25 | NaOH | 20 | 28.6 | $FeSO_4$ | 20 | 1.75 | 47 | 5 | 2.21 |
| Comparative Example 2 | $Na_2CO_3$ | 25 | NaOH | 20 | 28.6 | $FeSO_4$ | 20 | 1.75 | 47 | 5 | 2.21 |
| Comparative Example 3 | $Na_2CO_3$ | 25 | NaOH | 20 | 28.6 | $FeSO_4$ | 20 | 1.75 | 47 | 5 | 2.21 |
| Comparative Example 4 | $Na_2CO_3$ | 25 | NaOH | 15 | 23.1 | $FeSO_4$ | 20 | 1.625 | 47 | 5 | 2.21 |

(Note)
*: calculated assuming that the whole alkali was composed of (½ × alkali hydroxide + alkali carbonate).

Production of spindle-shaped geothite particles

TABLE 1-continued

Production reaction of spindle-shaped goethite seed crystal particles

| Examples and Comparative Examples | Production reaction of spindle-shaped goethite seed crystal particles | | | | | Growth reaction of seed crystal particles | | | Amount of air passed | |
|---|---|---|---|---|---|---|---|---|---|---|
| | Cobalt compound | | | Linear velocity of air passed (cm/s) | Temperature (° C.) | Aluminum compound | | Timing of addition (percentage of oxidation (*) | Linear velocity (cm/s) | Ratio to linear velocity upon production of seed crystal |
| | Kind | Amount used (mol) | Timing of addition | | | Kind | Amount used (mol) | | | |
| Example 8 | CoSO$_4$ | 4 | 0.5 h after aging | 1.99 | 47 | Aluminum sulfate | 1.6 | 60 | 4.42 | 2.22 |
| Example 9 | CoSO$_4$ | 2 | 2.0 h after aging | 1.99 | 47 | Aluminum sulfate | 2.0 | 50 | 4.42 | 2.22 |
| Example 10 | CoSO$_4$ | 2 | 2.0 h after aging | 1.55 | 47 | Aluminum sulfate | 1.4 | 40 | 3.31 | 2.14 |
| Example 11 | CoSO$_4$ | 6 | 0.25 h after aging | 1.10 | 47 | Aluminum sulfate | 2.4 | 50 | 3.31 | 3 |
| Example 12 | CoSO$_4$ | 6 | 0.25 h after aging | 1.10 | 47 | Aluminum sulfate | 1.4 | 50 | 3.31 | 3 |
| Example 13 | CoSO$_4$ | 6 | 0.25 h after aging | 1.10 | 47 | Aluminum sulfate | 2.0 | 70 | 3.31 | 3 |
| Example 14 | CoSO$_4$ | 4 | 0.5 h after aging | 1.32 | 47 | Aluminum sulfate | 2.4 | 40 | 3.31 | 2.5 |
| Comparative Example 1 | CoSO$_4$ | 4 | 0.5 h after aging | 1.32 | 47 | Aluminum sulfate | 2.4 | 40 | 1.32 | 1 |
| Comparative Example 2 | CoSO$_4$ | 4 | 0.5 h after aging | 1.32 | 47 | Aluminum sulfate | 2.4 | 40 | 1.98 | 1.5 |
| Comparative Example 3 | COSO$_4$ | 4 | 0.5 h after aging | 1.32 | 47 | Aluminum sulfate | 2.4 | 100 | 3.31 | 2.5 |
| Comparative Example 4 | CoSO$_4$ | 1 | 4.75 h after aging | 2.65 | 47 | Aluminum sulfate | 0.6 | 70 | 2.65 | 1 |

(Note)
*: added together with 10 mol of Fe$^{2+}$ and ½ of mixed alkali used upon the production of seed crystal, after the production reaction of seed crystal.

TABLE 2

Properties of goethite particles

| Examples and Comparative Examples | Kind | Shape | Average major axial diameter: 1 (μm) | Standard deviation: σ | particle size distribution: σ/l | Average minor axial diameter (μm) | Aspect ratio | BET specific surface area (m$^2$/g) | Composition ratio of seed portion | | Co content: Co/Fe (atm %) | Al content: Al/Fe (atm %) |
|---|---|---|---|---|---|---|---|---|---|---|---|---|
| | | | | | | | | | Co content in seed crystal to Fe in seed crystal (atm %) | Relationship of Co concentration in seed crystal to Co concentration in particle | | |
| Example 8 | Goethite | Spindle- | 0.122 | 0.0241 | 0.198 | 0.0165 | 7.4 | 183.0 | 16.3 | 81.5 | 20 | 8 |

TABLE 2-continued

Properties of goethite particles

| Examples and Comparative Examples | Kind | Shape | Average major axial diameter: l (μm) | Standard deviation: σ | particle size distribution: σ/l | Average minor axial diameter (μm) | Aspect ratio | BET specific surface area (m²/g) | Co content in seed crystal to Fe in seed crystal (atm %) | Relationship of Co concentration in seed crystal to Co concentration in particle | Co content: Co/Fe (atm %) | Al content: Al/Fe (atm %) |
|---|---|---|---|---|---|---|---|---|---|---|---|---|
| Example 9 | Goethite particles | Spindle-shaped | 0.132 | 0.0259 | 0.196 | 0.0181 | 7.3 | 175.9 | 7.3 | 72.5 | 10 | 10 |
| Example 10 | Goethite particles | Spindle-shaped | 0.135 | 0.0262 | 0.194 | 0.0175 | 7.7 | 166.5 | 6.2 | 61.5 | 10 | 7 |
| Example 11 | Goethite particles | Spindle-shaped | 0.121 | 0.0238 | 0.197 | 0.0170 | 7.1 | 207.6 | 21.8 | 72.5 | 30 | 12 |
| Example 12 | Goethite particles | Spindle-shaped | 0.129 | 0.0249 | 0.193 | 0.0179 | 7.2 | 192.5 | 21.7 | 72.3 | 30 | 7 |
| Example 13 | Goethite particles | Spindle-shaped | 0.142 | 0.0278 | 0.196 | 0.0195 | 7.3 | 184.3 | 26.6 | 88.8 | 30 | 10 |
| Example 14 | Goethite particles | Spindle-shaped | 0.130 | 0.0251 | 0.193 | 0.0173 | 7.5 | 180.3 | 12.3 | 61.5 | 20 | 12 |
| Comparative Example 1 | Goethite particles | Spindle-shaped | 0.126 | 0.0311 | 0.247 | 0.0198 | 6.4 | 143.9 | 12.3 | 61.5 | 20 | 12 |
| Comparative Example 2 | Goethite particles | Spindle-shaped | 0.127 | 0.0316 | 0.249 | 0.0195 | 6.5 | 160.5 | 12.3 | 61.5 | 20 | 12 |
| Comparative Example 3 | Goethite particles | Spindle-shaped | 0.146 | 0.0389 | 0.266 | 0.0182 | 8.0 | 201.3 | 20.0 | 100 | 20 | 12 |
| Comparative Example 4 | Goethite particles | Spindle-shaped | 0.131 | 0.0326 | 0.249 | 0.0168 | 7.8 | 131.4 | 4.4 | 88.8 | 5 | 3 |

TABLE 3

Production conditions of hematite particles

| Examples and Comparative Examples | Anti-sintering agent | | | | Heat-treatment | | Properties of hematite particles | | | |
|---|---|---|---|---|---|---|---|---|---|---|
| | Compound of rare earth element | | Other compound | | | | | | Average major axial diameter: l (μm) | Standard deviation: σ |
| | Kind | Amount added (g) | Kind | Amount added (g) | Heating temperature (°C.) | Atmosphere | Kind | Shape | | |
| Example 15 | Yttrium nitrate | 245 | — | — | 600 | Air | Hematite particles | Spindle-shaped | 0.110 | 0.0201 |
| Example 16 | Neodymium nitrate | 225 | — | — | 700 | Air | Hematite particles | Spindle-shaped | 0.123 | 0.0230 |
| Example 17 | Neodymium nitrate | 150 | — | — | 700 | Air | Hematite particles | Spindle-shaped | 0.126 | 0.0236 |
| Example 18 | Yttrium nitrate | 230 | — | — | 600 | Air | Hematite particles | Spindle-shaped | 0.111 | 0.0206 |
| Example 19 | Yttrium nitrate | 340 | — | — | 600 | Air | Hematite particles | Spindle-shaped | 0.120 | 0.0222 |
| Example 20 | Praseodymium nitrate | 260 | — | — | 600 | Air | Hematite particles | Spindle-shaped | 0.131 | 0.0247 |
| Comparative Example 5 | Yttrium nitrate | 245 | — | — | 600 | Air | Hematite particles | Spindle-shaped | 0.118 | 0.0290 |
| Comparative Example 6 | Yttrium nitrate | 245 | — | — | 600 | Air | Hematite particles | Spindle-shaped | 0.119 | 0.0291 |
| Comparative Example 7 | Yttrium nitrate | 245 | — | — | 600 | Air | Hematite particles | Spindle-shaped | 0.136 | 0.0342 |
| Comparative Example 8 | — | | Boric acid | 150 | 400 | Air | Hematite particles | Spindle-shaped | 0.121 | 0.0279 |

TABLE 3-continued

| | | | | | | | | | | |
|---|---|---|---|---|---|---|---|---|---|---|
| Comparative Example 9 | Yttrium nitrate | 605 | — | — | 600 | Air | Hematite particles | Spindle-shaped | 0.118 | 0.0242 |

| | | | | Production conditions of hematite particles Properties of hematite particles | | | | | |
|---|---|---|---|---|---|---|---|---|---|
| | | | | | Composition ratio of seed portion | | | | |
| Examples and Comparative Examples | particle size distri- bution: σ/l | Average minor axial diameter (μm) | Aspect ratio | BET specific surface area (m²/g) | Co content in seed crystal to Fe in seed crystal (atm %) | Relation- ship of Co concentra- tion in seed crystal to Co concentra- tion in particle | Co content: Co/Fe (atm %) | Al content: Al/Fe (atm %) | Content of rare earth Element: Re/Fe (atm %) |
| Example 15 | 0.183 | 0.0156 | 7.0 | 85.1 | 16.3 | 81.5 | 20 | 8 | Ln: 8 |
| Example 16 | 0.187 | 0.0173 | 7.1 | 63.6 | 7.3 | 72.5 | 10 | 10 | Ln: 6 |
| Example 17 | 0.188 | 0.0168 | 7.5 | 62.3 | 6.2 | 61.5 | 10 | 7 | Ln: 4 |
| Example 18 | 0.185 | 0.0162 | 6.9 | 98.5 | 21.8 | 72.5 | 30 | 12 | Ln: 8 |
| Example 19 | 0.185 | 0.0170 | 7.1 | 92.3 | 21.7 | 72.3 | 30 | 7 | Ln: 12 |
| Example 20 | 0.189 | 0.0189 | 6.9 | 94.8 | 26.6 | 88.8 | 30 | 10 | Ln: 8 |
| Comparative Example 5 | 0.246 | 0.0190 | 6.2 | 64.3 | 12.3 | 61.5 | 20 | 12 | Ln: 8 |
| Comparative Example 6 | 0.245 | 0.0187 | 6.4 | 72.0 | 12.3 | 61.5 | 20 | 12 | Ln: 8 |
| Comparative Example 7 | 0.251 | 0.0175 | 7.8 | 82.1 | 20.0 | 100 | 20 | 12 | Ln: 8 |
| Comparative Example 8 | 0.230 | 0.0160 | 7.6 | 69.8 | 4.4 | 88.8 | 5 | 3 | B: 10 |
| Comparative Example 9 | 0.205 | 0.0160 | 7.4 | 110.4 | 12.3 | 61.4 | 20 | 12 | Ln: 20 |

TABLE 4

| | | Properties of magnetic metal particles containing iron as main component* | | Properties of magnetic metal particles containing iron as main component | | | | | | | |
|---|---|---|---|---|---|---|---|---|---|---|---|
| Examples and Comparative Examples | Heat- reduction Reducing temperature (° C.) | Average major axial diameter: l (μm) | Standard deviation: σ | particle size distri- bution: σ/l | Average minor axial diameter (μm) | Aspect ratio | BET specific surface area (m²/g) | X-ray crystal- lite size: $D_{110}$ (nm) | Co content: Co/Fe (atm %) | Al content: Al/Fe (atm %) | Content of rare earth element: Re/Fe (atm %) |
| Example 21 | 600 | 0.102 | 0.0161 | 0.157 | 0.0152 | 6.7 | 46.6 | 14.9 | 20 | 8 | Ln: 8 |
| Example 22 | 500 | 0.110 | 0.0174 | 0.159 | 0.0165 | 6.6 | 48.7 | 15.5 | 10 | 10 | Ln: 6 |
| Example 23 | 500 | 0.114 | 0.0183 | 0.160 | 0.0163 | 7.0 | 45.0 | 14.1 | 10 | 7 | Ln: 4 |
| Example 24 | 600 | 0.100 | 0.0159 | 0.158 | 0.0155 | 6.5 | 48.7 | 15.5 | 30 | 12 | Ln: 8 |
| Example 25 | 600 | 0.106 | 0.0168 | 0.159 | 0.0161 | 6.6 | 49.8 | 15.2 | 30 | 7 | Ln: 12 |
| Example 26 | 600 | 0.118 | 0.0189 | 0.160 | 0.0182 | 6.5 | 48.1 | 15.9 | 30 | 10 | Ln: 8 |
| Example 27 | note 3) 600 | 0.105 | 0.0192 | 0.183 | 0.0162 | 6.5 | 42.3 | 16.0 | 20 | 12 | Ln: 8 |
| Comparative Example 10 | 600 | 0.105 | 0.0220 | 0.210 | 0.0181 | 5.8 | 43.8 | 16.7 | 20 | 12 | Ln: 8 |
| Comparative Example 11 | 600 | 0.108 | 0.0225 | 0.208 | 0.0183 | 5.9 | 44.9 | 16.5 | 20 | 12 | Ln: 8 |
| Comparative Example 12 | 600 | 0.123 | 0.0269 | 0.219 | 0.0161 | 7.6 | 56.2 | 16.7 | 20 | 12 | Ln: 3 |
| Comparative Example 13 | 400 | 0.109 | 0.0229 | 0.210 | 0.0153 | 7.1 | 61.2 | 14.0 | 5 | 3 | B: 10 |
| Comparative Example 14 | 600 | 0.110 | 0.0275 | 0.250 | 0.0150 | 7.3 | 61.9 | 16.8 | 20 | 12 | Ln: 20 |

Note
*: treated with 245 g of yttrium nitrate as an anti-sintering agent.

TABLE 4-continued

| | | Properties of magnetic metal particles containing iron as main component | | | | | Sheet characteristics | | | | |
|---|---|---|---|---|---|---|---|---|---|---|---|
| Examples and Comparative Examples | | Coercive force: Hc (Oe) | Particle coercive force distribution: SFDr | Saturation magnetization σ: (emu/g) | Squareness: σr/σs | Δσs (%) | Coercive force: Hc (Oe) | Saturation magnetic flux density: Bm (G) | Squareness: Br/Bm | SFD | ΔBm (%) |
| Example 21 | | 2,264 | 0.702 | 146.3 | 0.538 | 9.7 | 2,320 | 4,096 | 0.867 | 0.395 | 6.9 |
| Example 22 | | 2,022 | 0.682 | 135.4 | 0.526 | 7.3 | 2,067 | 3,712 | 0.878 | 0.390 | 4.7 |
| Example 23 | | 1,958 | 0.695 | 126.9 | 0.516 | 9.5 | 1,995 | 3,376 | 0.875 | 0.392 | 6.8 |
| Example 24 | | 2,241 | 0.692 | 146.6 | 0.541 | 6.8 | 2,291 | 4,130 | 0.873 | 0.394 | 4.8 |
| Example 25 | | 2,163 | 0.713 | 143.0 | 0.540 | 9.5 | 2,186 | 3,972 | 0.870 | 0.401 | 7.1 |
| Example 26 | | 2,068 | 0.715 | 151.2 | 0.529 | 9.5 | 2,083 | 4,280 | 0.861 | 0.403 | 7.6 |
| Example 27 | | 2,019 | 0.718 | 153.4 | 0.518 | 9.7 | 2,036 | 4,261 | 0.858 | 0.418 | 7.7 |
| Comparative Example 10 | | 2,064 | 0.732 | 143.4 | 0.502 | 13.1 | 2,061 | 3,988 | 0.840 | 0.458 | 12.0 |
| Comparative Example 11 | | 2,098 | 0.730 | 142.2 | 0.505 | 12.4 | 2,107 | 3,950 | 0.845 | 0.447 | 11.0 |
| Comparative Example 12 | | 1,943 | 0.761 | 135.3 | 0.501 | 12.4 | 1,921 | 3,690 | 0.833 | 0.465 | 11.4 |
| Comparative Example 13 | | 1,803 | 0.783 | 122.0 | 0.503 | 13.7 | 1,847 | 3,186 | 0.864 | 0.485 | 13.8 |
| Comparative Example 14 | | 2,120 | 0.771 | 122.2 | 0.510 | 12.1 | 2,144 | 3,220 | 0.844 | 0.478 | 11.0 |

TABLE 5

| | Properties of Goethite particles | | | | | | |
|---|---|---|---|---|---|---|---|
| Starting particles | Average major axial diameter (μm) | Standard deviation (μm) | Particle size distribution (-) | Average minor axial diameter (μm) | | Co content: Co/Fe (atm %) | Al content: Al/Fe (atm %) |
| Goethite particles 1 | 0.130 | 0.0246 | 0.189 | 0.0171 | | 21 | 8 |
| Goethite particles 2 | 0.141 | 0.0271 | 0.192 | 0.0186 | | 21 | 10 |
| Goethite particles 3 | 0.120 | 0.0227 | 0.189 | 0.0162 | | 21 | 7 |
| Goethite particles 4 | 0.134 | 0.0265 | 0.198 | 0.0174 | | 10 | 4 |

| | Properties of goethite particles | | | |
|---|---|---|---|---|
| | | | Composition ratio of seed portion | |
| Starting particles | Aspect ratio (-) | BET specific surface area (m²/g) | Co content in seed crystal to Fe in seed crystal (atm %) | Relationship of Co concentration in seed crystal to Co concentration in particle |
| Goethite particles 1 | 7.6 | 165.4 | 12.9 | 61.4 |
| Goethite particles 2 | 7.6 | 169.5 | 13.0 | 61.9 |
| Goethite particles 3 | 7.4 | 158.8 | 12.9 | 61.4 |
| Goethite particles 4 | 7.7 | 150.3 | 6.0 | 60.0 |

TABLE 6

| Examples, Reference Examples and Comparative Examples | Starting particles | Anti-sintering treatment | | |
|---|---|---|---|---|
| | | Compound of rare earth element | | Cobalt |
| | | Kind | Re content: Re/Fe (atm %) | Co content: Co/Fe (atm %) |
| Example 28 | Goethite particles 1 | Y(NO₃)₃ | 8 | 9 |
| Example 29 | Goethite particles 1 | Y(NO₃)₃ | 6 | 4 |
| Example 30 | Goethite particles 2 | Y(NO₃)₃ | 6 | — |
| Example 31 | Goethite particles 3 | Nd(NO₃)₃ | 10 | — |
| Reference Example 1 | Goethite particles 1 | Y(NO₃)₃ | 8 | 10 |
| Reference Example 2 | Goethite particles 2 | Y(NO₃)₃ | 6 | — |
| Comparative Example 15 | Goethite particles 1 | Y(NO₃)₃ | 8 | 9 |
| Comparative Example 16 | Goethite particles 1 | Y(NO₃)₃ | 8 | 9 |

TABLE 6-continued

| | | | | |
|---|---|---|---|---|
| Comparative Example 17 | Goethite particles 1 | Y(NO₃)₃ | 8 | 9 |
| Comparative Example 18 | Goethite particles 4 | Y(NO₃)₃ | 4 | — |

| Examples, Reference Examples and Comparative Examples | Conditions of conversion into hematite | | | |
|---|---|---|---|---|
| | Dehydrating temperature (°C.) | Atmosphere | Heating temperature (°C.) | Atmosphere |
| Example 28 | 300 | Air | 600 | Air |
| Example 29 | 280 | Air | 553 | Air |
| Example 30 | 320 | Air | 650 | Air |
| Example 31 | 320 | Air | 650 | Air |
| Reference Example 1 | — | — | 600 | Air |
| Reference Example 2 | — | — | 650 | Air |
| Comparative Example 15 | 300 | Air | 750 | Air |
| Comparative Example 16 | 300 | Air | 400 | Air |
| Comparative Example 17 | 300 | N₂ | 600 | N₂ |
| Comparative Example 18 | 300 | Air | 600 | Air |

TABLE 7

Properties of hematite particles

| Starting particles | Average major axial diameter (μm) | Standard deviation (μm) | Particle size distribution (-) | Average minor axial diameter (μm) |
|---|---|---|---|---|
| Example 28 | 0.120 | 0.0215 | 0.179 | 0.0164 |
| Example 29 | 0.115 | 0.0205 | 0.178 | 0.0162 |
| Example 30 | 0.129 | 0.0222 | 0.172 | 0.0172 |
| Example 31 | 0.106 | 0.0190 | 0.179 | 0.0149 |
| Reference Example 1 | 0.114 | 0.0211 | 0.185 | 0.0163 |
| Reference Example 2 | 0.124 | 0.0234 | 0.189 | 0.180 |
| Comparative Example 15 | 0.117 | 0.0302 | 0.258 | 0.0191 |
| Comparative Example 16 | 0.125 | 0.0226 | 0.181 | 0.0160 |
| Comparative Example 17 | 0.114 | 0.0298 | 0.261 | 0.0178 |
| Comparative Example 18 | 0.115 | 0.031 | 0.270 | 0.0177 |

| Examples, Reference Examples and Comparative Examples | Properties of hematite particles | | | |
|---|---|---|---|---|
| | Aspect ratio (-) | BET specific surface area (m²/g) | $D_{104}$ (Å) | σs (emu/g) |
| Example 28 | 7.3 | 88.2 | 78 | 1.2 |
| Example 29 | 7.1 | 85.4 | 75 | 0.8 |
| Example 30 | 7.5 | 81.7 | 74 | 0.8 |
| Example 31 | 7.1 | 90.3 | 70 | 0.7 |
| Reference Example 1 | 7.0 | 84.4 | 91 | 3.0 |
| Reference Example 2 | 6.9 | 76.9 | 87 | 3.1 |
| Comparative Example 15 | 6.1 | 62.2 | 103 | 16.8 |
| Comparative Example 16 | 7.8 | 151.6 | 38 | 0.2 |
| Comparative Example 17 | 6.4 | 65.5 | 105 | 15.1 |
| Comparative Example 18 | 6.5 | 58.6 | 90 | 2.8 |

| Examples, Reference Examples and Comparative Examples | Properties of hematite particles | | |
|---|---|---|---|
| | Co content: Co/Fe (atm %) | Al content: Al/Fe (atm %) | Content of rare earth element: Re/Fe (atm %) |
| Example 28 | 30 | 8 | 8 |
| Example 29 | 25 | 8 | 6 |
| Example 30 | 21 | 10 | 6 |
| Example 31 | 21 | 7 | 10 |
| Reference Example 1 | 30 | 8 | 8 |
| Reference Example 2 | 21 | 10 | 6 |
| Comparative Example 15 | 30 | 8 | 8 |
| Comparative Example 16 | 30 | 8 | 8 |
| Comparative Example 17 | 30 | 8 | 8 |
| Comparative Example 18 | 10 | 4 | 4 |

TABLE 8

| Examples, Reference Examples and Comparative Examples | Heat-reduction Reducing temperature (°C.) | Properties of magnetic spindle-shaped metal particles | |
|---|---|---|---|
| | | Average major axial diameter (μm) | Standard deviation (μm) |
| Example 32 | 600 | 0.101 | 0.0158 |
| Example 33 | 600 | 0.098 | 0.0151 |
| Example 34 | 600 | 0.112 | 0.0171 |
| Example 35 | 600 | 0.091 | 0.0137 |
| Reference Example 3 | 600 | 0.100 | 0.0168 |
| Reference Example 4 | 600 | 0.110 | 0.0184 |
| Comparative Example 19 | 600 | 0.097 | 0.0221 |
| Comparative Example 20 | 600 | 0.081 | 0.0273 |
| Comparative Example 21 | 600 | 0.098 | 0.0228 |
| Comparative Example 22 | 600 | 0.106 | 0.0263 |

| Examples, Reference Examples and Comparative Examples | Properties of magnetic spindle-shaped metal particles | | | |
|---|---|---|---|---|
| | particle size distribution (-) | Average minor axial diameter (μm) | Aspect ratio (-) | BET specific surface area (m²/g) |
| Example 32 | 0.156 | 0.0146 | 6.9 | 48.6 |
| Example 33 | 0.154 | 0.0151 | 6.5 | 49.8 |
| Example 34 | 0.153 | 0.0165 | 6.8 | 47.1 |
| Example 35 | 0.151 | 0.0140 | 6.5 | 52.3 |
| Reference Example 3 | 0.168 | 0.0154 | 6.5 | 47.2 |
| Reference Example 4 | 0.167 | 0.0169 | 6.5 | 46.8 |
| Comparative | 0.228 | 0.0167 | 5.8 | 38.6 |

TABLE 8-continued

| | | | | |
|---|---|---|---|---|
| Example 19 | | | | |
| Comparative Example 20 | 0.337 | 0.0169 | 4.8 | 52.6 |
| Comparative Example 21 | 0.233 | 0.0166 | 5.9 | 45.5 |
| Comparative Example 22 | 0.248 | 0.0171 | 6.2 | 40.3 |

Properties of magnetic spindle-shaped metal particles

| Examples, Reference Examples and Comparative Examples | $D_{110}$ (nm) | Co content: Co/Fe (atm %) | Al content: Al/Fe (atm %) | Content of rare earth element: Re/Fe (atm %) |
|---|---|---|---|---|
| Example 32 | 15.8 | 30 | 8 | 8 |
| Example 33 | 15.5 | 25 | 8 | 6 |
| Example 34 | 16.0 | 21 | 10 | 6 |
| Example 35 | 14.8 | 21 | 7 | 10 |
| Reference Example 3 | 15.6 | 30 | 8 | 8 |
| Reference Example 4 | 16.1 | 21 | 10 | 6 |
| Comparative Example 19 | 16.3 | 30 | 8 | 8 |
| Comparative Example 20 | 16.7 | 30 | 8 | 8 |
| Comparative Example 21 | 15.9 | 30 | 8 | 8 |
| Comparative Example 22 | 16.0 | 10 | 4 | 4 |

Properties of magnetic spindle-shaped metal particles

| Examples, Reference Examples and Comparative Examples | Coercive force: Hc (Oe) | Saturation magnetization: σs (emu/g) | Δσs (%) | Squareness: σr/σs |
|---|---|---|---|---|
| Example 32 | 2,289 | 142.2 | 6.8 | 0.534 |
| Example 33 | 2,280 | 138.9 | 6.5 | 0.532 |
| Example 34 | 2,207 | 141.3 | 5.7 | 0.529 |
| Example 35 | 2,276 | 136.1 | 7.2 | 0.530 |
| Reference Example 3 | 2,242 | 145.3 | 8.3 | 0.530 |
| Reference Example 4 | 2,152 | 142.5 | 7.8 | 0.521 |
| Comparative Example 19 | 2,033 | 148.8 | 13.0 | 0.509 |
| Comparative Example 20 | 1,932 | 131.4 | 14.4 | 0.498 |
| Comparative Example 21 | 2,200 | 146.8 | 11.2 | 0.516 |
| Comparative Example 22 | 1,904 | 138.3 | 10.4 | 0.501 |

TABLE 9

Properties of magnetic coating film

| Examples, Reference Examples and Comparative Examples | Coercive force: Hc (Oe) | Saturation magnetic flux density: Bm (G) | Squareness Br/Bm | SFD | ΔBm (%) |
|---|---|---|---|---|---|
| Example 32 | 2,332 | 3,932 | 0.870 | 0.387 | 5.0 |
| Example 33 | 2,319 | 3,850 | 0.875 | 0.380 | 4.3 |
| Example 34 | 2,254 | 3,913 | 0.869 | 0.387 | 3.9 |
| Example 35 | 2,321 | 3,782 | 0.865 | 0.384 | 5.4 |

TABLE 9-continued

Properties of magnetic coating film

| Examples, Reference Examples and Comparative Examples | Coercive force: Hc (Oe) | Saturation magnetic flux density: Bm (G) | Squareness Br/Bm | SFD | ΔBm (%) |
|---|---|---|---|---|---|
| Reference Example 3 | 2,289 | 4,022 | 0.870 | 0.393 | 6.1 |
| Reference Example 4 | 2,193 | 3,940 | 0.868 | 0.398 | 6.0 |
| Comparative Example 19 | 2,013 | 4,133 | 0.843 | 0.469 | 12.4 |
| Comparative Example 20 | 1,903 | 3,638 | 0.821 | 0.512 | 13.8 |
| Comparative Example 21 | 2,167 | 4,061 | 0.840 | 0.488 | 10.5 |
| Comparative Example 22 | 1,944 | 3,847 | 0.836 | 0.501 | 10.6 |

TABLE 10

Properties of spindle-shaped goethite particles

| Starting particles | Average major axial diameter (μm) | Standard deviation | Particle size distribution (-) | Average minor axial diameter (μm) |
|---|---|---|---|---|
| Goethite particles 5 | 0.126 | 0.0238 | 0.189 | 0.0175 |
| Goethite particles 6 | 0.138 | 0.0258 | 0.187 | 0.0177 |

Properties of goethite particles

| Starting particles | Aspect ratio (-) | BET specific surface area (m²/g) | Composition ratio of seed portion — Co content in seed crystal to Fe in seed crystal (atm %) | Relationship of Co concentration in seed crystal to Co concentration in particle |
|---|---|---|---|---|
| Goethite particles 5 | 7.2 | 193.2 | 15.4 | 61.6 |
| Goethite particles 6 | 7.8 | 170.3 | 12.9 | 61.4 |

Properties of Goethite particles

| Stating particles | Co content: Co/Fe (atm %) | Al content: Al/Fe (atm %) |
|---|---|---|
| Goethite particles 5 | 25 | 10 |
| Goethite particles 6 | 21 | 8 |

TABLE 11

| Hematite particles | Starting particles | Anti-sintering treatment Compound of rare earth element | |
|---|---|---|---|
| | | Kind | Re content: Re/Fe (atm %) |
| Hematite particles 1 | Goethite particles 5 | Y(NO₃)₃ | 8 |
| Hematite particles 2 | Goethite particles 5 | Nd(NO₃)₃ | 10 |
| Hematite particles 3 | Goethite particles 6 | Y(NO₃)₃ | 6 |
| Hematite particles 4 | Goethite particles 6 | Nd(NO₃)₃ | 8 |

| Hematite particles | Anti-sintering treatment Cobalt compound | | Conditions of conversion into hematite | |
|---|---|---|---|---|
| | Kind | Co content: Co/Fe (atm %) | Dehydrating temperature (° C.) | Heating temperature (° C.) |
| Hematite particles 1 | CoSO₄ | 10 | 300 | 600 |
| Hematite particles 2 | CoSO₄ | 10 | 330 | 650 |
| Hematite particles 3 | CoSO₄ | 9 | 300 | 550 |
| Hematite particles 4 | Co(C₂H₃O₂)₂ | 4 | 330 | 600 |

TABLE 12

| Hematite particles | Properties of hematite particles | | | |
|---|---|---|---|---|
| | Average major axial diameter (μm) | Standard deviation (μm) | Particle size distribution (-) | Average minor axial diameter (μm) |
| Hematite particles 1 | 0.117 | 0.0205 | 0.175 | 0.0167 |
| Hematite particles 2 | 0.113 | 0.0192 | 0.170 | 0.0169 |
| Hematite particles 3 | 0.129 | 0.0232 | 0.180 | 0.0170 |
| Hematite particles 4 | 0.125 | 0.0220 | 0.176 | 0.0171 |

| Hematite particles | Properties of hematite particles | | | | |
|---|---|---|---|---|---|
| | Aspect ratio (-) | BET specific surface area (m²/g) | Co content: Co/Fe (atm %) | Al content: Al/Fe (atm %) | Content of rare earth element: Re/Fe (atm %) |
| Hematite particles 1 | 7.0 | 92.3 | 35 | 10 | 8 |
| Hematite particles 2 | 6.7 | 84.7 | 35 | 10 | 10 |
| Hematite particles 3 | 7.6 | 90.1 | 30 | 8 | 6 |
| Hematite particles 4 | 7.3 | 88.2 | 25 | 8 | 8 |

TABLE 13

| Examples and Comparative Examples | Hematite particles or Goethite particles used | Reduction conditions | |
|---|---|---|---|
| | | Bed height (cm) | Kind of heating gas |
| Example 36 | Hematite particles 1 | 27 | N₂ |
| Example 37 | Hematite particles 2 | 30 | N₂ |
| Example 38 | Hematite particles 3 | 10 | N₂ |
| Example 39 | Hematite particles 4 | 20 | N₂ |
| Example 40 | Goethite particles 5 | 15 | N₂ |
| Comparative Example 23 | Hematite particles 1 | 27 | H₂ |
| Comparative Example 24 | Hematite particles 1 | 27 | N₂ |
| Comparative Example 25 | Hematite particles 2 | 30 | N₂ |
| Comparative Example 26 | Hematite particles 1 | 35 | N₂ |
| Comparative Example 27 | Hematite particles 2 | 30 | N₂ |
| Comparative Example 28 | Hematite particles 3 | 10 | N₂ |
| Comparative Example 29 | Hematite particles 3 | 8 | N₂ |

| Examples and Comparative Examples | Reduction conditions | | |
|---|---|---|---|
| | Kind of reducing gas | Linear velocity (cm/s) | Reducing temperature (° C.) |
| Example 36 | H₂ | 10 | 550 |
| Example 37 | H₂ | 150 | 650 |
| Example 38 | H₂ | 50 | 450 |
| Example 39 | H₂ | 80 | 600 |
| Example 40 | H₂ | 100 | 500 |
| Comparative Example 23 | H₂ | 100 | 550 |
| Comparative Example 24 | H₂ | 30 | 550 |
| Comparative Example 25 | H₂ | 170 | 650 |
| Comparative Example 26 | H₂ | 50 | 550 |
| Comparative Example 27 | H₂ | 50 | 720 |
| Comparative Example 28 | H₂ | 50 | 380 |
| Comparative Example 29 | H₂ | 7 | 400 |

TABLE 14

Properties of magnetic spindle-shaped metal particles

| Examples and Comparative Examples | Average major axial diameter (μm) | Standard deviation (μm) | Particle size distribution (−) | Average minor axial diameter (μm) | Aspect ratio (−) | Co content: Co/Fe (atm %) | Al content: Al/Fe (atm %) | Content of rare earth element: Re/Fe (atm %) |
|---|---|---|---|---|---|---|---|---|
| Example 36 | 0.100 | 0.0155 | 0.150 | 0.0154 | 6.5 | 35 | 10 | 8 |
| Example 37 | 0.095 | 0.0138 | 0.145 | 0.0158 | 6.0 | 35 | 10 | 10 |
| Example 38 | 0.114 | 0.0177 | 0.155 | 0.0163 | 7.0 | 30 | 8 | 6 |
| Example 39 | 0.109 | 0.0166 | 0.152 | 0.0163 | 6.7 | 25 | 8 | 8 |
| Example 40 | 0.101 | 0.0148 | 0.147 | 0.0153 | 6.6 | 35 | 10 | 8 |
| Comparative Example 23 | 0.093 | 0.0190 | 0.204 | 0.0169 | 5.5 | 35 | 10 | 8 |
| Comparative Example 24 | 0.090 | 0.190 | 0.211 | 0.0170 | 5.3 | 35 | 10 | 8 |
| Comparative Example 25 | Unmeasurable because molded particles were scattered and dissipated | | | | | | | |
| Comparative Example 26 | 0.094 | 0.0202 | 0.215 | 0.0157 | 6.0 | 35 | 10 | 8 |
| Comparative Example 27 | 0.070 | 0.0176 | 0.251 | 0.0233 | 3.0 | 35 | 10 | 10 |
| Comparative Example 28 | 0.118 | 0.0180 | 0.153 | 0.0164 | 7.2 | 30 | 8 | 6 |
| Comparative Example 29 | 0.105 | 0.0218 | 0.208 | 0.0219 | 4.8 | 30 | 8 | 6 |

| Examples and Comparative Examples | Properties of magnetic spindle-shaped metal particles | | | | | |
|---|---|---|---|---|---|---|
| | BET specific surface area (m²/g) | $D_{110}$ (Å) | Coercive force: Hc (Oe) | Saturation magnetization: σs (emu/g) | R/S (−) | Δσs (%) |
| Example 36 | 53.8 | 148 | 2,315 | 144.1 | 0.537 | 8.8 |
| Example 37 | 44.3 | 155 | 2,355 | 152.5 | 0.542 | 9.9 |
| Example 38 | 58.7 | 140 | 2,222 | 140.2 | 0.530 | 7.0 |
| Example 39 | 53.2 | 150 | 2,295 | 147.0 | 0.532 | 8.5 |
| Example 40 | 57.2 | 142 | 2,331 | 142.7 | 0.541 | 7.1 |
| Comparative Example 23 | 42.3 | 163 | 1,985 | 143.9 | 0.511 | 11.2 |
| Comparative Example 24 | 39.1 | 167 | 1,958 | 145.0 | 0.510 | 12.3 |
| Comparative Example 25 | Unmeasurable because molded particles were scattered and dissipated | | | | | |
| Comparative Example 26 | 40.3 | 165 | 1,987 | 144.3 | 0.512 | 11.5 |
| Comparative Example 27 | 32.4 | 171 | 1,870 | 145.7 | 0.497 | 10.0 |
| Comparative Example 28 | 68.4 | 118 | 1,872 | 110.5 | 0.513 | 7.1 |
| Comparative Example 29 | 38.3 | 166 | 1,992 | 143.5 | 0.509 | 12.7 |

TABLE 15

Magnetic properties of lower bed portion

| Examples and Comparative Examples | Coercive force: Hc (Oe) | Saturation magnetization: σs (emu/g) | Squareness (−) | $D_{110}$ (Å) |
|---|---|---|---|---|
| (3 cm) | | | | |
| Example 36 | 2,332 | 143.5 | 0.542 | 146 |
| Comparative Example 23 | 2,032 | 138.8 | 0.518 | 155 |
| (25 cm) | | | | |
| Example 36 | 2,306 | 145.0 | 0.539 | 149 |
| Comparative Example 23 | 1,880 | 145.5 | 0.500 | 170 |

TABLE 16

Properties of magnetic coating film

| Examples and Comparative Examples | Coercive force: Hc (Oe) | Saturation magnetic flux density: Bm (Gauss) | Squareness: Br/Bm (−) | SFD (−) | ΔBm (%) |
|---|---|---|---|---|---|
| Example 36 | 2,336 | 4,130 | 0.870 | 0.385 | 6.7 |
| Example 37 | 2,380 | 4,310 | 0.873 | 0.378 | 8.1 |
| Example 38 | 2,260 | 4,000 | 0.877 | 0.393 | 5.1 |
| Example 39 | 2,310 | 4,200 | 0.875 | 0.390 | 6.3 |
| Example 40 | 2,375 | 4,100 | 0.878 | 0.375 | 5.0 |
| Comparative Example 23 | 2,003 | 4,150 | 0.817 | 0.545 | 9.5 |
| Comparative Example 24 | 1,960 | 4,230 | 0.811 | 0.551 | 10.1 |
| Comparative Example 25 | Unmeasurable because molded particles were scattered and dissipated | | | | |
| Comparative | 2,015 | 4,100 | 0.805 | 0.566 | 9.1 |

TABLE 16-continued

| Examples and Comparative Examples | Properties of magnetic coating film | | | | |
|---|---|---|---|---|---|
| | Coercive force: Hc (Oe) | Saturation magnetic flux density: Bm (Gauss) | Squareness: Br/Bm (−) | SFD (−) | ΔBm (%) |
| Example 26 Comparative Example 27 | 1,875 | 4,200 | 0.723 | 0.885 | 8.0 |
| Comparative Example 28 | 1,923 | 3,150 | 0.803 | 0.588 | 5.5 |
| Comparative Example 29 | 2,001 | 4,080 | 0.785 | 0.625 | 10.2 |

What is claimed is:

1. Magnetic spindle-shaped metal particles containing iron as a main component, which contain cobalt of 8 to 45 atm %, calculated as Co, based on whole Fe, aluminum of 5 to 20 atm %, calculated as Al, based on whole Fe, and a rare earth element of 1 to 15 atm %, calculated as rare earth element, based on whole Fe; and have an average major axial diameter of 0.05 to 0.15 μm, an average minor axial diameter of 0.010 to 0.022 μm, an aspect ratio (average major axial diameter/average minor axial diameter) of 4:1 to 8:1, a particle size distribution (standard deviation/average major axial diameter) of not more than 0.20, and an X-ray crystallite size D110 of 12.0 to 17.0 nm.

2. Magnetic spindle-shaped metal particles containing iron as a main component according to claim 1, which contain cobalt of more than 20 atm % and not more than 45 atm %, calculated as Co, based on whole Fe, aluminum of 5 to 15 atm %, calculated as Al, based on whole Fe, and a rare earth element of 5 to 15 atm %, calculated as rare earth element, based on whole Fe, and have an average major axial diameter of 0.05 to 0.14 μm, a coercive force of 2,000 to 2,500 Oe and a saturation magnetization σs of 130 to 160 emu/g.

3. Magnetic spindle-shaped metal particles containing iron as a main component according to claim 1, which further have an aspect ratio (average major axial diameter/ average minor axial diameter) of 4:1 to 7:1, a BET specific surface area of 35 to 65 m2/g, a coercive force of 1,800 to 2,500 Oe and a saturation magnetization σs of 110 to 160 emu/g.

4. Magnetic spindle-shaped metal particles containing iron as a main component according to claim 3, which further have a particle coercive force distribution (SFDr) of not more than 0.72 and a change in a saturation magnetization σs with passage of time of not more than 15% as an absolute value.

5. Magnetic spindle-shaped metal particles containing iron as a main component according to claim 1, which further have an average minor axial diameter of 0.010 to 0.020 μm, a particle size distribution (standard deviation/ average major axial diameter) of not more than 0.18, a BET specific surface area of 35 to 65 m$^2$/g and a change in a saturation magnetization as with passage of time of not more than 10% as an absolute value.

6. A process for producing magnetic spindle-shaped metal particles containing iron as a main component, comprising:

aging a water suspension containing an Fe$^{2+}$-containing precipitate produced by reacting a mixed aqueous alkali solution comprising an aqueous alkali carbonate solution and an aqueous alkali hydroxide solution, with an aqueous ferrous salt solution, in a non-oxidative atmosphere;

conducting the oxidation reaction by passing an oxygen-containing gas through the water suspension, thereby producing spindle-shaped goethite seed crystal particles;

passing again an oxygen-containing gas through the resultant water suspension containing both said Fe$^{2+}$-containing precipitate and said spindle-shaped goethite seed crystal particles to conduct the oxidation reaction of the water suspension, thereby growing a goethite layer on a surface of each spindle-shaped goethite seed crystal particle, wherein upon the production of said spindle-shaped goethite seed crystal particles, a Co compound is added in an amount of 8 to 45 atm %, calculated as Co, based on whole Fe, to said water suspension containing the Fe$^{2+}$-containing precipitate during the aging treatment before initiation of the oxidation reaction, thereby oxidizing 30 to 80% of whole Fe$^{2+}$, and wherein upon the growth of said goethite layer, a linear velocity of said oxygen-containing gas passing through said water suspension containing both the Fe$^{2+}$-containing precipitate and the spindle-shaped goethite seed crystal particles, is adjusted to not less than two times that of the oxygen-containing gas passing through the water suspension containing the Fe$^{2+}$-containing precipitate upon the production of the goethite seed crystal particles, and an Al compound being added in an amount of 5 to 20 atm %, calculated as Al, based on whole Fe, treating the obtained spindle-shaped goethite particles with an anti-sintering agent comprising a rare earth element-containing compound; and then heat-reducing said spindle-shaped goethite particles at 400 to 700° C. in a reducing atmosphere.

7. A process for producing magnetic spindle-shaped metal particles containing iron as a main component, comprising:

aging a water suspension containing an Fe$^{2+}$-containing precipitate produced by reacting a mixed aqueous alkali solution comprising an aqueous alkali carbonate solution and an aqueous alkali hydroxide solution, with an aqueous ferrous salt solution, in a non-oxidative atmosphere;

conducting the oxidation reaction by passing an oxygen-containing gas through the water suspension, thereby producing spindle-shaped goethite seed crystal particles;

passing again an oxygen-containing gas through the resultant water suspension containing both said Fe$^{2+}$-containing precipitate and said spindle-shaped goethite seed crystal particles to conduct the oxidation reaction of the water suspension, thereby growing a goethite layer on a surface of each spindle-shaped goethite seed crystal particle, wherein upon the production of said spindle-shaped goethite seed crystal particles, a Co compound is added in an amount of 8 to 45 atm %, calculated as Co, based on whole Fe, to said water suspension containing the Fe$^{2+}$-containing precipitate during the aging treatment before initiation of the oxidation reaction, thereby oxidizing 30 to 80% of whole Fe$^{2+}$, and wherein upon the growth of said goethite layer, a linear velocity of said oxygen-containing gas passing through said water suspension containing both the Fe2+-containing precipitate and the spindle-shaped goethite seed crystal particles, is adjusted to not less than two times that of the oxygen-containing gas passing through the water suspension containing the $Fe^{2+}$-containing precipitate upon the production of the goethite seed crystal particles, and an Al compound being added in an amount of 5 to 20 atm %, calculated as Al, based on whole Fe;

treating the obtained spindle-shaped goethite particles with an anti-sintering agent comprising a rare earth element-containing compound;

heat-treating said spindle-shaped goethite particles at 400 to 850° C. in a non-reducing atmosphere; and then heat-reducing said treated particles at 400 to 700° C. in a reducing atmosphere.

8. A process for producing magnetic spindle-shaped metal particles containing iron as a main component and suitable for magnetic recording, comprising:

charging spindle-shaped goethite particles containing cobalt of 20 to 45 atm %, calculated as Co, based on whole Fe and having a major axial diameter of 0.05 to 0.15 μm, or spindle-shaped hematite particles obtained by heat-dehydrating said goethite particles, as starting particles, into a fixed-bed reducing reactor to form a fixed-bed having a height of not more than 30 cm;

elevating the temperature of said starting particles to 400 to 700° C. in an inert gas atmosphere;

replacing the inert gas atmosphere with a reducing gas atmosphere; and reducing said spindle-shaped goethite particles or spindle-shaped hematite particles with a reducing gas fed at a linear velocity of 40 to 150 cm/s, at temperature of 400 to 700° C.

* * * * *